US011188509B2

(12) United States Patent
Ben-Aharon et al.

(10) Patent No.: US 11,188,509 B2
(45) Date of Patent: *Nov. 30, 2021

(54) SYSTEM AND METHOD FOR GENERATING A VISUAL DATA STRUCTURE ASSOCIATED WITH BUSINESS INFORMATION BASED ON A HIERARCHY OF COMPONENTS

(71) Applicant: Wix.com Ltd., Tel Aviv (IL)

(72) Inventors: Roni Ben-Aharon, Tel Aviv (IL); Nadav Abrahami, Tel Aviv (IL); Uri Dromy, Tel Aviv (IL); Barak Igal, Kfar Yehoshua (IL); Daphna Ofek, Ginaton (IL)

(73) Assignee: Wix.com Ltd., Tel Aviv (IL)

( * ) Notice: Subject to any disclaimer, the term of this patent is extended or adjusted under 35 U.S.C. 154(b) by 279 days.

This patent is subject to a terminal disclaimer.

(21) Appl. No.: 16/000,907

(22) Filed: Jun. 6, 2018

(65) Prior Publication Data

US 2018/0300361 A1    Oct. 18, 2018

Related U.S. Application Data

(63) Continuation of application No. 15/224,579, filed on Jul. 31, 2016, now Pat. No. 9,996,566, which is a
(Continued)

(51) Int. Cl.
*G06F 16/958*     (2019.01)
*G06F 40/106*    (2020.01)
(Continued)

(52) U.S. Cl.
CPC .......... *G06F 16/2246* (2019.01); *G06F 3/00* (2013.01); *G06F 8/24* (2013.01); *G06F 16/958* (2019.01);
(Continued)

(58) Field of Classification Search
CPC .. G06F 16/2246; G06F 16/958; G06F 40/186; G06F 40/106; G06F 40/14;
(Continued)

(56) References Cited

U.S. PATENT DOCUMENTS 5,623,418 A    4/1997  Rostoker
6,604,099 B1   8/2003  Chung
(Continued)

FOREIGN PATENT DOCUMENTS

JP       2009230260      10/2009

OTHER PUBLICATIONS

Supplementary European Search Report for corresponding European application 16 82 9947.7 dated Apr. 4, 2019.
(Continued)

*Primary Examiner* — Thu V Huynh
(74) *Attorney, Agent, or Firm* — Heidi Brun Associates Ltd.

(57) ABSTRACT

A system and method for a visual design system includes a memory, a processor, a page analyzer to extract business information of at least one data structure of at least one page of a visual application having an existing layout, to perform a semantic analysis of the extracted business information and to use the extracted business information to produce a business information layout and an associated business information signature; a database to store at least one layout and at least one associated layout signature where the layout signature represents a business information composition of the at least one layout, a signature comparer to perform a comparison of the associated business information signature of the at least one data structure with the associated layout signature of the at least one layout stored in said layout database and where the processor and the memory embody the page analyzer and the signature comparer.

30 Claims, 34 Drawing Sheets

Related U.S. Application Data continuation-in-part of application No. 14/699,828, filed on Apr. 29, 2015, now Pat. No. 9,747,528, and a continuation-in-part of application No. 14/926,007, filed on Oct. 29, 2015, and a continuation-in-part of application No. 13/959,759, filed on Aug. 6, 2013, now Pat. No. 9,513,771, and a continuation-in-part of application No. 14/176,166, filed on Feb. 10, 2014, now Pat. No. 10,509,850, and a continuation-in-part of application No. 14/207,761, filed on Mar. 13, 2014, now abandoned, and a continuation-in-part of application No. 13/771,119, filed on Feb. 20, 2013, now Pat. No. 10,185,703.

(60) Provisional application No. 62/247,766, filed on Oct. 29, 2015, provisional application No. 62/367,151, filed on Jul. 27, 2016, provisional application No. 62/198,725, filed on Jul. 30, 2015, provisional application No. 62/342,955, filed on May 29, 2016, provisional application No. 61/985,489, filed on Apr. 29, 2014, provisional application No. 62/072,460, filed on Oct. 30, 2014, provisional application No. 61/679,814, filed on Aug. 6, 2012, provisional application No. 61/762,902, filed on Feb. 10, 2013, provisional application No. 61/781,866, filed on Mar. 14, 2013, provisional application No. 61/600,726, filed on Feb. 20, 2012.

(51) Int. Cl.
  G06F 40/186 (2020.01)
  G06F 16/22 (2019.01)
  G06F 3/00 (2006.01)
  G06F 8/20 (2018.01)
  G06F 40/143 (2020.01)
  G06F 16/84 (2019.01)
  G06F 40/154 (2020.01)
  G06F 40/166 (2020.01)

(52) U.S. Cl.
  CPC .......... G06F 40/106 (2020.01); G06F 40/143 (2020.01); G06F 40/186 (2020.01); *G06F 16/88* (2019.01); *G06F 40/154* (2020.01); *G06F 40/166* (2020.01)

(58) Field of Classification Search
  CPC . G06F 3/00; G06F 8/24; G06F 40/143; G06F 40/166; G06F 40/154
  USPC .......................................................... 715/234
  See application file for complete search history.

(56) References Cited

U.S. PATENT DOCUMENTS

| | | | |
|---|---|---|---|
| 8,134,575 B2 | 3/2012 | Wong | |
| 8,788,935 B1 | 7/2014 | Hirsch et al. | |
| 9,195,640 B1* | 11/2015 | Donneau-Golencer | ..................... G06F 40/40 |
| 9,280,752 B2* | 3/2016 | Pandrangi | ............. G06F 40/174 |
| 9,513,771 B2 | 12/2016 | Abrahami et al. | |
| 2004/0205461 A1 | 10/2004 | Kaufman | |
| 2006/0015494 A1 | 1/2006 | Keating | |
| 2006/0066905 A1* | 3/2006 | Takashima | ............ G06F 40/186 358/1.18 |
| 2008/0163069 A1* | 7/2008 | Eilers | .................... G06F 40/106 715/744 |
| 2009/0044126 A1 | 2/2009 | Wyler et al. | |
| 2010/0083215 A1 | 4/2010 | Bogl | |
| 2010/0194753 A1 | 8/2010 | Robotham et al. | |
| 2011/0077048 A1* | 3/2011 | Busch | ................. H04N 1/00331 455/556.1 |
| 2011/0276874 A1* | 11/2011 | Dejean | .................. G06F 40/186 715/243 |
| 2012/0042240 A1* | 2/2012 | Oliveira | ................ G06F 40/106 715/243 |
| 2012/0278704 A1 | 11/2012 | Ying et al. | |
| 2013/0014008 A1 | 1/2013 | Damera-Venkata | |
| 2013/0124968 A1* | 5/2013 | Dontcheva | ............ G06F 40/106 715/234 |
| 2013/0219263 A1* | 8/2013 | Abrahami | ............. G06F 40/117 715/234 |
| 2013/0275892 A1 | 10/2013 | Li et al. | |
| 2014/0101533 A1 | 4/2014 | Imrich et al. | |
| 2014/0229821 A1 | 8/2014 | Abrahami | |
| 2014/0282218 A1 | 9/2014 | Abraham et al. | |
| 2014/0331124 A1 | 11/2014 | Downs et al. | |
| 2015/0074516 A1 | 3/2015 | Ben-Aharon et al. | |
| 2015/0100406 A1 | 4/2015 | Klimetschek et al. | |
| 2015/0161585 A1 | 6/2015 | Huster | |
| 2015/0206169 A1* | 7/2015 | Ye | ...................... G06Q 30/0242 705/14.41 |
| 2016/0092419 A1* | 3/2016 | Farouki | ................. G06F 40/131 715/202 |
| 2016/0124839 A1 | 5/2016 | Mordo et al. | |
| 2017/0032050 A1 | 2/2017 | Kol et al. | |

OTHER PUBLICATIONS

International Search Report for corresponding PCT application PCT/IB2016/054602 dated Dec. 8, 2016.
International Search Report for corresponding PCT application to the parent application PCT/IB2015/053126 dated Aug. 14, 2015.
English Abstract of JP 2009230260 generated online on Sep. 3, 2015.
Christian K. Shin et al., "Classification of document page images based on visual similarity of layout structure", Center for Automation Research, University of Maryland, 1999.
Xianjun Sam Zheng et al., "Correlating low-level image statistics with users' rapid aesthetic and affective judgments of web pages", International Conference on Human Factors in Computing Systems (SIGCHI), Apr. 2009.
Marcos R. Vieira et al., "On query result diversification", 2011.
Gisii R. Hjaltason et al., "Contractive embedding methods for similarity searching in metric spaces", Center for Automation Research, University of Maryland, Jan. 2000.
Danai Koutra et al., "Algorithms for Graph Similarity and Subgraph Matching", Machine Learning Department, Carnegie Mellon University, Dec. 2011.

* cited by examiner

SYSTEM AND METHOD FOR GENERATING A VISUAL DATA STRUCTURE ASSOCIATED WITH BUSINESS INFORMATION BASED ON A HIERARCHY OF COMPONENTS

CROSS REFERENCE TO RELATED APPLICATIONS

This application is Continuation Application of U.S. patent application Ser. No. 15/224,579 filed 31 Jul. 2016 which is a Continuation-In-Part application of the following applications: U.S. patent application Ser. No. 14/699,828 filed Apr. 29, 2015 now issued as U.S. Pat. No. 9,747,258, which claims priority from U.S. Provisional Patent application 61/985,489, filed Apr. 29, 2014, U.S. patent application Ser. No. 14/926,007 filed Oct. 29, 2015, which claims priority from U.S. Provisional Patent Application No. 62/072,460 filed Oct. 30, 2014, U.S. patent application Ser. No. 13/959,759 filed Aug. 6, 2013, now issued as U.S. Pat. No. 9,513,771, which claims priority from U.S. Provisional Patent Application No. 61/679,814 filed Aug. 6, 2012, U.S. patent application Ser. No. 14/176,166 filed Feb. 10, 2014, which claims priority from U.S. Provisional Patent Application No. 61/762,902 filed Feb. 10, 2013, U.S. patent application Ser. No. 14/207,761 filed Mar. 13, 2014 which claims priority from U.S. Provisional Patent Application No. 61/781,866 filed Mar. 14, 2013, and U.S. patent application Ser. No. 13/771,119 filed Feb. 20, 2013 which claims priority from U.S. Provisional Patent Application No. 61/600,726 filed Feb. 20, 2012 all of which are incorporated herein by reference. The application also claims priority from U.S. Provisional Patent Applications 62/247,766, filed Oct. 29, 2015, 62/367,151 filed Jul. 27, 2016, 62/198,725 filed Jul. 30, 2015 and 62/342,955 filed May 29, 2016 all of which are incorporated herein by reference.

FIELD OF THE INVENTION

The present invention relates to visual design systems generally and to visual data structures in particular.

BACKGROUND OF THE INVENTION

Website building systems have become very popular and allow novice website builders to build professional looking and functioning websites. Many of these systems provide both the novice and experienced user ways of building websites from scratch.

A website building system may be a standalone system or may be embedded inside a larger editing system. It may also be on-line (i.e. applications are edited and stored on a server), off-line or partially on-line (with web sites being edited locally but uploaded to a central server).

Websites are typically made up of applications and a visually designed application typically consists of pages which may be displayed separately and contain components. Components are typically arranged in a hierarchy of containers (single page and multi-page) inside the page containing atomic components. A multi-page container may display multiple mini-pages. Pages may also include list applications and third party applications.

Pages may also use templates—general page templates or component templates. Specific cases for templates include the use of an application master page containing components replicated in all other regular pages, and the use of an application header and/or footer (which repeat on all pages). The arrangement of components inside a page is called the layout.

SUMMARY OF THE PRESENT INVENTION

There is provided in accordance with a preferred embodiment of the present invention, a system for a visual design system. The system includes a memory; a processor and a page analyzer to extract business information of at least one data structure of at least one page of a visual application having an existing layout, to perform a semantic analysis of the extracted business information and to use the extracted business information to produce a business information layout and an associated business information signature. The system also includes a database to store at least one layout and at least one associated layout signature where the layout signature represents a business information composition of the at least one layout; and a signature comparer to perform a comparison of the associated business information signature of the at least one data structure with the associated layout signature of the at least one layout stored in the layout database; and where the processor and the memory embody the page analyzer and the signature comparer.

Moreover, in accordance with a preferred embodiment of the present invention, the system also includes a layout searcher and generator to at least acquire from at least the layout database a set of candidate layouts according to the results of the signature comparer and where a first candidate layout includes semantically similar components having visual diversity from a second candidate layout and from the existing layout and a layout adapter and applier to adapt the at least one data structure to a selected layout from the set of candidate layouts.

Further, in accordance with a preferred embodiment of the present invention, the system also includes a page spider to retrieve visual design system pages comprising at least one of: new and updated visual data structures, templates and manually created layouts from an associated application repository and pages from external sources; a layout filter and ranker to filter and rank at least one of: the at least one layout generated by the page analyzer and the candidate layout; and where the page analyzer operates on the spider retrieved visual design system pages instead of operating on the visual data structure.

Still further, in accordance with a preferred embodiment of the present invention, the page analyzer includes a signature extractor to extract at least one of: a full business information signature and a partial business information signature from the at least one data structure and where the signature extractor performs at least one of: semantic type mapping of the components, dividing semantic types based on visual properties of the components and generating signature elements based on multiple component semantic types. The page analyzer also includes at least one of: a layout splitter to divide the at least one data structure into segments based on at least one of: geometrical considerations, the semantic links and dynamic layout anchors; a semantic link handler to identify semantic links which connect at least two components in the at least one data structure; a component splitter to split at least one component of the at least one data structure set based on the content of the at least one component; and a component filter to filter out unsuitable components for the signature extractor; a component merger to unite at least two components for layout processing and signature extraction by the signature extractor; a container handler to reduce the amount of different business information signatures for the at least one data structure set by performing at least one of: using hierarchical signatures, container flattening, container flattening and reconstruction, single component container replacement; dominant type selection and recursive implementation and where and where the page analyzer generates at least one of a single full page layout, multiple partial page layouts, multiple segmented layouts and an associated layout package after processing by at least one of: the layout splitter, the signature extractor, the page type identifier, the semantic link handler; the component splitter; the component filter; the component merger and the container handler.

Additionally, in accordance with a preferred embodiment of the present invention, the layout filter and ranker includes a visual page comparer to compare at least one of: the level of visual similarity between the at least one layout and other layouts in the layout database and the level of visual similarity between the at least one data structure and at least one of the candidate layouts; a layout quality rater to calculate a quality score in order to filter out low-quality pages of at least one of: the at least one layout and the candidate layouts based on at least one of page statistical metrics, page visual attributes, content and a layout quality rater learning system; a ranker to order at least one of the at least one layout and the candidate layouts according to business information semantic similarity; and a diversifier to ensure visual diversity between at least one data structure and the candidate layouts.

Moreover, in accordance with a preferred embodiment of the present invention, the layout searcher and generator includes a server based layout handler to perform at least one of: retrieving the candidate layouts from the layout database, completing partial candidate layouts and combining of at least two of segmented candidate layouts; an automatically generated layout handler create said automatically generated layouts based on the components in the at least one data structure; and a matcher to create a match of components between the at least one data structure and the candidate layouts where the match is at least one of: exact and partial.

Further, in accordance with a preferred embodiment of the present invention, the automatically generated layout handler includes an automatically generated layout coordinator to receive at least one of: a base component set of the at least one data structure and a base component set of components missing from an associated the partial candidate layout from the server based layout handler and to create multiple possible algorithmically-generated layouts from the base component set. The automatically generated layout handler also includes at least one of: a column layout generator to place components from the base component set into one column after the other, a main and side bar layout generator to place components from the base component set in a main column followed by a smaller side-bar and a rule based generator to place components from the base component set according to pre-defined placement rules.

Still further, in accordance with a preferred embodiment of the present invention, the server based layout handler includes a server based layout coordinator to perform at least one of: receiving the at least one data structure and the associated business information signatures, querying the layout database using the business information signatures, retrieving the set of candidate layouts and coordinating completion of at least one of: the partial candidate layouts and segmented candidate layouts retrieved from the layout database. It also includes a partial layout handler to send components missing from the partial candidate layouts to the automatically generated layout handler and to use the resulting automatically generated layout to complete the partial candidate layouts; and a segment layout handler to combine the segmented candidate layouts into a full layout according to pre-defined rules.

Additionally, in accordance with a preferred embodiment of the present invention, the layout adapter and applier includes a component type conversion handler to convert the type of each component in the at least one data structure set to the type of each matching component in the selected layout; a component attribute applier to apply attributes to components in the at least one data structure set from the selected layout. It also includes at least one of: a dynamic layout handler to transfer over the dynamic layout explicit anchors and relationships from the at least one data structure set to the selected layout; a container change applier to adapt containers from the least one data structure set to the selected layout; a split/merge component handler to perform at least one of: splitting and merging components in the selected layout; a remaining component handler to handle components which appear in the least one data structure but are not included in the selected layout; and a post processor to perform reverse transformations made by the page analyzer when necessary.

Moreover, in accordance with a preferred embodiment of the present invention, the business information signature is based at least on the semantic classification categories of the components of the visual design system.

Further, in accordance with a preferred embodiment of the present invention, the candidate layouts are acquired based on at least one of: a business information signature of the at least one data structure, a partial business information signature of the at least one data structure, at least one business information signature of the at least one data structure and an automatically generated layout.

Still further, in accordance with a preferred embodiment of the present invention, the comparison is based on at least one of: semantic abstraction and semantic distance metrics.

Additionally, in accordance with a preferred embodiment of the present invention, the at least one visual data structure is a larger than a handled component set of a page of a visual application.

Moreover, in accordance with a preferred embodiment of the present invention, the visual design system is at least one of: an experiment system, an end user orientated application, a native application building system, a dynamic view assignment system, an application generation system, a page analyzing visual editor and a website building system.

There is provided in accordance with a preferred embodiment of the present invention, a method for a visual design system. The method includes extracting business information from at least one data structure of at least one page of a visual application having an existing layout, semantically analyzing on the extracted business information and using the extracted business information to produce a business information layout and an associated business information signature; storing in a layout database at least one layout and at least one associated layout signature where the layout signature represents a business information composition of the at least one layout and comparing the associated business information signature of the at least one data structure with the associated layout signature of the at least one layout stored in the layout database.

Moreover, in accordance with a preferred embodiment of the present invention, the method also include acquiring from at least the layout database a set of candidate layouts according to the results of the comparing and where a first candidate layout includes semantically similar components having visual diversity from a second candidate layout and from the existing layout; adapting the at least one data structure to a selected layout from the set of candidate layouts.

Further, in accordance with a preferred embodiment of the present invention, the method also includes retrieving visual design system pages comprising at least one of: new and updated visual data structures, templates and manually created layouts from an associated application repository and pages from external sources; filtering and ranking at least one of: the at least one layout generated by the extracting business information and the candidate layout; and where the extracting business information, the semantically analyzing and the using the extracted business information to produce a business information layout operate on the visual design system pages instead of operating on the visual data structure.

Still further, in accordance with a preferred embodiment of the present invention, the extracting business information, the semantically analyzing and using the extracted business information to produce a business information layout includes extracting at least one of: a full business information signature and a partial business information signature from the at least one data structure and where the performs at least one of: semantic type mapping of the components, dividing semantic types based on visual properties of the components and generating signature elements based on multiple component semantic types. It also includes at least one of: dividing the at least one data structure into segments based on at least one of: geometrical considerations, the semantic links and dynamic layout anchors; identifying semantic links which connect at least two components in the at least one data structure; splitting at least one component of the at least one data structure set based on the content of the at least one component; and filtering out unsuitable components for the extracting; and uniting at least two components for layout processing and signature extraction by the extracting; reducing the amount of different business information signatures for the at least one data structure set by performing at least one of: using hierarchical signatures, container flattening, container flattening and reconstruction, single component container replacement; dominant type selection and recursive implementation and where the extracting business information, the semantically analyzing and using the extracted business information to produce a business information layout generate at least one of a single full page layout, multiple partial page layouts, multiple segmented layouts and an associated layout package after processing by at least one of: the dividing the at least one data structure into segments, the extracting, the identifying semantic links; the splitting at least one component of the at least one data structure; the filtering out unsuitable components; the uniting at least two components and the reducing the amount of different business information signatures.

Additionally, in accordance with a preferred embodiment of the present invention, the filtering and ranking includes comparing at least one of: the level of visual similarity between the at least one layout and other layouts in the layout database and the level of visual similarity between the at least one data structure and at least one of the candidate layouts; calculating a quality score in order to filter out low-quality pages of at least one of: the at least one layout and the candidate layouts based on at least one of page statistical metrics, page visual attributes, content and a layout quality rater learning system; ordering at least one of the at least one layout and the candidate layouts according to business information semantic similarity; and ensuring visual diversity between at least one data structure and the candidate layouts.

Moreover, in accordance with a preferred embodiment of the present invention, the acquiring includes performing at least one of: retrieving the candidate layouts from the layout database, completing partial candidate layouts and combining of at least two of segmented candidate layouts; creating the automatically generated layouts based on the components in the at least one data structure; and creating a match of components between the at least one data structure and the candidate layouts where the match is at least one of: exact and partial.

Further, in accordance with a preferred embodiment of the present invention, the creating the automatically generated layouts includes receiving at least one of: a base component set of the at least one data structure and a base component set of components missing from an associated the partial candidate layout from the performing at least one of: retrieving the candidate layouts from the layout database, completing partial candidate layouts and combining of at least two of segmented candidate layouts and creating multiple possible algorithmically-generated layouts from the base component set. It also includes at least one of: placing components from the base component set into one column after the other, performing at least one of: retrieving the candidate layouts from the layout database, completing partial candidate layouts and combining of at least two of segmented candidate layouts, placing components from the base component set in a main column followed by a smaller side-bar and placing components from the base component set according to pre-defined placement rules.

Still further, in accordance with a preferred embodiment of the present invention, the performing at least one of: retrieving the candidate layouts from the layout database, completing partial candidate layouts and combining of at least two of segmented candidate layouts includes performing at least one of: receiving the at least one data structure and the associated business information signatures, querying the layout database using the business information signatures, retrieving the set of candidate layouts and coordinating completion of at least one of: the partial candidate layouts and segmented candidate layouts retrieved from the layout database. It also includes sending components missing from the partial candidate layouts for the performing at least one of: creating the automatically generated layouts based on the components in the at least one data structure and completing the partial candidate layouts retrieved by the server based layout handler and using the resulting automatically generated layout to complete the partial candidate layouts; and combining the segmented candidate layouts into a full layout according to pre-defined rules.

Additionally, in accordance with a preferred embodiment of the present invention, the adapting the at least one data structure to a selected layout from the set of candidate layouts includes converting the type of each component in the at least one data structure set to the type of each matching component in the selected layout; applying attributes to components in the at least one data structure set from the selected layout; and at least one of transferring over the dynamic layout explicit anchors and relationships from at the least one data structure to the selected layout; and adapting containers from the at least one data structure set to the selected layout. It also includes performing at least one of: splitting and merging components in the selected layout; handling components which appear in the at least one data structure but are not included in the selected layout; and performing reverse transformations made by the extracting business information when necessary.

Moreover, in accordance with a preferred embodiment of the present invention, the business information signature is based at least on the semantic classification categories of the components of visual design system.

Further, in accordance with a preferred embodiment of the present invention, the candidate layouts are acquired based on at least one of: a business information signature of the at least one data structure, a partial business information signature of the at least one data structure, at least one business information signature of the at least one data structure and an automatically generated layout.

Still further, in accordance with a preferred embodiment of the present invention, the comparison is based on at least one of: semantic abstraction and semantic distance metrics.

Additionally, in accordance with a preferred embodiment of the present invention, the at least one visual data structure is a larger than a handled component set of a page of a visual application.

Moreover, in accordance with a preferred embodiment of the present invention, the visual design system is at least one of: an experiment system, an end user orientated application, a native application building system, a dynamic view assignment system, an application generation system, a page analyzing visual editor and a website building system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
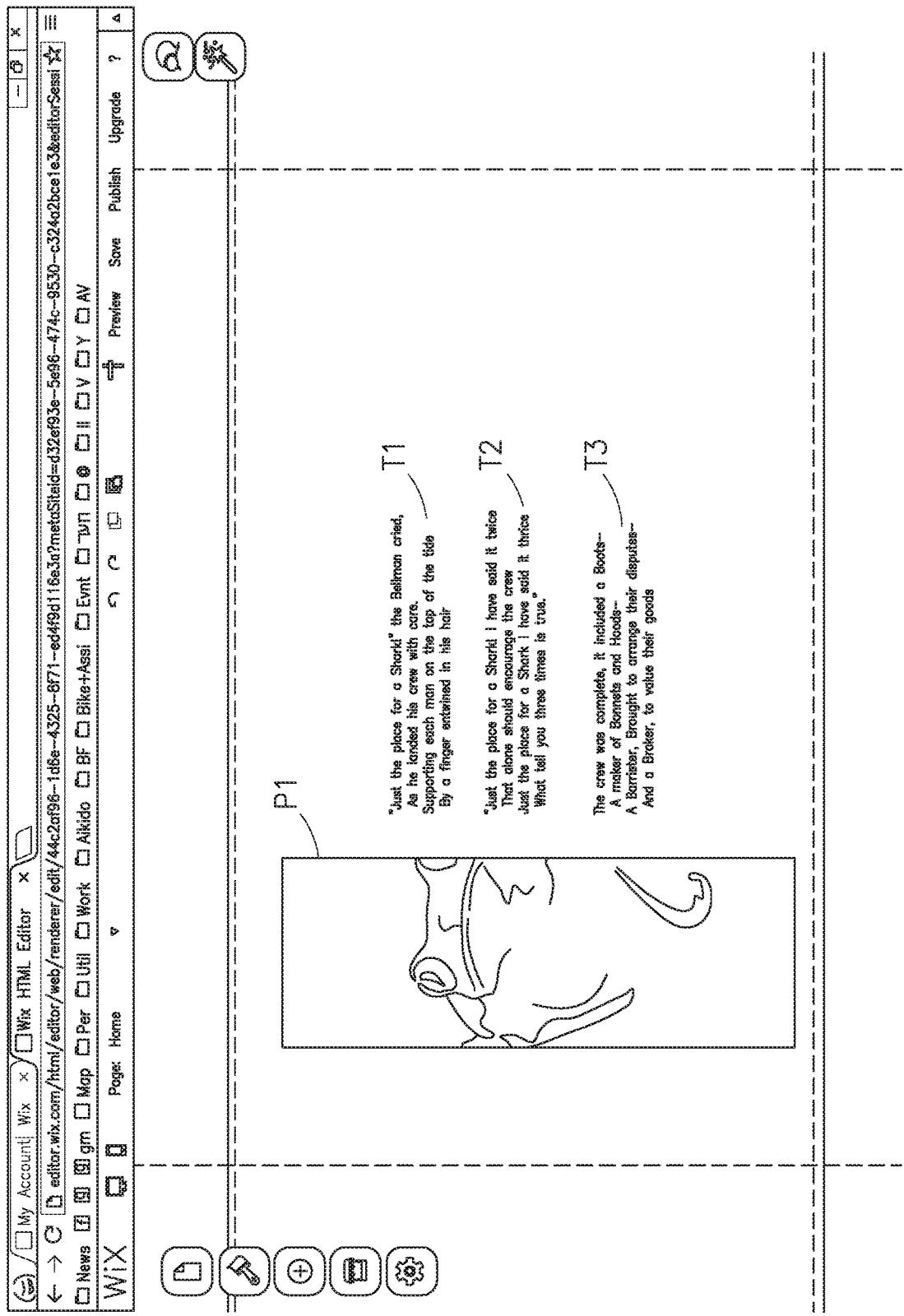
FIG. 1 is a schematic illustration of an example webpage page to be adapted.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An alternative way for a user to update or change their website is to change the layout of a current website based on the content and structure within so that only the actual layout changes and the content is preserved. Current systems typically run algorithms that search for a layout visually similar to the model layout provided by the user.

Applicants have realized that an alternative method may be a system that may generate a layout which is visually different from the model layout but is sufficiently equivalent to be able to store and present the same underlying content. These layouts may be used to provide design alternatives to an existing page design created by a user, to provide suggested layouts for data collections which do not have a current design (such as imported data which has yet to be organized) and to allow pages created using a given template to be used with alternative templates.

Applicants have further realized that the stored layouts may be dynamic and may also be subject to dynamic layout processing as discussed in US Patent Publication No 2013-0219263 entitled "A Server Based Web Site Design System Integrating Dynamic Layout and Dynamic Content" published 22 Aug. 2013, incorporated herein by reference and assigned to the common assignee of the current invention. Therefore, the stored layouts may automatically be adapted for different amounts of component content.

It will be appreciated that a set of relevant components on a page or a part thereof (i.e. a subset of the components in a page) may be considered a given handled component set as described in more detail herein below. Applicants have further realized that it is possible to provide a diverse set of high-quality semantically-equivalent layout alternatives for a given handled component set. Thus, a designer could apply a selected suggested layout to the handled component set. It will be appreciated that such a system may also allow designers to add complementary information to their layout designs which could support the system in locating these designs and even apply them at a later stage to the handled component set.

Reference is now made to FIG. 1 which illustrates an example page to be adapted. The page contains one picture component P1 and 3 text components T1, T2 and T3. These components may be considered the handled component set.

Figure 2:
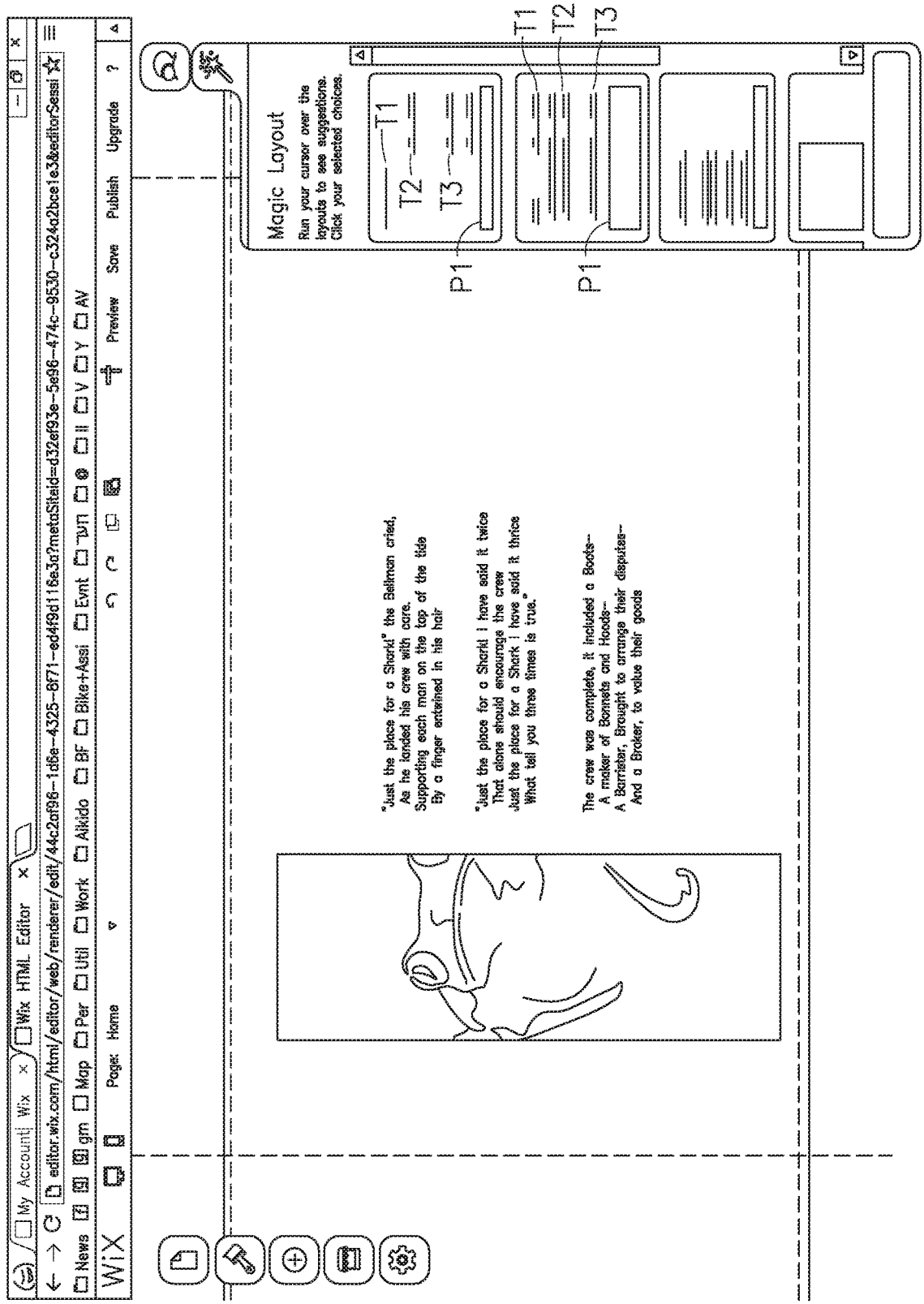
FIG. 2 is a schematic illustration of a sample user interface displaying a selection of possible alternative layouts for the example webpage in FIG. 1, constructed and operative in accordance with a preferred embodiment of the present invention.

Reference is now made to FIG. 2 which illustrates a pop-up menu which is activated by pressing (as an example) the "Magic Layout" button. This pop-up menu displays the result of a query made against a layout database using the specific handled component set or an automatically generated layout based on the specific handled component set (as discussed in more detail herein below). The pop-up menu in this implementation displays an outline of each of the suggested layouts. In this implementation, whenever the designer may hover his cursor over one of the suggested layouts in the pop-up menu, the edited page is temporarily adapted to the suggested layout pointed to by the mouse.

Applicants have further realized that such a system may provide a layout marketplace to designers which may present to a user, layouts that have been prepared in advance for use by the system, layouts collected from various sources (and possibly filtered for diversity and quality) and automatically generated layouts created based on the components in the handled component set and layout creation rules (as described in more detail herein below).

Applicants have realized that searching for layouts which are semantically equivalent or close to the handled component set (the current page) may be done by extracting (one or more) signatures which represent the semantic composition of the handled component set and the pre-indexed layouts. It will be appreciated that that the handled component set is the collection of components used for layout searching (which is also subject to layout modification), whereas the signature is a string or vector which includes semantic information about the handled component set in a summarized form.

Each signature may include a count of the number of semantic component types at various level of details (e.g. [1 text, 2 images, 1 gallery] or [3 visuals, 1 gallery]) as discussed in more detail herein below.

Figure 3A:
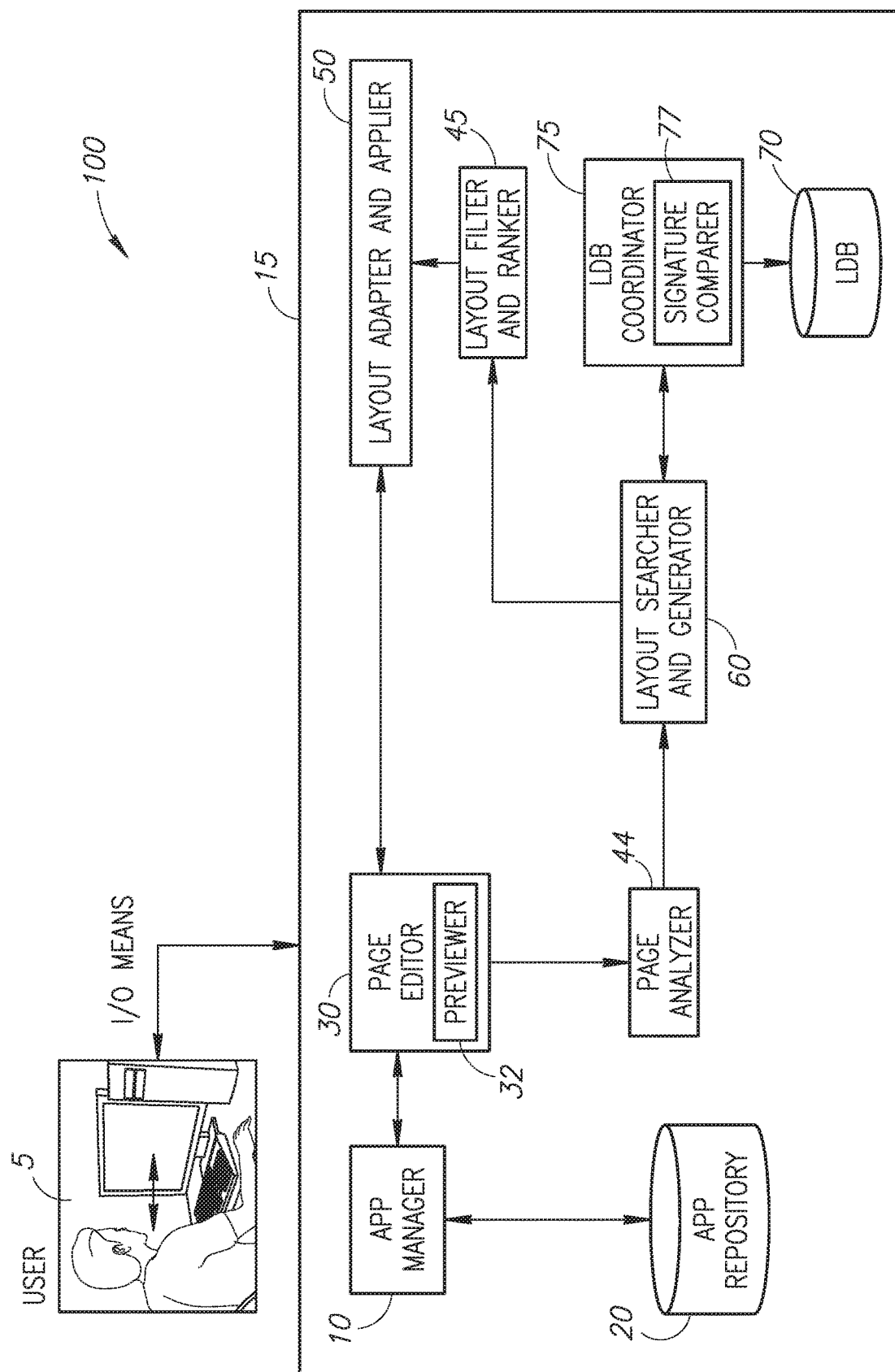
FIGS. 3A and 3B are schematic illustrations of a system for producing visually diverse alternative dynamic layouts for a website; constructed and operative in accordance with a preferred embodiment of the present invention.
Figure 3B:
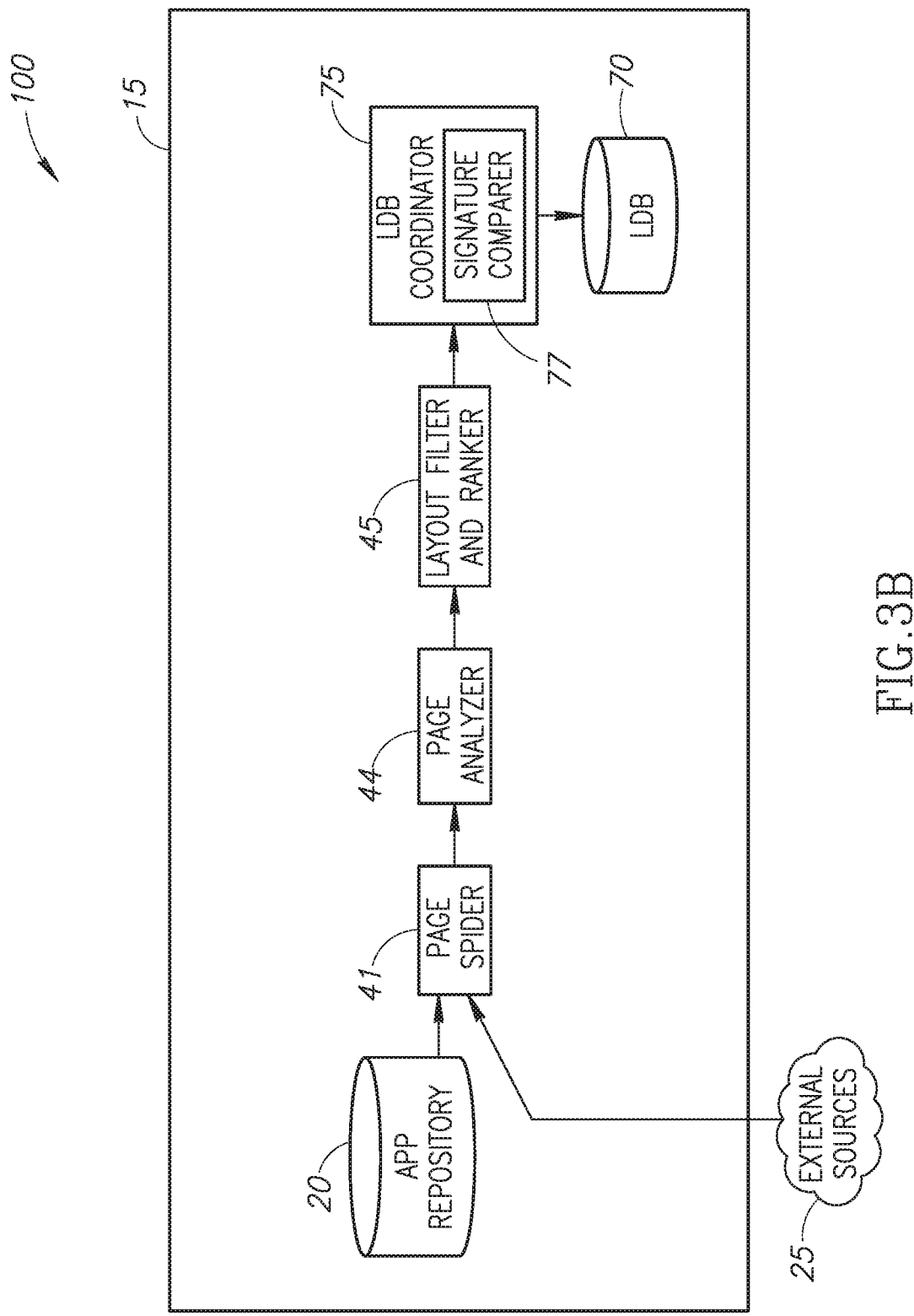

Reference is now made to FIGS. 3A and 3B which illustrate a system 100 for generating visually diverse alternative dynamic layouts for a website according to an embodiment of the present invention. FIG. 3A illustrates system 100 during finding visually diverse and semantically similar candidate layouts for an incoming request page and FIG. 3B illustrates layout collection and indexing. System 100 comprises a client 5 and a server 15. Server 15 may further comprise an application manager 10, an application repository 20, a page editor 30, a page spider 41, a page analyzer 44, a layout filter and ranker 45, a layout adapter and applier 50, a layout searcher and generator 60, a layout database 70 and a layout database coordinator 75. Layout database coordinator 75 may further comprise a signature comparer 77 as described in more detail herein below. Application repository 20 may hold versions of the pertinent website pages which may be retrieved by application manager 10 when required, as well as additional related data (such as application metadata and dynamic layout information). Page editor 30 may be suitable graphical user interface which may allow editing of pages and may act as an interface between the user and system 100 when providing manual input to the process. Page editor 30 may also comprise a previewer 32 so that previews of layouts and final adaptations may be presented to the user as described in more detail herein below.

As is illustrated in FIG. 3A to which reference is now made, page analyzer 44 may pre-process and analyze an incoming user page supplied via page editor 30. Layout searcher and generator 60 may search layout database 70 according to the given handled component set of the incoming user supplied page and may locate candidate layouts and perform result matching. Layout filter and ranker 45 may perform filtering and ranking on the candidate layouts. Layout adapter and applier 50 may adapt the handled component set to a new selected layout, chosen by a user from a set of compatible candidate layouts. Layout searcher and generator 60 may also generate a number of additional automatically generated layouts to be ranked and possibly presented to the user together with the layouts located in the layout database 70 (as described in more detail herein below).

As is illustrated in FIG. 3B to which reference is now made page analyzer 44 may pre-process and analyze an incoming webpage retrieved by page spider 41 to produce candidate layouts which are filtered and ranked by layout filter and ranker 45 before being stored on layout database 70 for use for layout searching and generating as described herein above It will be appreciated that a single system 100 may comprise more than one layout database 70. The elements of system 100 are discussed in more detail herein below.

Layout database 70 may store layouts based on pages collected from multiple sources together with associated layout packages as described in more detail herein below. Layout database 70 may also store the full pages from which layouts may be extracted to be presented when required. Layout database 70 may be a user-specific layout database or a group-specific layout database or both as described in more detail herein below. It will be appreciated that system 100 may comprise of more than one layout database 70 of differing quality layouts. Typically, the best quality is that of a manually created layout, followed by layouts based on the current website building system designer sites followed by that of external designers as discussed in more detail herein below.

It will be appreciated that server 15 may be a separate server or one of the regular system servers. Some or all of the functionality of the server may also be implemented on client 5 as well (such as expanding the query based on semantic type equivalence and passing such expanded queries to the server to be resolved as described in more detail herein below).

It will also be appreciated that server 15 may also include options to explicitly insert, modify or delete layouts—so that employees of the website building system vendor may insert, modify or delete specific layouts. This may also be relevant, for example, for a user-specific layout database 70 which may allow a user to manage his or her layout repository.

Figure 4:
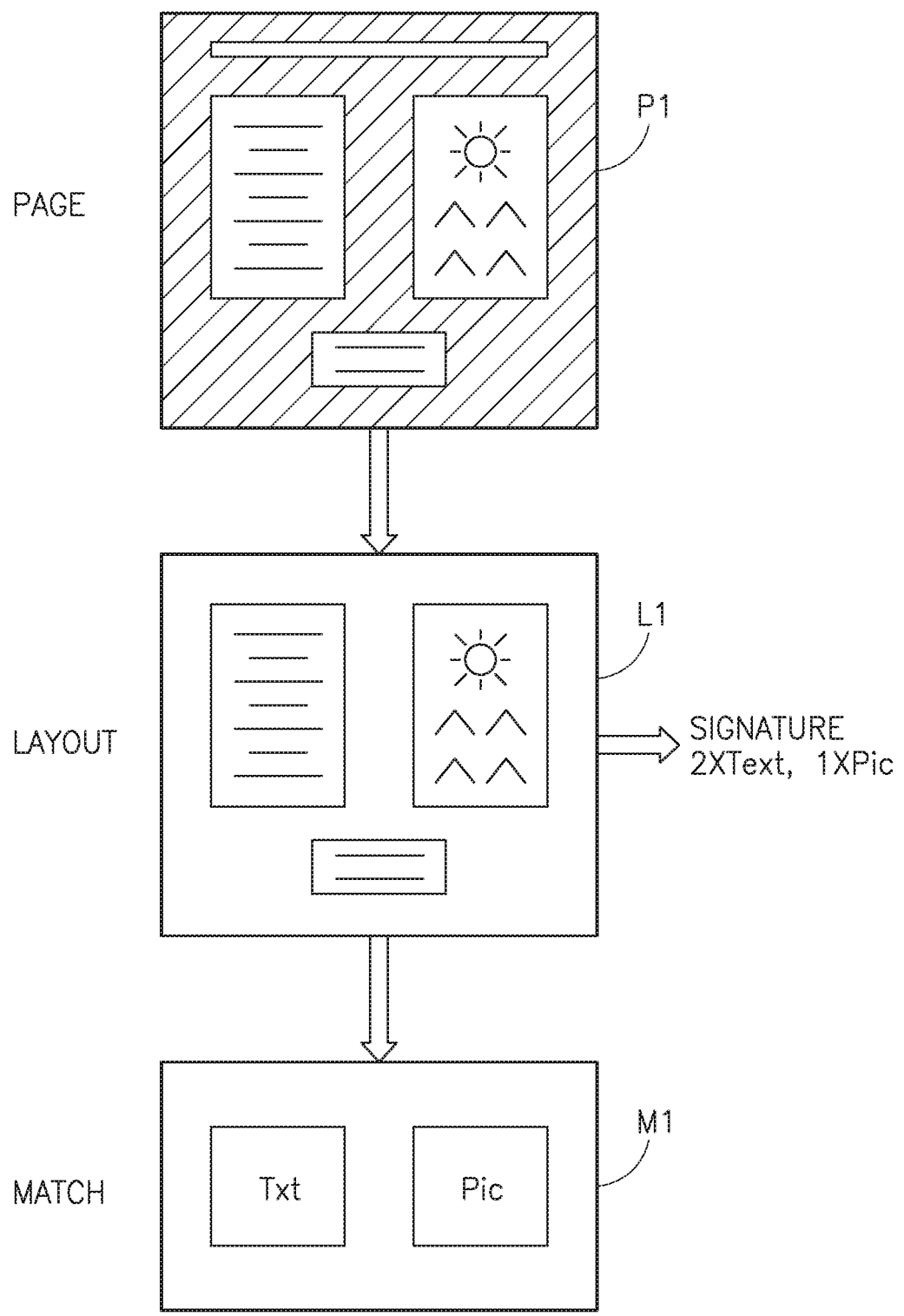
FIG. 4 is a schematic illustration of the relationship between the concepts of page, layout, match and signature, constructed and operative in accordance with a preferred embodiment of the present invention.

It will be further appreciated that architecture of system 100 may be described in terms of page, layout and match as is illustrated in FIG. 4 to which reference is now made. As discussed herein above, a signature (used for searching) may be extracted from the layout. It will be appreciated that the layout (L1) may be similar to the page (P1), but with the background and decorations removed. The signature extracted from layout L1 (as described in more detail herein below) may be compared against other signatures of pre-prepared layouts held in layout database 70. The match (M1) may be a subset of the layout fields in L1, matched against the layout fields of a selected layout from layout database 70 as described in more detail herein below.

Page P1 may be the complete visual entity handled by system 100 as shown to the user. It may be a full website building system page (as describe above), or a part thereof (if the system supports page partitioning—automatic or manual—which allows parts of a page to be handled).

Page P1 may include actual components (some of which form part of the layout L1 as shown in FIG. 4), decoration components, components from templates, a header, a footer etc. and various page-level attributes not related to any specific component (e.g. a generic background color or style guideline).

Layout L1 may be the set of actual components from P1 to be matched (on both the incoming page request side and on the layout database 70 side)—this is the level at which the layout searching and matching may be performed as described in more detail herein below. As is illustrated in FIG. 4, L1 may differ from the set of components in P1 since it does not contain any decoration components and does not contain any components which part of the matching process should not be—as determined by system 100 or marked by the user as described in more detail herein below. This could be due to their type (for example), or by an arbitrary user decision.

Layout L1 may also omit locked components. System 100 may allow a user to define locked components which are locked in position. Such locked components may not participate in the searching and matching processes (and may also be excluded from additional system processes such as dynamic layout). Layout L1 may also be limited through specific manual selection by the user, e.g. "suggest alternative layouts for components X and Y and Z only (and leave the other page components in place)".

Layout L1 may also contain new components (which are not present in P1) generated from existing page components through component splitting and uniting. L1 may also contain components generated or modified due to container processing as discussed in more detail herein below. Layout L1 may also contain information on component relationships generated through semantic analysis of the components in the page, e.g. "define component A and B as linked component pair (caption+picture) and suggest alternative layouts which have a similar linked component pair".

For all candidate layouts that are found, system 100 may match between the current user layout and a candidate layout. The subset of components (in each of the two matched layouts) may be called a match, i.e. there is a current user layout match and a candidate layout match.

It will be appreciated that the matched components on each side of the match (the handled component set of the incoming request page/candidate layout) are matched but are not identical—they may typically have different size and position and may very well have different types. There may also be remaining components on both sides—contained in the layout but not in the match. Their handling is discussed herein below.

It will be further appreciated that system 100 may maintain the two-way relationship between the various elements of page P1, layout L1 and match M1. This way any changes (in layout or content) applied to elements of Layout L1 (for example), may also be applied to the corresponding elements on page P1.

A set theory containment relationship may typically apply between the three entities, i.e. Match⊆Layout⊆Page (subject to the multiple exceptions noted above such as split/united components). However, this is not geometrical containment, i.e. non-layout components may be geometrically intermixed with layout components.

It will also be appreciated that layout database 70 may be indexed according to the signatures extracted from the layouts. Layout database 70 may also store an associated layout package containing information regarding associated pages, dynamic layout anchors, semantic links, signatures etc. together with the layouts as described in more detail herein below. Such layout package may contain the full original pages—allowing the system to easily re-extract the signatures if the signature extraction algorithm is modified. In an alternative embodiment, layout database 70 may be implemented using the layouts alone, and the minimal information need to perform semantic link matching (without any additional information)—the non-layout page components may be discarded and not stored in layout database 70.

System 100 may also store in layout database 70 a screen shot of the original page, to present to the user a "full view" of the suggested layouts, and not just an abstract layout view. System 100 may also store a pre-processed version of the layout suitable for quick generation of a preview of the suggested layouts with the user content.

It will be appreciated that system 100 may be aimed at designers using a typical website building system and as such may run within the context of the typical website building system. Thus, a large amount of data may be available to system 100—far more than that available to a layout selection system aimed at regular (non-typical website building system-based) web sites. This is particularly correct for fully on-line typical website building systems For example, system 100 may collect actual data on layouts that were displayed to designers, and the specific layouts that were actually selected, and use this data in rating layouts for display. Such statistical data may also extend to end-user (rather than designer) activities. Thus system 100 may, for example, use the information on the number of actual views for a given page (i.e. its end-user access statistics—not just designer access statistics).

As discussed herein above, system 100 aims to provide a diverse set of high-quality layout alternatives. Thus, the layout searching process does not aim to find layouts which are visually similar to the handled component set, but rather layouts which are visually different from the handled component set, but still contain a similar (or at least semantically equivalent) composition of components. An example of this may be a house built from Lego™ blocks (commercially available from the LEGO Group). If Lego creations are equated to web-pages and the Lego blocks to components, system 100 may offer the user different creations which use the same or similar set of blocks (contained in the house) but may not necessarily be in the form of a house.

It will be appreciated that a diverse set query results is desirable, i.e. relevant results which are not only visually different from the handled component set, but also differ from each other. It will be further appreciated that the results should furthermore be high-quality. Thus, system 100 may rank results according to their design quality (as described in more detail herein below), removing low quality results, and displaying the results in decreasing order of quality.

It will also be appreciated that since the last two requirements (diversity and quality ranking) interact, the actual display order of the layout found may be based on a combination of quality and diversity requirements—as well as semantic similarity to the handled component set. This way, high-diversity results (i.e. matching layouts which are substantially different from other matching layouts) may have a higher display priority than a value assigned simply based on their quality.

It will be appreciated that page spider 41 may gather and index new and updated pages, templates and manually created layouts from application repository 20. Page spider 41 may also acquire pages from external sources 25 (e.g. via the internet), keeping a retrieval link to original page for use in updates (based on integration with the website building system), and possibly a copy of the full original page. It may also acquire layouts manually created for system 100 and system templates (full-page and partial). This could be based on the amount of usage/viewing for the specific template. Page spider 41 may also acquire designer-created pages which may be created by designers internal to the website building system vendor (e.g. internal design studio) or other designers (e.g. designer arena, general designer population). It may be appreciated that in this scenario, this would be subject to privacy requirements—the designer may specify the availability of his or her layouts for other designers to use with a default privacy policy applied. Such privacy options may include "allow using pages", "do not allow using pages" and "allow using in outline format only" (i.e. removing actual content from the page). The selection of which pages to use may be further based on popularity criteria, such as only from designers having a given experience, only from designers which created more the X web sites/pages through the system or only from designers given an explicit rating above X (in systems which support designer/end-user feedback to designed pages).

The selection may also be based on the amount of use of the given page/template by the designer itself or other designers, based on the number of views for the specific page or the website containing it, based on registration/participation of the designer in a layout marketplace (as described in more detail herein below) and also based on a manual "featured layout" indication (similar to featured/promoted search results in a search engine).

It will be appreciated that page spider 41 may run just once when layout database 70 is set up, may be manually initiated, may be set to run at fixed time intervals, may be set to run when there are changes (exceeding a certain threshold) made to application repository 20, on every save or based on designer submissions.

As discussed herein above, system 100 may also support group-specific layout databases 70 which store a set of layouts for us by certain groups of users (e.g. defined by the website building system vendor or by the users themselves). It will be appreciated that for group-specific layout databases 70, Page spider 41 may collect as noted above but possibly also allow editing by an assigned group manager (e.g. a vertical market manager defined by the website building system vendor).

System 100 may also support user-specific layout databases 70 which store a set of layouts for use by given user. For user-specific layout databases 70, Page spider 41 may include arbitrary pages as desired by the user, who may manage his or her layout database content.

It will be appreciated that the aim of system 100 is to retrieve pages and create from them full page layouts (when found). It may also extract a set of possible partial layouts and may also segment the page (whenever possible) so that layout searcher and generator 60 may find matching segment layouts (and combine them) as described in more detail herein below.

As discussed herein above page analyzer 44 may analyze and pre-process an incoming webpage in order to generate layouts with associated signatures and layout packages as described in more detail herein below. Page analyzer 44 may also receive an incoming request page from a user via editor 30 together with an associated handled component set which may represent either the entire page or a partial set of components of the page in order to generate full page, partial page and segments of component with their associated signatures and layout packages as described in more detail herein below. Such pre-processing may include component splitting, unification and modification as well as the creation of semantic relationships between components which may affect any adapting later on in the process. Component modification may include container handling in particular. The pre-processing may also involve splitting the entire layout into two or more layouts (partial layouts), which may require more than one signature (as discussed in more detail herein below). It will be appreciated that page analyzer 44 may not modify the original layout of the pertinent page (which can be a handled component set or a pre-stored layout) but instead may create alternative versions with a 2-way mapping between the components in each layout. These alternative layouts may be the ones used to be presented as candidate layouts for retrieval by layout searcher and generator 60. Page analyzer 44 may include information about this 2-way mapping together with the generated layout and may include additional hints about the handling of the generated layout when matching it to retrieved layouts. The mapping and the hints are later handled by layout searcher and generator 60 as described in more detail herein below.

Figure 5:
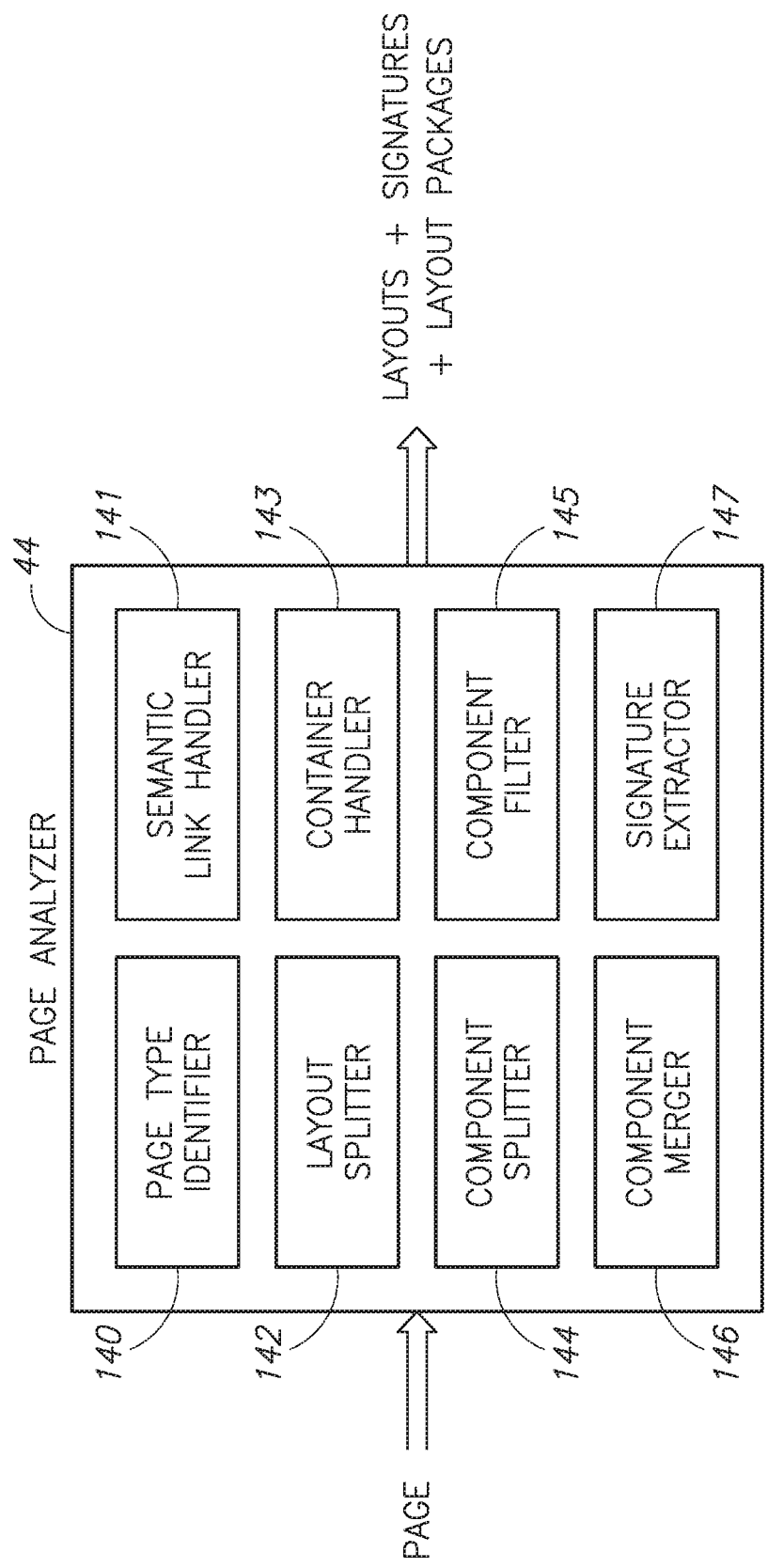
FIG. 5 is a schematic illustration of the page analyzer of FIGS. 3A and 3B; constructed and operative in accordance with a preferred embodiment of the present invention.

Reference is now made to FIG. 5 which illustrates the elements of page analyzer 44. Page analyzer 44 may comprise a page type identifier 140, a semantic link handler 141, a layout splitter 142, a container handler 143, a component splitter 144, a component filter 145, a component merger 146 and a signature extractor 147.

It will be appreciated that page analyzer 44 may support the ability of system 100 to find matching layouts for an incoming request page on one hand and may also increase the accuracy (i.e. precision of the found layouts compared to the requirements) on the other. While usually there is a tradeoff between the two, the processing performed by page analyzer 44 may include methods to increase the coverage without harming the accuracy, and other methods to improve accuracy with limited effect on the coverage.

It will be appreciated the page analyzer 44 may be used by system 100 during different stages of the process. During layout collections and indexing when page spider 41 retrieves pages for potential layouts, it may analyze them in order to produce derived layouts with associated signatures as well as other associated information which may be used later on in the process (as described in more detail herein below). During runtime, when layout searcher and generator 60 searches for suitably matching layouts for an incoming page request from a user (as described in more detail herein below), it may be used to analyze and pre-process the incoming page in order to extract the associated signatures from the handled component set ready for use for the matching process (as described in more detail herein below). Therefore, in the discussion below concerning page analyzer 44, some processes describe its use during layout collections and indexing and some during the processing of an incoming request page for use by layout searcher and generator 60.

As discussed herein above, a set of relevant components on a page may be known as a handled component set. A handled component set may be full-page representing the entire page or partial-page representing a partial section of a page. A handled component set may also represent a mere segment of a page too.

A full-page handled component set may include the set of components in the page itself which may include or exclude components inherited from a full-page template (also known as a master page). It may also include a specific full-page template or both components and a template together with the matching header and footer.

A partial-page handled component set may include just the site header or footer, the components contained in a given single-page container, the components contained in a given mini-page of a multi-page container or components defined inside list applications discussed in US Patent Publication No. 2014/0282218 entitled "Device, System, and Method of Website Building by Utilizing Data Lists" published 18 Sep. 2014, incorporated herein by reference and assigned to the common assignee of the current invention. A partial-page handled component set may also include the components in a single inherited component set template and an arbitrary subset of the components in a page (e.g. selected using multi-selection).

It will be appreciated that the set of components (in both cases) will be the one affected by the selected layout of a user, i.e. these are the components which would be moved/resized according to the selected layout.

It will also be appreciated that components coming from a template may include components from a page template (master page), common page headers/footers, component set templates and views inside list applications. Such template-originated components may participate in the handled component set for the purpose of retrieval of layouts via the given handled component set.

However, the resulting handled component set layout changes do not affect the original template since changes to the original templates layout may create unpredictable side effects on other pages using the same templates. This may be implemented by copy-on-use website building systems and inherit-on-use website building systems:

In copy-on-use website building systems, the components in the template are copied to the page upon creation, but then become regular page components and are not linked to the original template anymore. In this scenario, there is no problem in modifying template-originated components layout, as these are separate copies and the original template is not affected.

In inherit-on-use website building systems, the template-originated components displayed in the page are actually instances of the template components and retain their link to the original components (in the template). In this scenario, such components may be included in the handled component set only if the website building system implements local modifiers, i.e. the ability to create local changes to specific attributes of template-originated components, with these changes stored together with the specific instance. The layout modifications to template-originated handled component set components would then be stored as such local modifiers.

It will be appreciated that system 100 may support a notion of general page type selected from a short list of possible page types—page type taxonomy. Such taxonomy may include, for example, home page, informational page, contact form page and forum page. Page type determination may apply to both the indexed pages and the handled component set.

Page type identifier 140 may recognize the type of page to be processed and may allow the user to limit processing to only pages whose type match that of the handled component set (including pages whose type could not be determined). Alternatively, all page types may be processed. If the handled component set is a partial-page handled component set, page type identifier 140 may determine that a page type does not apply.

Page type identifier 140 may determine the page type using the page type set for the page when it was created (in the specific instance or in the template from which the page was inherited). For example, the Wix system (www.wix.com) allows the designer to select the following page types when creating a page: blank, about, services, contact, blog, gallery, site content, music and video, online store.

Page type identifier 140 may also determine the page type by using automatic recognition based on visual features of the page (as is described for example in article by Christian K. Shin, David S. Doermann—1999 "Classification of document page images based on visual similarity of layout structures" http://citeseerx.ist.psu.edu/viewdoc/download?doi=10.1.1.42.9759&rep=rep1&type=pdf).

It will also be appreciated that a page may be un-typed i.e. a designer may base it on a blank template (which has no pre-specified type), and an automatic type determination algorithm might also fail to classify a given page.

It will be further appreciated that the page type taxonomy given above refers to generic page types. System 100 may use alternate or additional page type taxonomies, such as these referring to vertical markets (e.g. musicians, photographers etc.). In this case page type identifier 140 may analyze the semantic structure of the page and actual content (e.g. text or image field content) to determine a detailed page type and use this type for later layout database selection and querying (e.g. having a specific layout database for musician web sites etc.).

Semantic link handler 141 may implement semantic links which connect two or more components. These may be used by component merger 146 and component splitter 144 as discussed in more detail herein below. It will be appreciated that semantic links connect components which were related in some way in the original layout or page, including (for example) components identified as related or "should be nearby" during page pre-processing, such as an image and its associated caption.

Semantic link handler 141 may also implement a semantic link which does not allow an interfering component (of specific types or of any type), i.e. it is permissible for linked component A and B to be further from each other, as long as no component C (of a given type or of any type) is between them.

Semantic link handler 141 may also connect components created due to component splitting, such as a text component which was split into two text components (heading and body components). Semantic link handler 141 may also connect components based on existing dynamic layout anchors connecting the two components.

It will be appreciated that semantic links may be used later on in the matching process so that when a component matching is performed (i.e. components in the handled component set and the candidate layout are matched), priority is given to satisfying the semantic link requirements as described in more detail herein below.

Semantic link handler 141 may also implement multi-component semantic types such as the ImageWithCaption-Text semantic type. Such types provide an additional way to represent the existence of a semantic link between multiple components, and match such semantically-linked components with similar sets of semantically-linked components in other layouts.

Figure 6:
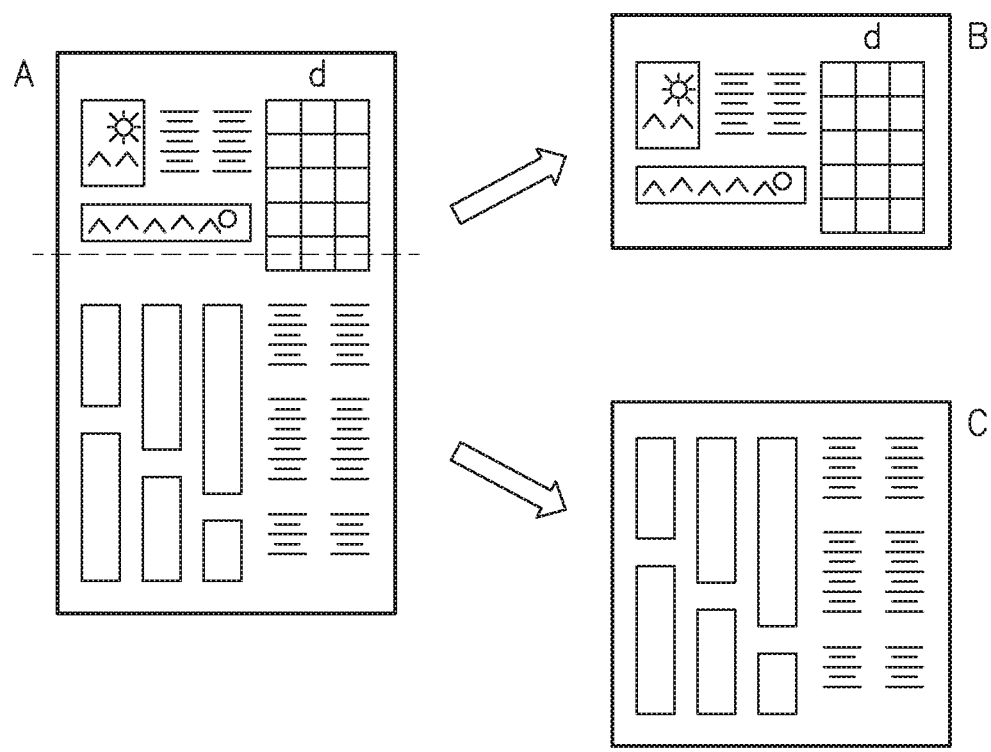
FIG. 6 is a schematic illustration of layout splitting for an end-to-end intersection case, constructed and operative in accordance with a preferred embodiment of the present invention.

Layout splitter 142 may perform layout splitting if the layout can be easily divided into two or more sub-layouts. For example, a two-way horizontal or vertical splitting may be used based on the H/V slicing algorithms described US Patent Publication No. 2015/0074516 entitled "System and Method for Automated Conversion of Interactive Sites and Applications to Support Mobile and Other Display Environments" published 12 Mar. 2015, incorporated herein by reference and assigned to the common assignee of the current invention. Such splitting is further demonstrated in FIG. 6 to which reference is now made. Layout A is split into two sub-layouts B and C which are used for further layout searching. It should be noted that component d in layout A is assigned to layout B even though some part of it crosses into the area "covered" by layout C.

Figure 7:
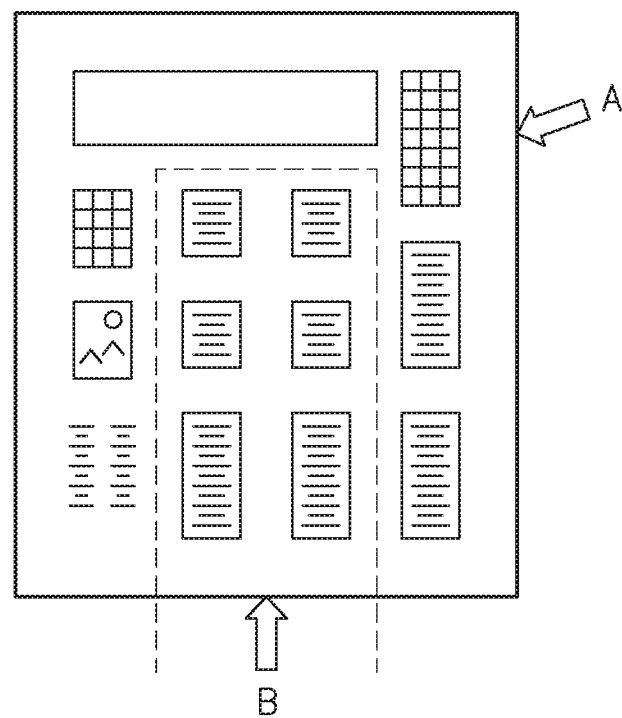
FIG. 7 is a schematic illustration layout splitting for a complex margin/content case; constructed and operative in accordance with a preferred embodiment of the present invention.

Layout splitter 142 may also apply a more complex division, such as the one demonstrated in FIG. 7 to which reference is now made, which is based on locating "clear pathways" through the split layout, rather than using end-to-end intersecting lines. In this example, layout splitter 142 splits the "frame/margins" area A from the "internal content" area B—possibly representing menus and content area respectively. Layout splitter 142 may also implement separation of an internal region from its enclosing "frame".

Layout splitter 142 may apply various limits and parameters, e.g. minimal number of components per split region and may also split pages by visible page structure, employing image processing techniques such as analysis of regions having higher level of "activity" or more details.

It will be appreciated that the discussion above regarding layout splitter 142, covers the scenario in which a user may request from system 100 an alternate layout for an arbitrary subset of the components in page.

Furthermore, layout splitter 142 may divide the page into segments in any manner (such as illustrated in FIG. 7), and system 100 may try to locate alternative layouts for each of the segments. Suggested layouts may in general be adaptable to any required target area size. However, in practice, there could be many constraints and limitations on the possible target sizes, e.g. due to objects having specific size or aspect ratio limitations (such as pictures which need to retain their aspect ratios, third party applications which only provide instances with specific sizes, Facebook like buttons which can only be displayed in certain sizes etc.)

Thus, in both cases above (arbitrary handled component sets and arbitrary page segments), the located alternative layouts may not be accurate or easily adaptable to the target area. In particular, since system 100 does not know in advance what the expected target area size for the layout is, there is no way to manually create in advance high-quality layouts which are optimized for a given target area size.

Furthermore, in the first case (in particular) there may be additional components (not included in the handled component set) which intersect with the suggest layouts. In such a case, even if the system locates layouts with the same dimensions as the handled component set, these layouts may likely intersect with the additional components and may create a non-aesthetic result.

However, many web sites are vertically-oriented—they have a fixed width and the pages can only be scrolled vertically (if at all). This is a direct result of the well-known propensity of web user for pages which only scroll vertically. Furthermore, the fixed width is typically selected from a very small set of common predefined widths (e.g. matching the typical display screens' horizontal resolutions). Thus, a variant of the system can be optimized for this common case of vertically-oriented pages using a width selected from a small set of predefined widths.

In this variant, websites are created using one of predefined widths (though the pages may vary in height) and are marked with this width.

Manually created layouts are also created and optimized for one of the predefined widths and are marked as optimized for the given width.

Layout searcher and generator 60 may search for layouts limiting the search to layout marked with a given width—the one associated with the web site.

When selecting a handled component set, the user may only select an entire page or a full vertical segment of a page (which include all of the components in a given vertical range [y1 ... y2]). The containment definition may refer to components fully contained in the range, or to components intersecting the range. Thus, layout splitter 142 is limited to splitting the page vertically, i.e. using end-to-end horizontal line to cut it into full-width segments.

Thus, when searching for candidate layouts, system 100 can be sure that all suggested layouts will fit their position in the page perfectly. Since the page width is identical to that of each handled component set or segment, layouts created for full pages will also be used (and are optimized) for each such handled component set or segment.

Furthermore, since each segment essentially includes all components between y1 and y2 (y1<y2), when system 100 replaces the segment with a suggested layout, the components above the segment ($y_{bottom}$<y1) may remain the same, and the components below the segment ($y_{top}$>y2) may follow directly the new layout of the affected segment, regardless of the new segment layout's height. Thus, there would be no overlapping between unaffected components and the new segment layout on either x or y axis.

Container handler 143 may implement a number of methods for the handling of container components. In order to lower the amount different page signatures (and by that, cover more user pages), container handler 143 may remove containers, add them or join them together. Container handler 143 may create a modified version of the page which may include change or removal of components (and of containers in particular), as well as the re-rooting of components, e.g. re-assigning a component belonging to a container X so that it belongs to the parent page or to a different container Y. Container handler 143 also creates a two-way mapping between the original page and the modified page, so that any later component matching performed against the modified layout could be combined with the mapping to create a component matching for the original page.

It will be appreciated that the methods employed by container handler 143 described below may be applied to the processing of both the handled component set and layout database 70 (as discussed in more detail herein below) Both the handled component set and layout database may use multiple methods, and container handler 143 may also implement a method (or a combination thereof) for the handled component set which is different from that implemented for layout database 70.

Figure 8:
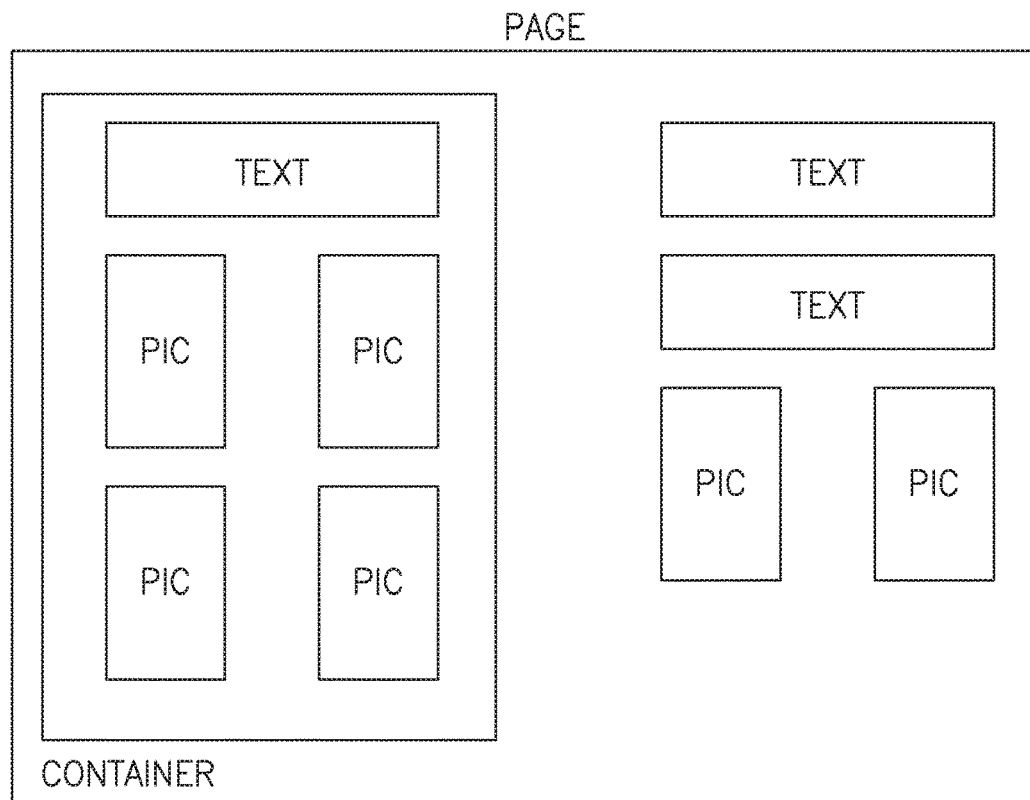
FIG. 8 is a schematic illustration of a page layout which includes a container component.

The following paragraphs discuss each specific method, and then discuss under what conditions and in what ways these methods be combined or otherwise used together. Reference is now made to FIG. 8 which illustrates a simple layout showing one container with one text element and four pictures, and additional text elements and pictures outside of the container.

The first method is hierarchical signatures. In this method, container handler 143 may retain the hierarchical structure of the container and this is reflected in the hierarchical signature as described in more detail herein below. For example, the (string-representation) signature for the component set of FIG. 8 may be "1×Container(1×Text,4×Pic), 2×Text,2×Pic".

It will be appreciated that system 100 in general may regard all container types as a single semantic type (e.g. have only one "container( )" keyword). Alternatively, system 100 may support multiple container semantic types, creating signatures such as "1×Gallery(1×Text,2×Pic),1×Box(2× Text)".

Figure 9:
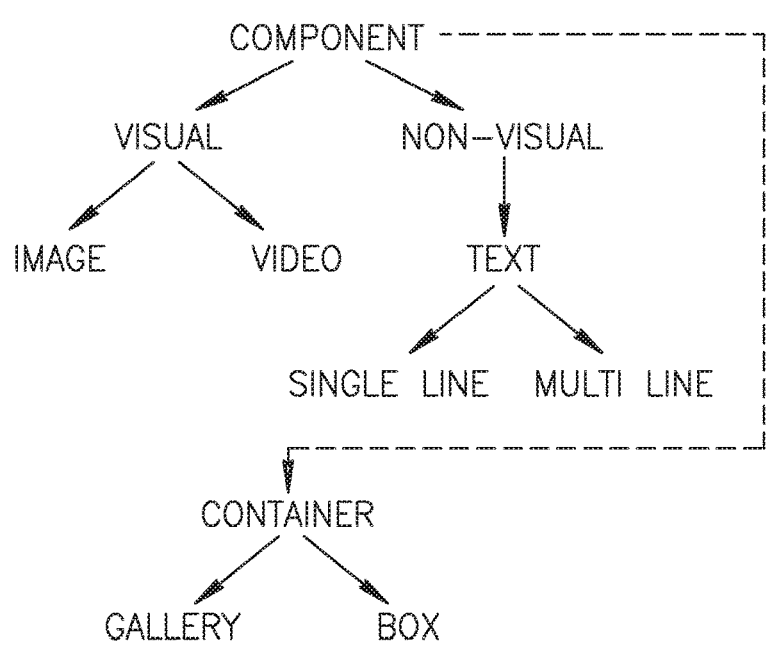
FIG. 9 is a schematic illustration of a semantic tree which includes container types.

It will be appreciated that a semantic type tree is a tree of type in which similar types are united under a parent node which represents a more abstract type matching any of the sibling types (e.g. "visual" can match to both "image" and "video") as is illustrated in FIG. 9 to which reference is now made. It will be further appreciated that an abstraction process is a process in which a signature (defined using a series of types and quantity of object of each type) may be transformed by replacing each type with a more abstract parent type (in reference to a given semantic type tree).

In this scenario, the container types may also be included in the semantic type tree, and the abstraction process may apply to them as well.

Container handler 143 may also implement identical sub-tree merging (similar to the use of common sub-expression elimination in compiler optimization technique). In this scenario, a signature of the form "1×Container(1×Text,4× Pic),1×Container(1×Text,4×Pic)" would be folded into "2×Container(1×Text,4×Pic)". Such folding may occur during the abstraction process, as multiple container types (e.g. the "Gallery" and "Box" above) are both abstracted into the higher level type "container", as is shown in the signature sequence below (using the type hierarchy defined in FIG. 9):

| Stage | Signature | Comment |
| --- | --- | --- |
| 1 | 1×Gallery(1×Image,2×Single Line), 1×Box (1×Image,2×Multi Line) | Initial configuration |
| 2 | 1×Gallery(1×Image,2×Text), 1×Box (1×Image,2×Text) | Both single and multi-line converted into text |
| 3 | 2×Container(1×Visual,2×Non-visual) | Gallery and box converted into generic container, and then folded |
| 4 | 2×Container(3×Component) | Using generic components in container |

Container handler 143 may match containers represented in hierarchical signatures to containers in the located layout in multiple ways (at the actual component matching stage). For example, a page with two containers (A, B) having similar underlying content may be matched against a located template with two containers (C, D) in two ways (A-C, B-D or A-D, B-C).

It should be noted that (as shown in FIG. 9) that the hierarchy for container components is essentially separated from that of regular components, a container would not be abstracted into a regular component.

Figure 10:
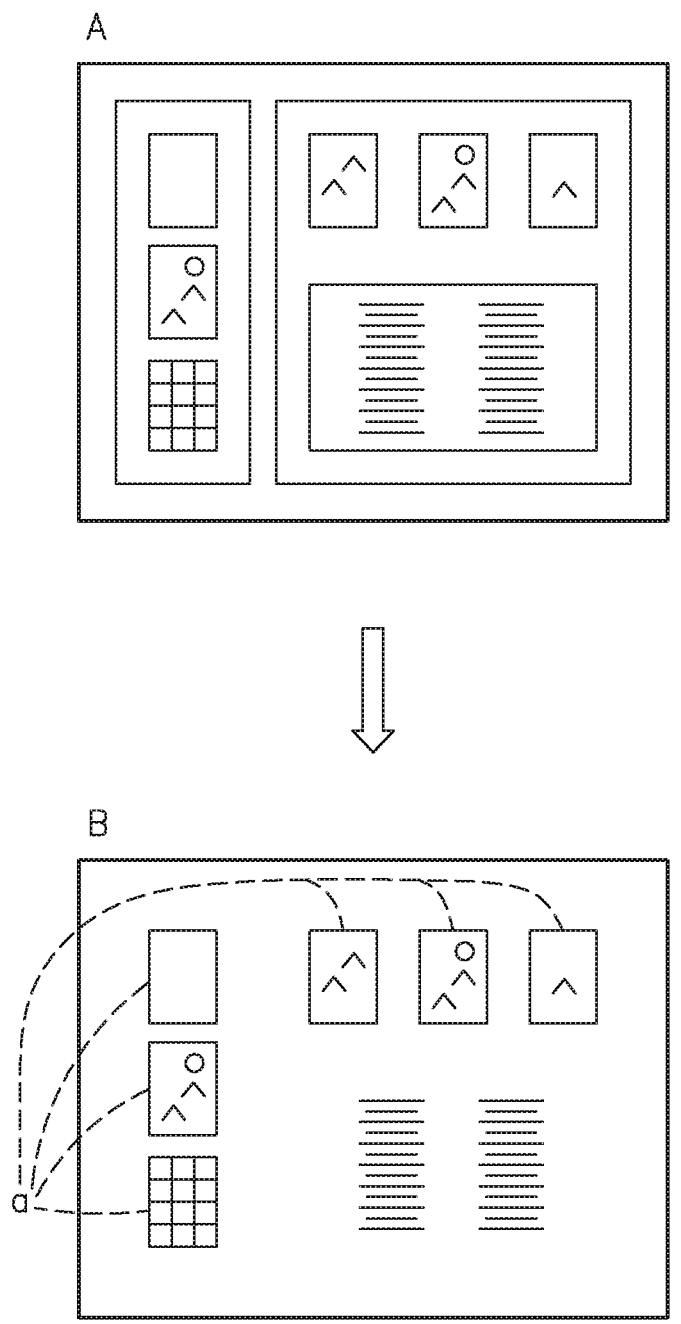
FIG. 10 is a schematic illustration of container flattening; constructed and operative in accordance with a preferred embodiment of the present invention.

Container handler 143 may remove containers (at all levels) so that all components reside directly in the containing page. This requires changing the x and y coordinates of all fields so that they would be relative to the main page instead of the "flattened" container. Reference is now made to FIG. 10 which illustrates an example of container flattering. Layout A may be converted into a simplified layout B, removing multiple containers in the process. Note that some components (marked with 'a') may have associated frames which may be retained.

Container handler 143 may match components against layout components of arbitrary locations, so the general structure (and container hierarchy) of the layout would not be preserved.

Figure 11:
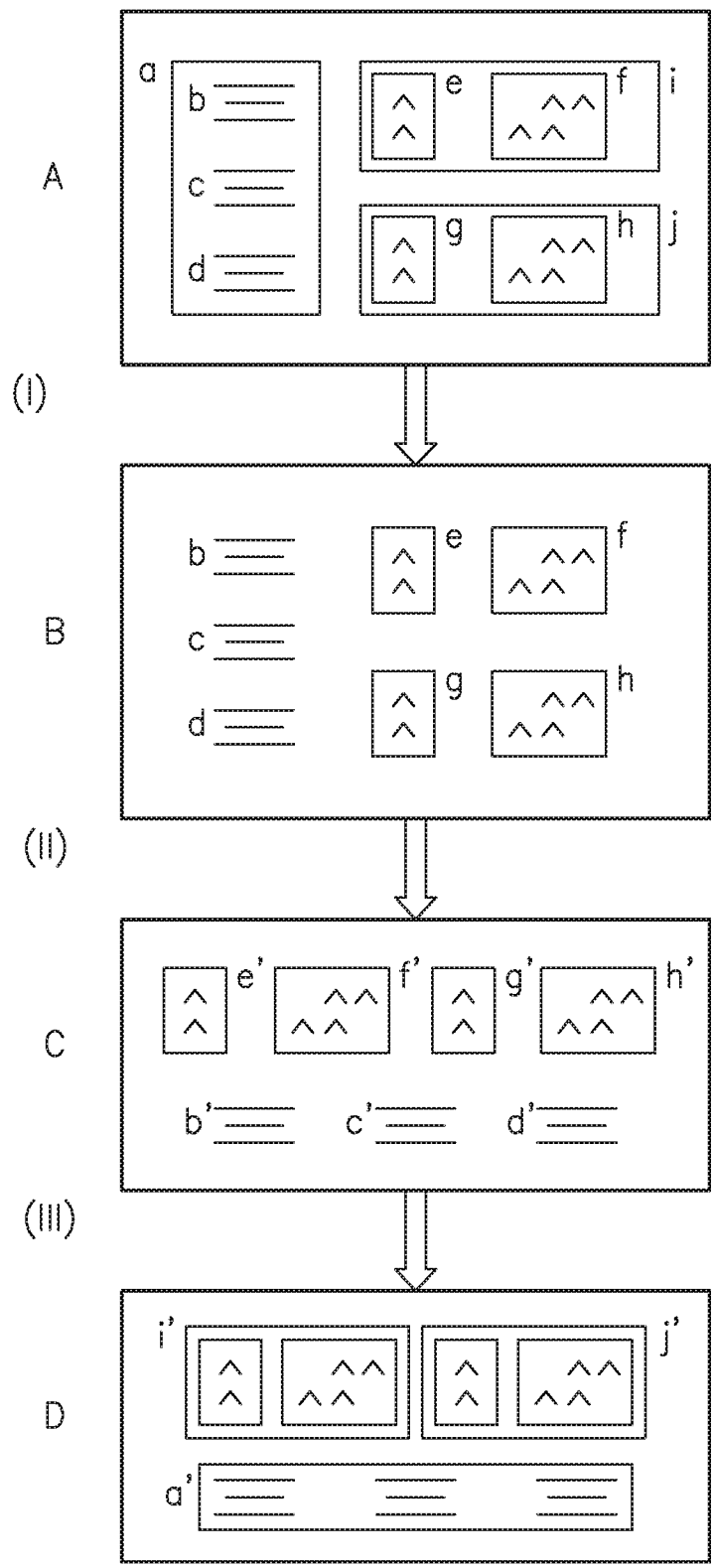
FIG. 11 is a schematic illustration of container flattening and reconstruction; constructed and operative in accordance with a preferred embodiment of the present invention.

Container handler 143 may also flatten containers and search for a layout according to the separate contained components (as in the regular container flattening method described herein above). However, when a match is found, for each set of components in the located layout which match original layout components from a single container, container handler 143 tries to reconstruct a new container which tightly wraps the matching components in the located layout as is represented in FIG. 11 to which reference is now made. Original layout A comprises containers a (containing components [b, c, d]), i (containing components [e, f]) and j (containing components [g, h]).

Container handler 143 may perform the flattening phase (I) to create a simplified (flat) layout [B] in which the non-container components [b, c, d, e, f, g, h] all reside at the top page level. Container handler 143 may keep a component/container mapping between A and B.

Container handler 143 may then perform a search and component matching phase (II) in which it locates a layout C which has the matching components [b', c', d', e', f', g', h']—which are arranged in a different way than the original components in layout B.

Based on the A⇔B mapping and the B⇔C component matching, container handler 143 may perform a container reconstruction phase (III) in which new containers [i', j', a'] are generated to create a modified layout D. For each set of components in C which match a set of components in B that was originally in the same container (e.g. the set [b', c', d'] which match [b, c, d] originally in container a).

Container handler 143 may create a tightly wrapping rectangle around the components using a minimal enclosing rectangle. Container handler 143 may then expand the enclosing rectangle by a given pre-specified margin (possibly modified based on available space, container size, component sizes, component spacing and other geometrical parameters).

Container handler 143 may create a new container (e.g. a') which wraps the matching components ([b', c', d'] (in the example) based on the generated rectangle. Thus, container handler 143 may reconstruct a variant or the original structure. Note that as shown in FIG. 11, the generated containers [i', j', a'] have different sizes and positions than the original [i, j, a]. Furthermore, in systems which support multiple container types, the specification for layout database 70 layout C may include guidelines for container creation (e.g. container types and other attributes) used when creating the new containers.

Figure 12:
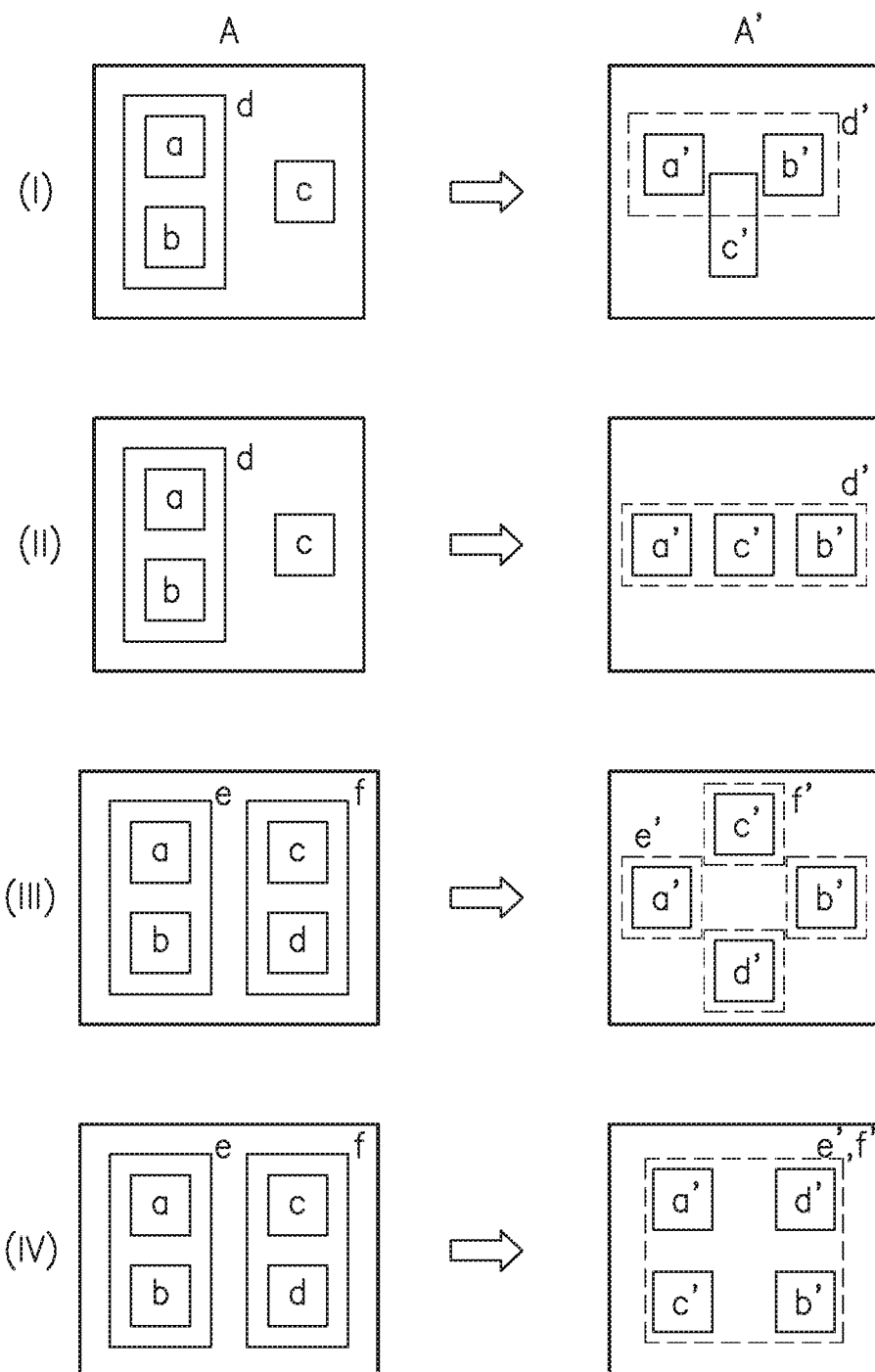
FIG. 12 is a schematic illustration of problem cases in container flattening and reconstruction.

Reference is now made to FIG. 12 which illustrates a number of cases in which container flattening and reconstruction may be difficult or outright impossible. In each of the illustrated scenarios, [x'] represents an object (component/container) which is located in a suggested layout and matched to the original object [x] in the handled component set.

In scenario (I), in the original layout A, the original component c was outside of the original container d. However, in the matched layout A' the matched component c' intersects the reconstructed container d'.

In scenario (II), in the original layout A, the original component c was outside of the original container d. However, in the matched layout A' the matched component c' actually overlaps the reconstructed container d'. It will be appreciated that in spite of this overlap c' may be logically separate from (and not contained in) d' so for example if d' is moved c' will not move it with it.

In scenario (III), in the original layout A, the original containers e and f are disjoint. However, in the matched layout A' the constructed containers e' and f' intersect.

In scenario (IV), in the original layout A the original containers e and f are disjoint. However, in the matched layout A' the constructed containers e' and f' are "mixed"— each of them containing some components belonging to other container as well. In fact, e' and f' may become almost identical, or one of them may contain the other.

It will be appreciated that there may be multiple problem cases involving different containers, and there may be different problem cases at different containment levels.

Container handler 143 may attempt to resolve the simpler cases (e.g. scenario (I) above) by moving or modifying the size of the container (and its contained components) or the intersecting components. However, not all cases may be resolved, and container handler 143 may be required to filter out the un-resolvable cases.

Container handler 143 may apply single component container handling to a container with a single contained component—it may be regarded as an instance of just the contained component, e.g. Container(pic)➔pic. This is different from flattening of the single-component container (as described above), since the original contained component is replaced with a new version having the size of the container in the original layout (rather than the size of the original contained component).

Container handler 143 may deduct a given margin (fixed parameter or relative to container size) from the container size after the matching process (as discussed in more detail herein below) to get the size of the final matched component.

Figure 13:
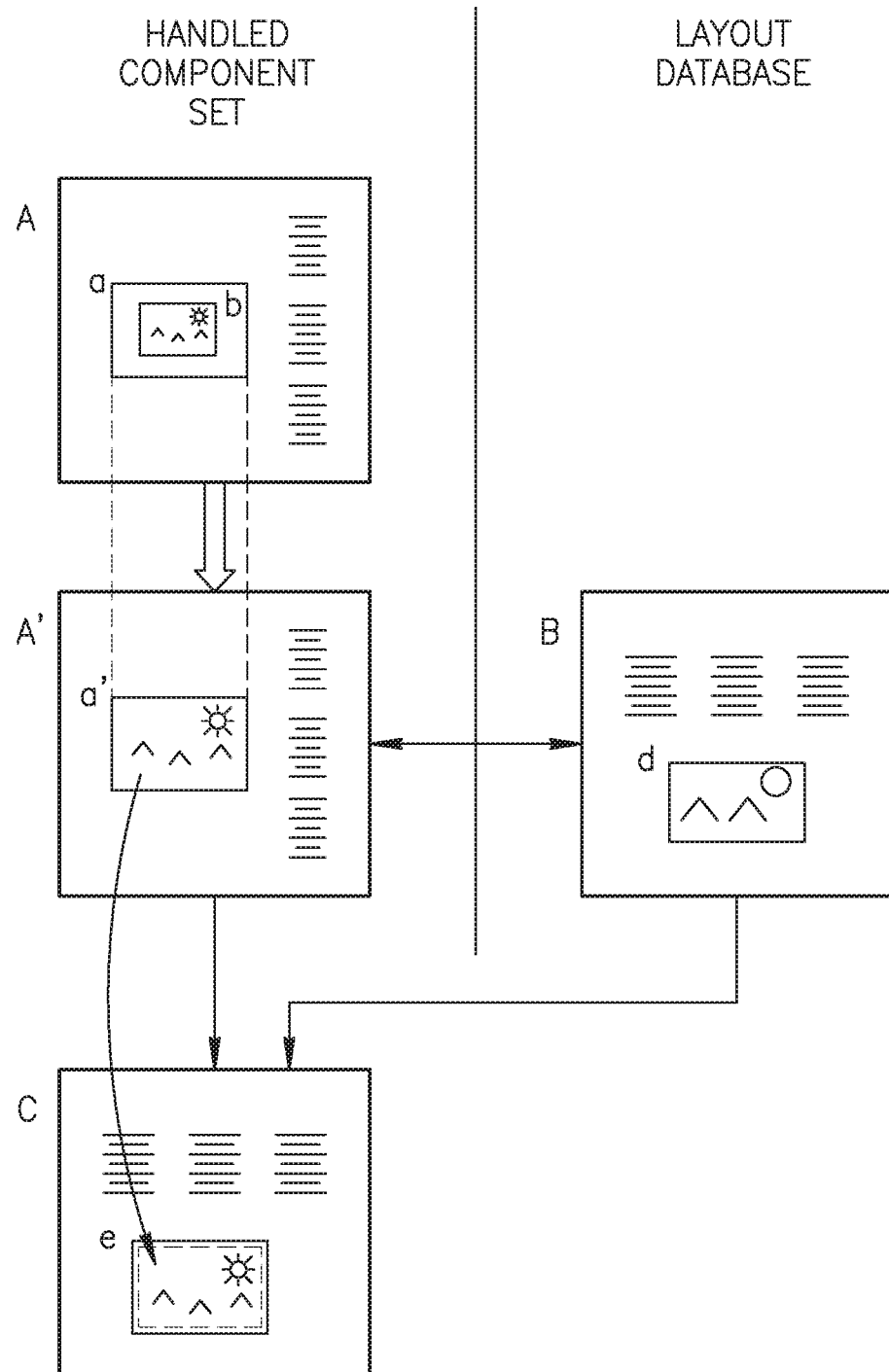
FIG. 13 is a schematic illustration of single component container expansion and matching; constructed and operative in accordance with a preferred embodiment of the present invention.

Reference is now made to FIG. 13 which illustrates single component container expansion and matching. The handled component set A includes a container a with the single picture component b (and also three text fields on the right). Container handler 143 may pre-process A into A' which includes the single (expanded) picture component a' having the same size and position as the pervious container a (as well as the 3 text fields).

Container handler 143 may then match A' with the layout B from layout database 70 which has a larger picture field on the bottom d, as well as 3 text fields on the top.

Container handler 143 may then merge the selected layout B and the content from A' to form the new page C. In page C, container handler 143 uses the area e at the lower part of the page, matching the field d from page B. However, e is reduced by a given margin to form the somewhat smaller picture field f which would contain the picture in a'.

Container handler 143 may also perform dominant type selection. Under this method, container handler 143 may assign each container (recursively) the dominant component type of the components inside it and may replace it by a virtual component having the same type.

Container handler 143 may select this dominant type according to (for example) the type of the largest component type, or according to majority voting based on total count/area of components of each type. A threshold may apply, therefore, for example only, if a text component covers over 60% of the container area the container may be declared as a "text container".

It will be appreciated that dominant type selection is better performed in the semantic type space (which is already somewhat "normalized") than in the component type space. Container handler 143 may also use the semantic tree type mapping, to go "up the tree" as much as required for a unified container type to emerge.

Thus, referring back to FIG. 13, assuming the container a is converted to a virtual picture component (as it contains 4 picture components and just one text component), the resulting signature may be: "1×Text,3×Pic"

Container handler 143 may typically assign an empty container (or one that contains only components filtered out during signature extraction) a default type (e.g. visual).

Figure 14:
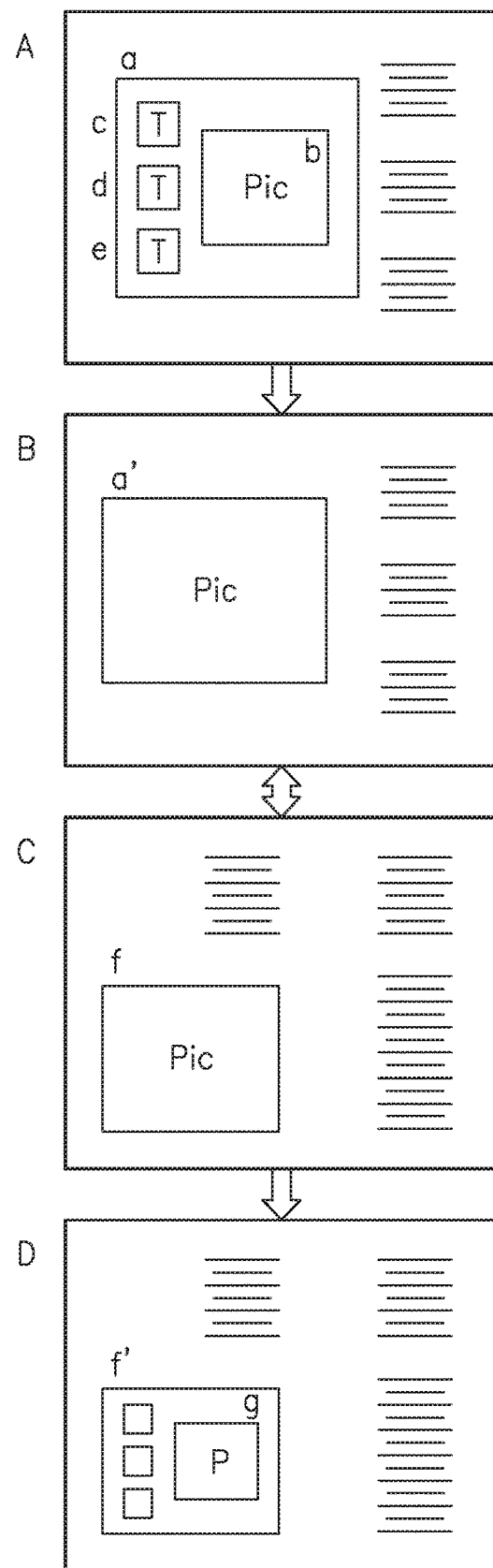
FIG. 14 is a schematic illustration of matching a virtual component generated following dominant contained component detection; constructed and operative in accordance with a preferred embodiment of the present invention.

It will be appreciated that when container handler 143 performs the dominant type selection method on the compared layout (handled component set) side, the matching process may require resizing. Reference is now made to FIG. 14 which illustrates single component container expansion and matching—layout A has container [a] which contains a dominant picture component [b] (as well as non-dominant text components [c,d,e]).

Container handler 143 may convert layout A to the non-hierarchical layout B which has a single picture component a'. Layout B is matched (as described in more detail herein below) against a selected layout from layout database 70 originated layout C which has the single picture component f matched to a'. It will be appreciated that a' and f' have different sizes (and positions).

Container handler 143 may then map the original container a (with its contained components b,c,d,e) into f to create the container f'. It will be appreciated that these mappings required the resizing of all components contained in a, and in particular b is resized to form the new picture component g to preserve the aspect ratio.

It will also be appreciated that not all components may be re-sized at all (such as a Facebook "Like" button or an iframe containing a non-resizable third party application). Also, the width change of a text component may cause a height change so that the aspect ratio cannot be maintained. Matching using the dominant type selection method requires that all components in the container be re-sizeable. Thus, if a single component inside the container is not re-sizeable, the method cannot be used.

Container handler 143 may also be implemented using recursive implementation. This method can be viewed as the opposite of container flattening. Under this method, container handler 143 may index and handle container content separately. Thus, container handler 143 may "stop" at container boundaries and may only handle the elements directly associated with the top level page. Container handler 143 may analyze the content of each container separately and signature extractor 147 may generate a separate signature. Container handler 143 may therefore regard a container as yet another component type which can be indexed and matched (including type abstraction between multiple container types). Thus, instead of having a single hierarchical signature (as in the method noted above), signature extractor 147 may generate a tree of signatures—one for the top page and one for each container contained in it (directly or indirectly).

Figure 15:
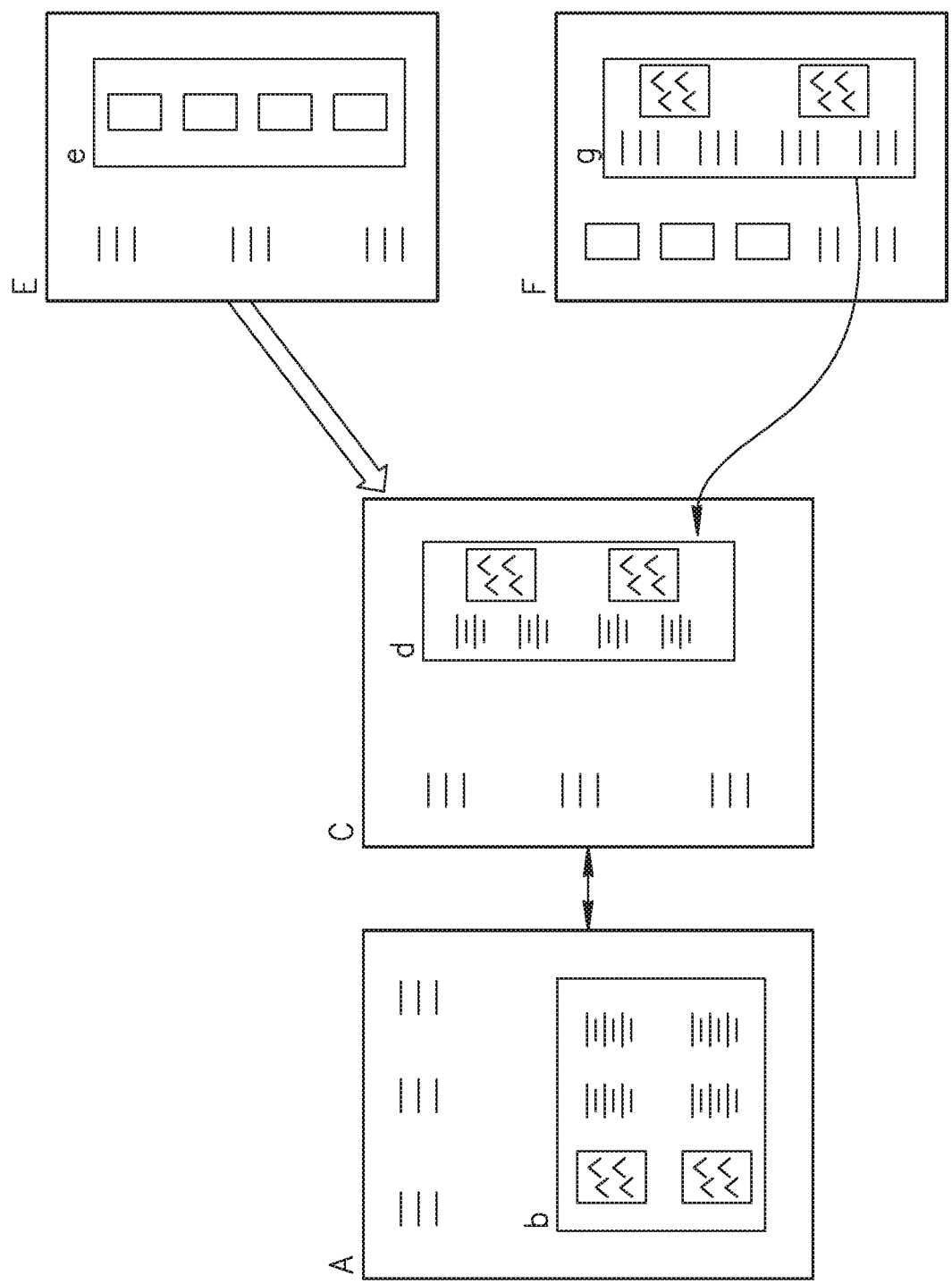
FIG. 15 is a schematic illustration of a suggested layout construction for the recursive application method of container handling; constructed and operative in accordance with a preferred embodiment of the present invention.

It will be appreciated that in this manner, container handler 143 may combine a page design from one layout with container designs from other layouts. Reference is now made to FIG. 15 which illustrates layout construction for the recursive application method of container handling. For page A which includes container b, system 100 may suggest the layout C with the container d. This layout (C) was constructed based on the layout E of which the structure of internal container e is not a good match for b, replacing the internal layout of e with the internal layout of the container g which is part of a different layout F. It will be appreciated that the main page design of F is not a good match for A, so system 100 cannot suggest F by itself.

Container handler 143 may perform this mixing process in a number of ways, such as by selecting automatically the best option for each container in each suggested layout (based on a scoring algorithm) or by selecting the top options for each container in each suggested layout and using a hierarchical user interface where the designer selects a given suggested layout, he would be prompted to select (recursively) an appropriate layout for each of the containers in the higher-level selected layout.

Container handler 143 may also locate the best combinations by selecting the top suggested layouts for the main page. For each container in each of the selected layouts above, container handler 143 may select the top suggested layouts for the container.

Container handler 143 may also create all possible combinations (each suggested page layout with each suggested container layout). It will be appreciated that this number may be large as a single page may have multiple containers (with multiple suggested layouts for each container).

Container handler 143 may also rank all possible combinations using the scoring function—ranking the page globally (including the specific container configuration and the internal layouts). Alternatively, container handler 143 may select the top z combinations and display them to the designer for final selection. It will be appreciated that this method is highly suitable for multi-page containers, in which a container might have numerous possible internal configurations (i.e. for each possible mini-page).

It will be further appreciated that container handler 143 may also combine the methods as described herein above i.e. by using hierarchical signatures, container flattening, container flattening and reconstruction, single component container replacement; dominant type selection or by recursive implementation.

In an alternative embodiment, container handler 143 may use multiple methods simultaneously. For example, the container handler 143 may use hierarchical signatures as well as container flattening—creating multiple sets of signatures for both layout database 70 and the handled component set. It will be appreciated that layout searcher and generator 60 may try to use both methods and suggest the best results to the user by combining the results.

Container handler 143 may also mix methods. For example, using container flattening (with or without reconstruction) on the layout database 70 side (on server 15) and dominant type selection on the handled component set (client 5) side.

Container handler 143 may also combine flattening with recursive implementation, so that some containers may be flattened, and some may be handled using a recursive implementation. Flattened containers may include (for example): single component containers, containers with highly dominant type, containers with a given attribute or type, containers with no semantic links or other relationship between their contained components, containers that have sufficiently simple content according to a predefined complexity metric.

In general, system 100 may match either a flat handled component set signature to flat layout database signatures, or a hierarchical handled component set signature to a hierarchical layout database signature.

It will be appreciated that the main factors to be considered by system 100 when selecting a single method may include, the importance of the container structure to the designer and how much the designer would like to preserve the container structure (e.g. based on knowledge of the user, the profile of the user, the pattern of system use etc.), the level of recall (the use of a hierarchical signatures provides for more exact matches, but lower recall, i.e. less retrieved results) and the quality of the located layouts—as system 100 may use multiple methods and select the best results located.

It will be appreciated that container handler 143 may also adapt container flattening to a method whereby the layout may be flattened, and the specific atomic component may be used to construct, and automatically generated layout as described in more detail herein below.

It will be further appreciated that container handler 143 may adapt recursive implementation to handle containers as yet another rectangular component to be arranged in lines, along a curve, in columns etc. Container handler 143 may also create additional automatically generated layouts (as described in more detail herein below) by re-arranging components inside the container.

Figure 16:
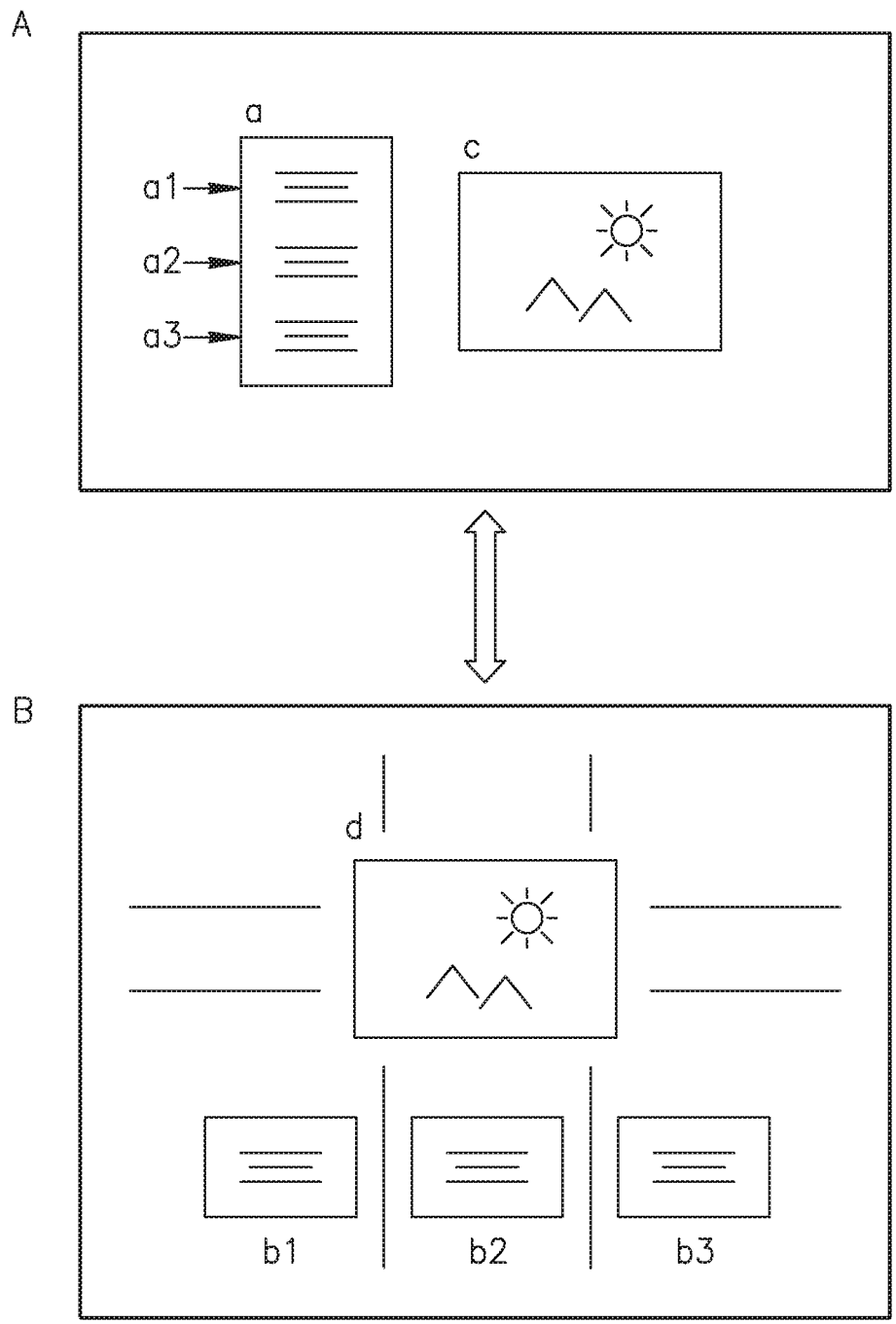
FIG. 16 is a schematic illustration of layout to layout mapping made possible through component splitting; constructed and operative in accordance with a preferred embodiment of the present invention.

Component splitter 144 may detect and implement component splitting, e.g. based on the content of the relevant component in order to provide better coverage (i.e. the ability to find matching layouts). This may be done, for example, when a text component contains a clearly separated heading and body text—which are separated into two text components. This may also be done when a text component contains multiple and clearly separate text paragraphs such as is illustrated in FIG. 16 to which reference is now made. Such splitting may allow matching the layout [A] containing the text component [a] with three distinct text paragraphs ([a1], [a2] and [a3]) into the layout [B] (as described in more detail herein below). The picture [c] would be matched into the picture [d], and the tree paragraphs ([a1], [a2] and [a3]) would be mapped into the three separate text components [b1], [b2] and [b3].

Component splitter 144 may create a "should be near to each other" (or a "do not place an interfering component in the middle") semantic relationship between the two created components. Such a semantic relationship may be used during the matching process (when creating possible matching) or by layout filter and ranker 45 (to filter out less desirable matches) as described in more detail herein below).

Component filter 145 may filter out some components for signature extraction (as described in more detail herein below in relation to signature extractor 147). This may be based on components which are too small (i.e. below a certain area/size threshold), specific component types which are always ignored (e.g. decoration components), specific components marked to be ignored by the designer of the page (e.g. locked components), specific components marked to be ignored in the template(s) underlying the page or may be based on semantic/content analysis of the component (as further described in US Patent Publication No. 2015/0074516), which may recognize (for example) pictures which serve as background decoration only, or text fields containing ASCII graphics content (e.g. a separator line created using "------" or "_____"). In such cases, these components are ignored by signature extractor 147 and during matching and adaptation as discussed in more detail herein below.

Component merger 146 may unite different components for the purpose of layout processing and for signature extraction by signature extractor 147 (as described in more detail herein below) in a number of different ways in order to provide better coverage for system 100. It may replace the components (in a copy of the original layout) with a single virtual component. Component merger 146 may also retain the connection between the new virtual component and the multiple components it replaced. Alternatively, semantic link handler 141 may create a semantic link structure involving all of the related components and manage these in parallel with the extracted signatures. It will be appreciated that semantic linking and component merging are related but not identical concepts. Semantic link handler 141 may define two separate components which are related (but are not merged for the handled component set). For example, two components which had a dynamic layout anchor between them but are not adjacent to each other or otherwise semantically related. Component merger 146 actually replaces two (or more) components in the page by a single component in the creation of the handled component set, retaining a link to the original (separate) components.

Component merger 146 may provide multiple optional methods to unite components, which are activated based on user settings or on the specific parameters of the layouts involved. These may include any of the methods detailed below:

Component merger 146 may merge components which are highly overlapping (e.g. above a given percentage of their area) into a single component, using the smallest enclosing rectangle as the new component size and position. The component type is determined based on the dominant component types, as described below for container type determination.

Component merger 146 may merge adjacent components which have identical or similar type. One example is image stitching—component merger 146 may stitch image components which are adjacent (horizontally or vertically) into a single image component for the purpose of analysis. This may depend on the size and distance of the components. It may also depend on analysis of the content of the image component (e.g. having similar colors, patterns or features at the touching edge). Another case is text stitching, similar to image stitching as noted above. This may be relevant only to text components which are vertically (rather than horizontally) adjacent, as there is no good way to merge the text content of two side-by-side components.

Component merger 146 may employ semantic analysis to detect related components, such as an image and its caption field. Such components are left separate, but component merger 146 may create a "should be near to each other" semantic relationship between the two (alternative layouts are still applicable in such cases, e.g. replace a layout of "captions below images" with one of "captions above images").

An additional scenario is having a set of components which together emulate a gallery. For example, a set of 9 image components arranged in a 3×3 form may not be suitable for stitching, e.g. due to the distance between adjacent images being too large. Instead, component merger 146 may convert the arrangement into a 3×3 image gallery component.

Signature extractor 147 may extract a semantic signature representing layouts generated on the incoming page and/or layout (both handled component sets and stored layouts) and may perform searching and comparisons using these signatures. It will be appreciated that signature 147 may use information retrieved by the other elements of page analyzer 44 as described herein above.

Figure 17:
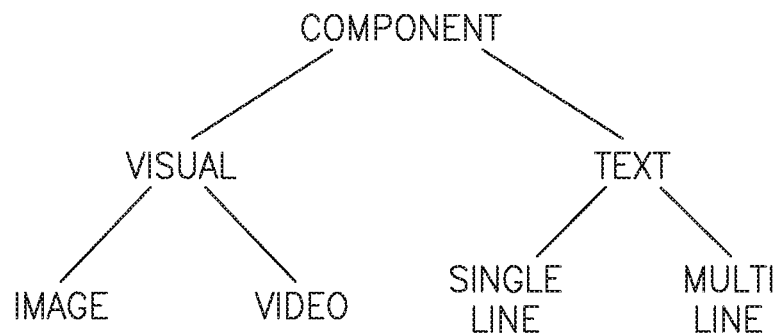
FIG. 17 is a schematic illustration of a simple semantic tree.

Signature extractor 147 may initially map components to semantic types arranged in a semantic tree such as is illustrated in FIG. 17 to which reference is now made. The mapping is usually 1-to-1 mapping, i.e. there is a single atomic semantic type in the tree for each component type. However, in some cases multiple component types may map to a single semantic type, e.g. multiple gallery component types may map to a single Gallery semantic type. It will be appreciated that in some implementations, slider galleries (typically wider on the x-axis and shorter on the y-axis) may map to different SliderGallery semantic type notes used for other 2-dimentional galleries.

Atomic semantic types are placed in the tree as descendants of composite semantic types, as Image and Video are descendants of Visual in the sample tree of FIG. 17. The tree may include multiple levels of composite semantic types and atomic nodes may reside at different distances from the root of the tree. The top-level composite semantic type is the generic semantic type component. It will be appreciated that semantic types which are higher in the tree can be assumed be more abstract or having a higher abstraction level.

It will be also appreciated that a regular semantic type (which maps one or more website building system component types) may also have sub-types. These sub-types map specific sub-classes of the given website building system component type(s), and thus provide a finer resolution than the one provided by the website building system type system. The sub-types are called semantic sub-types and are represented as nodes in the semantic tree below the regular semantic types. It will be appreciated that this is required as in some scenarios a component type may need to be referred to as two different types, since those two subtypes are semantically different. For example, a page with two paragraphs may get different layout suggestions than a page with one paragraph and one title, although in both scenarios this is a page with two text components.

For example, signature extractor 147 may map regular text components into the text semantic type (there could be multiple text component types). However, signature extractor 147 may also include two semantic sub-types, title and paragraph, which map text components whose content was identified as title or paragraph.

Figure 18:
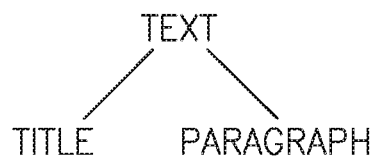
FIG. 18 is a schematic illustration of a section of a semantic tree showing use of semantic sub-types.

Signature extractor 147 may arrange the title and paragraph as atomic sub-types of a composite Text semantic type as show in the semantic tree section illustrated in FIG. 18 to which reference is now made.

It will be appreciated that components may still be mapped directly into the composite semantic type (text) instead of the atomic semantic types (title, paragraph), e.g. if signature extractor 147 cannot identify them as title of paragraph text.

For example, a page contains 6 text components, of which: 1 is identified as title; 3 are identified as paragraph and 2 are identified as generic text (i.e. neither a title nor a paragraph). In this scenario, the generated signature would be "Title-1-Paragraph-3-Text-2" instead of "Text-6".

Signature extractor 147 may divide semantic types into sub-types based on visual component properties, such as general size categories (small vs. large), height/width ratios, bright vs. dark components etc. For example, images may be divided into narrow, tall or square categories. Such sub-typing may be applied to specific semantic types only or across all semantic types, e.g. signature extractor 147 may define different sub-types for images based on aspect ratio categories, but not for videos (which have specific possible aspect ratios). Sub-typing may also be inferred from other parameters and attributes, including non-visual attribute, such as using the content of the component (e.g. using text or image analysis, face recognition, image feature extraction etc.) and using additional website building system information, including procedural directives related to the component, its use pattern or behavior. For example, all texts components which are defined as "hidden and appear when a button titled "help" is pressed" may be defined as a "help text" semantic sub-type of the "text" type.

It will be appreciated that the use of highly detailed semantic sub-types might yield non-optimal results, since the suggested layouts may turn out to be too similar to the handled component set, and the layout recall would also be much lower.

The semantic tree may also include multi-component semantic types (as described below), i.e. semantic types representing a set of semantically linked components. The set of semantically-linked components represented by a multi-component semantic type is counted as a single component, even though it contains two or more actual components.

One scenario is the mapping of plug-in components, such as third party applications. Signature extractor 147 may (for example) map such components to multiple atomic semantic types based on the general class of the third party application (e.g. e-shop third party applications, blog third party applications etc.). These multiple third party application semantic types may then be united under a generic third party application composite semantic type.

Third party application semantic types may also have additional, finer-grain information used for later selection of matching third party applications, or for signature distance calculation between pages containing third party applications. Such information may include, for example, specific interfaces or data requirements of a specific third party application. This can be used, for example, to provide a higher score for matching third party applications which use the same interfaces as the current third party application and minimize the need for a third party application protocol translation (such as discussed in US Patent Publication No US-2014-0229821 entitled "Third Party Application Communication API" published 14 Aug. 2014, incorporated herein by reference and assigned to the common assignee of the current invention.). It will also be appreciated that third party applications may occupy multiple windows or regions in the applications created by the WBS, and still be handled as a single semantic type (e.g. such as described in US Patent Publication No US-2014-0229821).

For a given layout (from an indexed page or handled component set), signature extractor 147 may generate a signature which represents the count of components of each semantic type in the layout. The signature can be represented in multiple ways such as:

A string representation, e.g. "3×Text,4×Visual,1×Gallery" or "Text-3-Visual-4-Gallery-1" and vector representation, e.g. [[3,Text],[4,Visual],[1,Gallery]].

It will be appreciated that multi-component semantic types actually represent multiple semantically-linked components as one component in the count. As signature extractor 147 arranges semantic types in a semantic tree, a given layout may be referred to with different levels of abstractions (i.e. using different-level semantic type), and signature extractor 147 may generate multiple signatures for each layout.

For example, for a layout with 1 text, 1 video, 1 image and 1 gallery, signature extractor 147 may generate the following signatures (assuming the use of a GenericVisual composite type):
1 Text, 1 Video, 1 Image, 1 Gallery.
1 Text, 2 Visuals, 1 Gallery.
1 Text, 3 GenericVisual.
4 components.

Signature extractor 147 may therefore generate multiple signatures for both the handled component set and the indexed pages, and the searching process (as discussed in more detail herein below) may include some or all of these signatures.

It will be appreciated that there may be multiple ways for signature extractor 147 to derive more abstract signatures from a given signature, as it could go up the semantic tree in different orders. For example, referring to the example semantic tree, and assuming the basic signature "1 Image, 1 Video, 1 Single line text, 1 multi line text", two signature sets could be generated. The first signature set may be:
1 Image, 1 Video, 1 Single line text, 1 Multi line text.
2 Visual, 1 Single line text, 1 Multi line text.
2 Visual, 2 Text.
4 Components.

The second signature set would be:
1 Image, 1 Video, 1 Single line text, 1 Multi line text.
1 Image, 1 Video, 2 Text.
2 Visual, 2 Text.
4 Components.

In the first option signature extractor 147 starts by "uniting" image and video together. In the second option, it starts by "uniting" single line text and multi-line text together.

Figure 19:
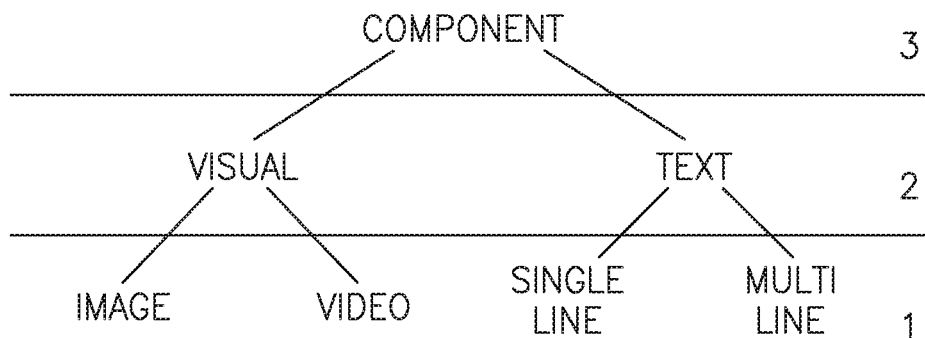
FIG. 19 is a schematic illustration of a stratified semantic tree.

Alternatively, signature extractor 147 may use a stratified semantic tree as illustrated in FIG. 19 to which reference is now made, which shows a stratified version of the semantic tree shown in FIG. 17. In a stratified system, all semantic types "go up the tree" together. Thus, all level 1 (bottom of tree) semantic type entries are united into their level 2 semantic types together, and then level 3 etc. A typical signature set would be:
1 Image, 1 Video, 1 Single line text, 1 Multi line text.
2 Visual, 2 Text.
4 Components.

Figure 20:
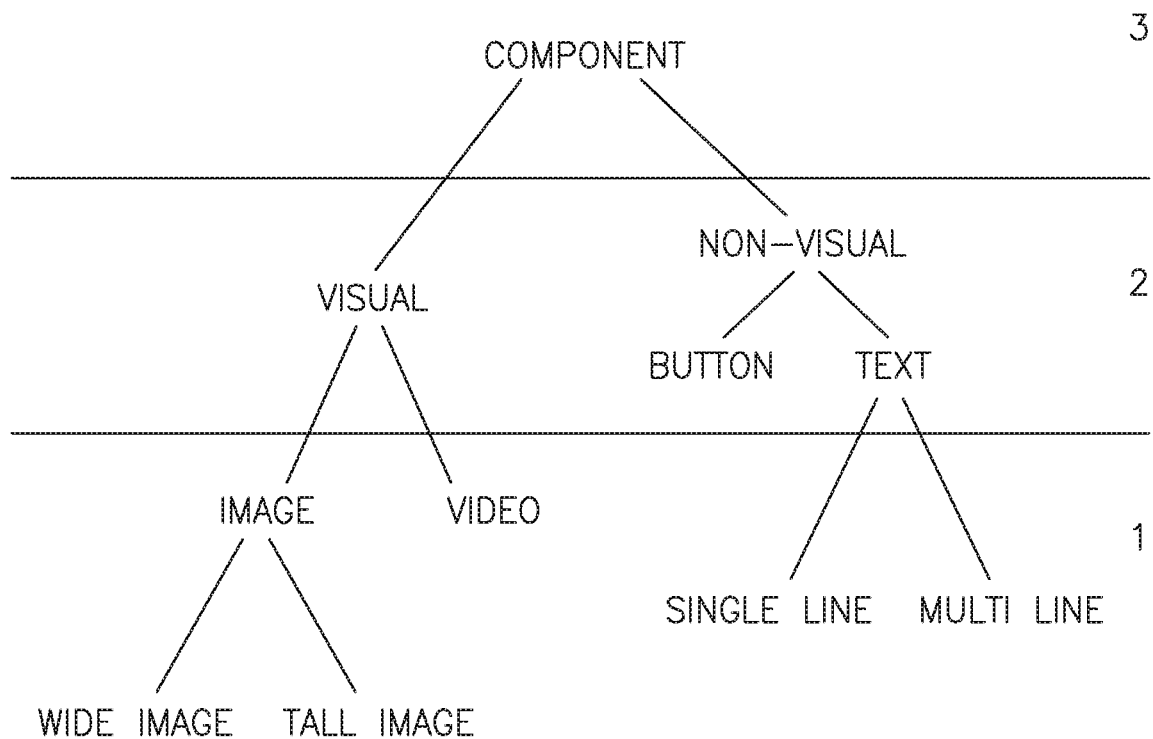
FIG. 20 is a schematic illustration of stratified semantic tree with paths of different length in the same strata.

Signature extractor 147 may support a stratified semantic tree which has multiple node levels inside a single stratum, and possibly even have leaf nodes inside the non-bottom strata. Reference is now made to FIG. 20 which illustrates a stratified semantic tree with paths of different length in the same strata. It will be appreciated that the button type is in the $2^{nd}$ strata and the text types have two node levels inside the $2^{nd}$ strata, unlike the image and video types.

The image type has two semantic sub-types in level 1, and the video type (or others) does not. In this scenario, signature extractor 147 may typically advance all components inside the lowest strata until they reach the top of their strata, and then "move them together" to the higher strata.

An example type of uniting progression (and the list of generated signatures) may include:

| Stage | Signature | Comment |
|---|---|---|
| 1 | 1xWide Image, 1xImage, 1xVideo, 1xSingle Line, 1xMulti Line, 1xButton | Initial configuration |
| 2 | 2xImage, 1xVideo, 1xSingle Line, 1xMulti Line, 1xButton | Now all level 1 components are at the "top of level 1" |
| 3 | 3xVisual,2xText,1xButton | Now all components have crossed over to level 2 |
| 4 | 3xVisual,3xNon-visual | Now all components are at the "top of level 2" |
| 5 | 6xComponent | Now all components have crossed over to level 3 |

As a general rule, going up the tree to a higher abstraction level may lead to increased recall, at the expense of reduced precision. The less abstract the signature is (lower in the tree), the more precise the layout is, i.e. closer to the original component collection.

It will be appreciated that for a page retrieved by spider 41, page analyzer 44 may generate a single full-page layout, multiple partial page layouts (created by removing the least important components one by one) and multiple segmented layouts together with their associated signatures for each type of layout. The set of possible partial and segment signatures is later used by layout searcher and generator 60 to try to find matching partial layouts and/or find matching segment layouts (and to complete them).

It will be further appreciated that as well as layouts and associated signatures, page analyzer 44 may also produce and associated layout package for each layout (full page, partial page or segmented). Each associated layout package may contain: the full page data of the original page (including component content), the handled component set—which components in the page should be handled, the extracted layout and the associated signature for the layout (which could be multiple signatures, e.g. if calculating signatures for multiple abstraction levels). Each associated layout package may also contain information including indications of component relevance status (background, decoration, filtered out etc.) component split/merge information, page type indication, container split/merge/modification information and semantic link information—for use when matching linked components in a handled component set (a query page) and layout database 70 as discussed in more detail herein below. The associated layout package may also include a screen shot of the original page, to present to the user a "full view" of the suggested layouts, and not just an abstract layout view. Layout database 70 may also store a pre-processed version of the layout suitable for quick generation of a preview of the suggested layouts with the user content.

It will also be appreciated that since layout packages are often generated in groups (e.g. due to full page, partial page and segment processing), multiple layout packages may share blocks of information (e.g. the original page information).

Layout database coordinator 75 may avoid storing some of the information above, and instead recalculate it from the full page (from the pertinent layout package) when needed.

Once page analyzer 44 has processed the incoming page into suitable layouts and has extracted the associated signatures, layout filter and ranker 45 may check the visual quality of the layouts and/or pages in order to ensure that only the layouts and/or pages which have the appropriate quality and diversity are included.

Layout filter and ranker 45 may then index these selected layouts and/or pages accordingly before storing them in layout database 70 via layout database coordinator 75. It will be appreciated that after the matching process (as described in more detail herein below) layout filter and ranker 45 may also receive matched candidate layouts to ensure that a quality and diverse set of candidate alternative layouts are eventually presented to the user as described in more detail herein below.

Figure 21:
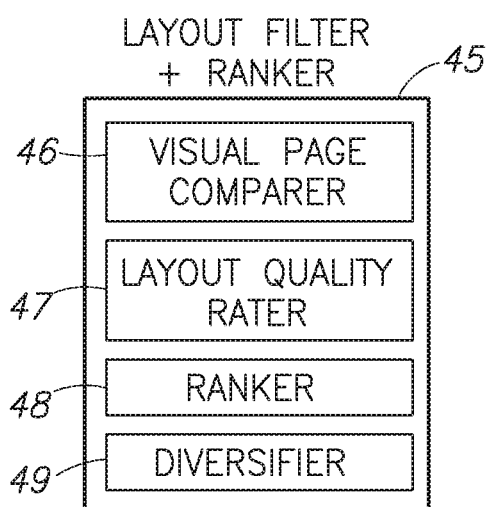
FIG. 21 is a schematic illustration of the elements of the layout filter and ranker of 3A and 3B; constructed and operative in accordance with a preferred embodiment of the present invention.

Reference is now made to FIG. 21 which illustrates the elements of layout filter and ranker 45. Layout filter and ranker 45 may further comprise a visual page comparer 46, a layout quality rater 47, a ranker 48 and a diversifier 49. Page spider 41 may provide pages from which layouts may be generated. It will be appreciated that the extracted layout may be known as a server based layout (as opposed to an automatically generated layout).

Visual page comparer 46 may determine the level of visual similarity of two layouts or of two pages (e.g. between a new incoming layout and a layout already stored in layout database 70). It will be appreciated that it is not used to retrieve pages when collecting pages and layouts for indexing, but instead is used to filter out pages and/or layouts which are very visually similar to other pages and/or layouts in layout database 70 having the same signature—to better support results diversification.

Visual page comparer 46 may compare the general component distribution in the two pages, e.g. using detailed text/image/overall metrics. It may divide the page into regions (e.g. using a grid), check which components intersect which region (possibly classifying by color, type etc.) and compare the scores for the various regions.

Visual page comparer 46 may also compare by attempted component matching between the pages, e.g. by attempting to match the components and checking how good the resulting match is. This could be done, for example, by matching components in the two pages by position, size and visual similarity (e.g. based shape and color).

Visual page comparer 46 may match the two pages (for example) by creating the set of all possible matching (possibly filtering totally irrelevant matches), scoring them and finding the match with the best score, by using a greedy algorithm to always add the best next pair or by handling the problem as an assignment problem and solving it using known algorithms such as the Hungarian algorithm.

Visual page comparer 46 may also use snapshot similarity at the page image level, by using a known image similarity algorithm on a virtual snapshot of the two pages.

Layout quality rater 47 may provide a quality score (as discussed in more detail herein below) which may be used when indexing to filter out low-quality pages or when retrieving to rank the pages displayed to the user.

The score may be typically stored with the indexed layout in layout database 70. However, layout quality rater 47 may recalculate the score upon use as the calculation may be based on an expert system that is continuously modified or may use the post-adaptation version of a suggested layout (i.e. the version created by adapting the handled component set to the specific suggested layout) or may depend on quality criteria specific to the given user.

Layout quality rater 47 may apply this algorithm to full pages and partial pages as well as templates for full pages and page parts. Layout quality rater 47 may take into account components and visual elements which are filtered out by component filter 145 (such as decorations which are not regular components).

Layout quality rater 47 may use a number of methods or a combination thereof to determine the rating such as methods which are based on a static analysis of the content of the page, methods which rely on training a learning system (or systems) based on actual selections made by users or methods which are based on information related to the designer of the page.

Layout quality rater 47 may support multiple types of quality scores and metrics. For example the article by Xianjun Sam Zheng, Ishani Chakraborty, James Jeng-Weei Lin, and Robert Rauschenberger "Correlating low-level image statistics with users-rapid aesthetic and affective judgments of web pages", International Conference on Human factors in Computing Systems (SIGCHI), April, 2009. http://research.rutgers.edu/~ishanic/papers/sigchi/pdf has end-users perceive multiple quality metrics (e.g. professional-looking, captivating, and appealing) as different and independent metrics.

It will be appreciated that there are a number of known algorithms in the art for such ranking though they are typically applied to regular web pages and not to component collections. An algorithm may be based on any combination of the following:

Page statistical metrics. These view and analyze, the page as a collection of components, and extract metrics such as # of text components, # of fonts used, # and types of links etc. Layout quality rater 47 may use the statistical profile of pages known to be well-designed (e.g. created by a professional studio inside the WBS vendor) and compare the statistical profile of the page to that of well-designed pages.

Page visual attributes (as discussed herein above in relation to the article by Zheng et al.). Layout quality rater 47 may analyze the page as an image, collecting metrics such as symmetry, balance, number of quadrants in decomposition, color uniformity etc. The metrics should be combined by pre-determined weights to derive a total page quality score.

Layout quality rater 47 may also use a content-based algorithm in which the parameters are set by a learning system (such as a neural network) trained with actual user inputs—herein referred to as a layout quality rater learning system. Layout quality rater 47 may use a number of actual user inputs to train the layout quality rater learning system such as which layouts were actually selected by users and applied to a page, which layouts were tested by a user, applied to a page and later discarded or replaced and a specific feedback requested from the user (e.g. "rate the best 3 of the displayed layouts.").

Layout quality rater 47 may also use actual page viewing/rating information to train the layout quality rater learning system. However, such rating may be unreliable—as it may be greatly affected, for example, by advertising campaigns which affects site traffic (but is not related to the design quality of the site).

Layout quality rater 47 may employ a system-wide set of weights—i.e. using a single layout quality rater learning system which provides a system-wide layout quality rate value (used by all designers and stored together with the stored layouts). Alternatively, it may use a personalized layout quality rater learning system which may have weights personalized to the specific user (or user set). In the latter case, the personalized layout quality rater learning system may be initialized by values from a system-wide layout quality rater learning system. Then the personalized layout quality rater learning system would be further trained by the specific user (or user set). The layout quality rater learning system would gradually come to reflect the personal taste of the specific user (or user set).

In the scenario in which a personalized layout quality rater learning system is employed, layout quality rater 47 may use separate layout quality rater learning system activation to grade the results since it cannot use the stored layout quality rated values may be system-wide (rather than personalized).

Layout quality rater 47 may also rank pages according to information about the designer of the pages. This could a generic designer ranking, or a specific rating, such as a designer rating specific to the given industry or sector to which the user belongs.

Ranker 48 may rank according to the semantic similarity to the handled component set signature, the layout quality rating value produced by layout quality rater 47 and parameters external to the layout, such as layout designer identity (e.g. the page designer has provided a list of designers whose style he prefers) and commercial parameters such as promoted search priority increase (if implemented).

Ranker 48 may disqualify some of the solutions based on semantic similarity. Low semantic similarity results should have been filtered out at the retrieval stage, but the resulting layouts may still have a range of semantic similarity values. It may also disqualify solutions with low layout quality rate values, which may have passed the filtering process at the layout database 70 creation stage.

It will be appreciated that if a personalized layout quality rate value system has been implemented, layout quality rater 47 may calculate the specific personalized layout quality rate values for all matches based on the parameters specific to the user who performed the query.

Ranker 48 may disqualify some of the solutions based on component size matching. Ranker 48 may perform preliminary matching of components (based on semantic types) between each resulting page and the handled component set as described in more detail below in relation to layout adapter and applier 50. It will be appreciated that in some cases, there may be a semantic match between the types of components but a substantial mismatch in the sizes of the components.

An example would be a scenario, in which both the handled component set, and a located page P have 5 text components, but the text components of the handled component set are large, and all the text components of page P are all very small. In such a scenario, it is best to disqualify page P.

Ranker 48 may provide a preliminary ranking by sorting the resulting layouts according to any combination of the metrics above (e.g. a weighted average).

As discussed herein above, system 100 aims at providing a diverse set of high quality layouts. When operating within layout searcher and generator 60, diversifier 49 may ensure that there is enough diversity between the retrieved or generated layouts for a particular page and that the layouts are as visually different as possible. When processing layouts generated from page spider 41 retrieved web-pages, diversifier 49 may ensure that there is enough diversity among the potential layouts to be added to layout database 70—both among the potential layouts and themselves, and between the potential layouts and these already existing in layout database 70.

Once the criteria above are used to create the preliminary ranking, diversifier 49 may create a final (displayed) result ranking using a diversification process. The diversification process may be based on the visual distance calculated by visual page comparer 46 as described herein above, and the selection of results which are not visually similar. Diversifier 49 aims to present suggested layouts which are visually different from the handled component set and from each other.

Diversifier 49 may do this using a greedy algorithm. A typical greedy algorithm works as follows:

Define the following page/layout metrics:

SLS(L1,L2)—semantic layout similarity between layouts L1 and L2.

LQR(L)—layout quality rating of a layout L (which may be user-specific).

VPS(L1,L2)—visual page similarity between layouts L1 and L2 (using visual page comparer 46).

Let S be the matching layouts found by the semantic query, e.g. the top n pages P having the maximal SLS(HCS, P);

Define an initially empty result R;

Select a page P from S having highest value of a metric using a combination of SLS(HCS,P) and LQR(P);

Add the found page P to R and remove it from S;

Repeat the following until R is sufficiently large:

Select a page P from S which has the highest value of a metric that is a combination of:

SLS(HCS,P), i.e. semantically close to the HCS;

LQR(P), i.e. having high quality;

$$-\left(\sum_{PP \in R} VPS(PP, P)\right),$$

i.e. having maximal total amount of visual distance between P and the existing members of the result set.

Add P to R and remove it from S;

It will be appreciated that numerous variations to the basic greedy algorithm exist (for example the article by Vieira, Razente, Barioni, Hadjieleftheriou, Srivastava, Traina, Tsotras—2011 "On query result diversification" http://www.csd/uoc/gr/~hy562/papers/diversification/vieira11.pdf) such as:

Creating initial clustering of the pages in S according to visual similarity, and selecting one example from each cluster.

Checking visual distance of selected page P from both current result pages as well as pages in S (to select pages which provide diversity for upcoming selections as well).

Using randomized selection among k best alternatives at each round.

Once the final ranked result set R is created, ranker 48 may display it to the designer so the designer may select which layout to apply to the handled component set as described in more detail herein below.

Once ranker 48 and diversifier 49 have ranked the layouts and ensured that they are diverse, layout filter and ranker 45 may send them to layout database coordinator 75 which may store them in layout database 70 accordingly indexed.

As discussed herein above, layout searcher and generator 60 may search layout database 70 to find suitable semantically similar layouts to offer to a user as an alternative to his requested page, and also generate automatically generated layouts (as described in more detail herein below) which correspond to the handled component set of his page. It will be appreciated that not only may a user transfer all his content to a new layout, he may also make edits during the process, e.g. invoke the system to display a set of layout alternatives (in a pop-up dialog for example), and then continue to edit the page while the pop up dialog is open and refreshes to display changing alternative layouts.

Figure 22:
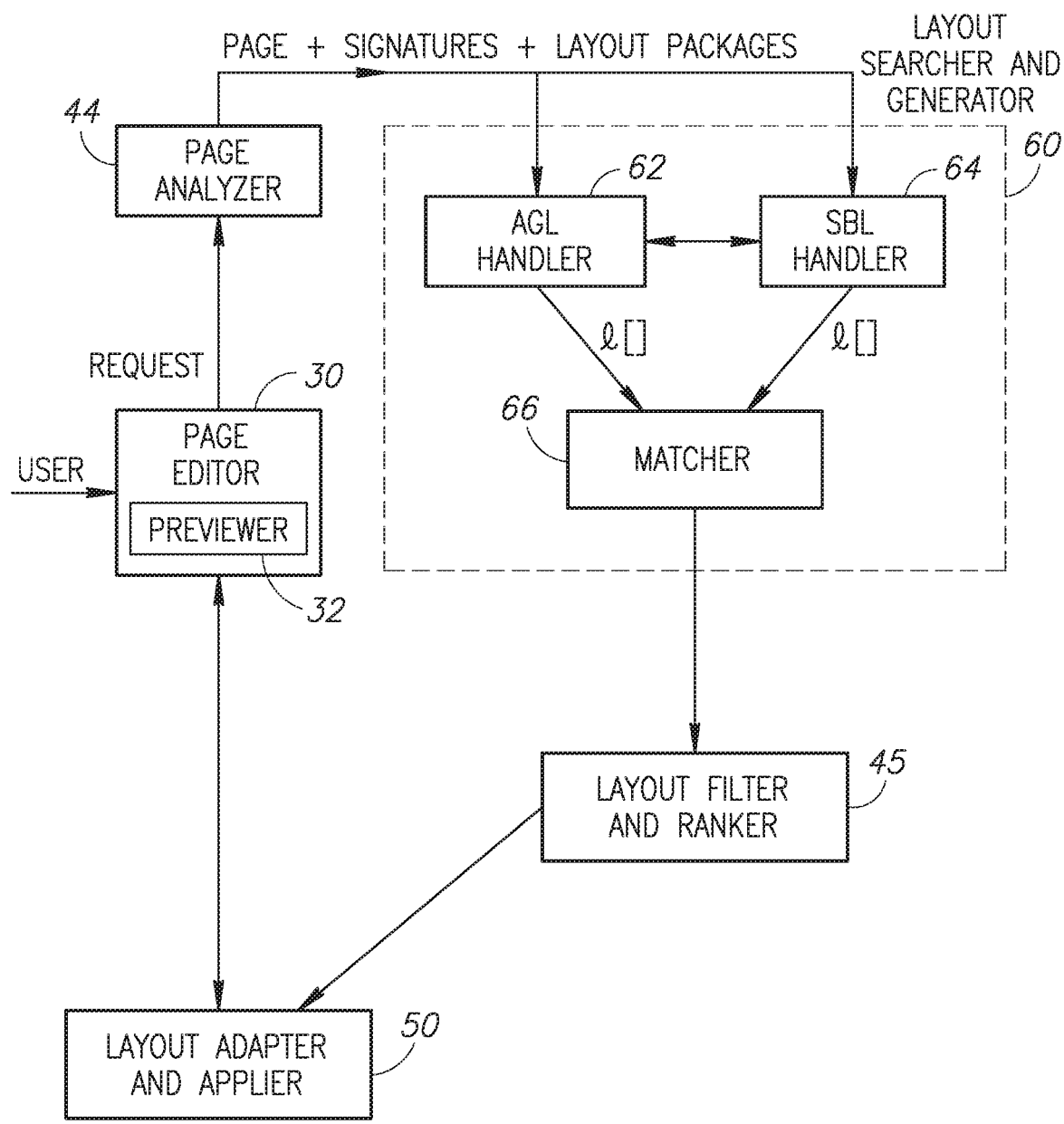
FIG. 22 is a schematic illustration of the implementation of the layout searcher and generator of FIG. 3A; constructed and operative in accordance with a preferred embodiment of the present invention.

Reference is now made to FIG. 22 which illustrates the elements of layout searcher and generator 60. Layout searcher and generator 60 may further comprise an automatically generated layout (AGL) handler 62, a server based layout (SBL) handler 64 and a matcher 66. The functioning of these elements is discussed in more detail herein below.

Layout searcher and generator 60 may receive a request input page via page editor 30 and page analyzer 44, for which a user would like to see alternative layouts. As discussed herein above, page editor 30 may be a suitable graphical user interface between the user and system 100 and may also allow users to make editorial changes to their page (both content and format). Page editor 30 may allow the user to mark either all the components in the page for which he wants an alternative layout or just a subset. The incoming request page and associated handled component set may be analyzed by page analyzer 44 (as described herein above) which may break up the full incoming handled component set into partial and segmented handled component sets and may generate associated signatures and layout packages as described in more detail herein below to extract 3 different sets of potential handled component sets from the user requested page—full, partial and segmented.

The output of page analyzer 44 (handled component sets, signatures, layout package etc.) may then be passed to both AGL handler 62 and SBL handler 64 to create/retrieve appropriate candidate layouts. Matcher 66 may check candidate layouts from SBL handler 64 and AGL handler 62 against the handled component set of the incoming page and may find a subset of matching components between the two layouts (as discussed in more detail herein below). Layout filter and ranker 45 may filter and rank the retrieved candidate layouts as described herein above and may forward them to layout adapter and applier 50 to be adapted accordingly as described in more detail herein below. It will be appreciated that matcher 66 may require a precise match between a pair of layouts rather than a match of a subset of the components.

It will be appreciated, that in addition to layouts created and prepared for use, and those generated from existing websites by page analyzer 44, AGL handler 62 may create automatically generated layouts based on the components included in the handled component set of the incoming page. These automatically generated layouts may be used as a fallback (if no suitable, high-quality layout was found by searching as described in more detail herein below), or may be created by default (to produce one or more additional layouts to be ranked and displayed to the user).

Figure 23:
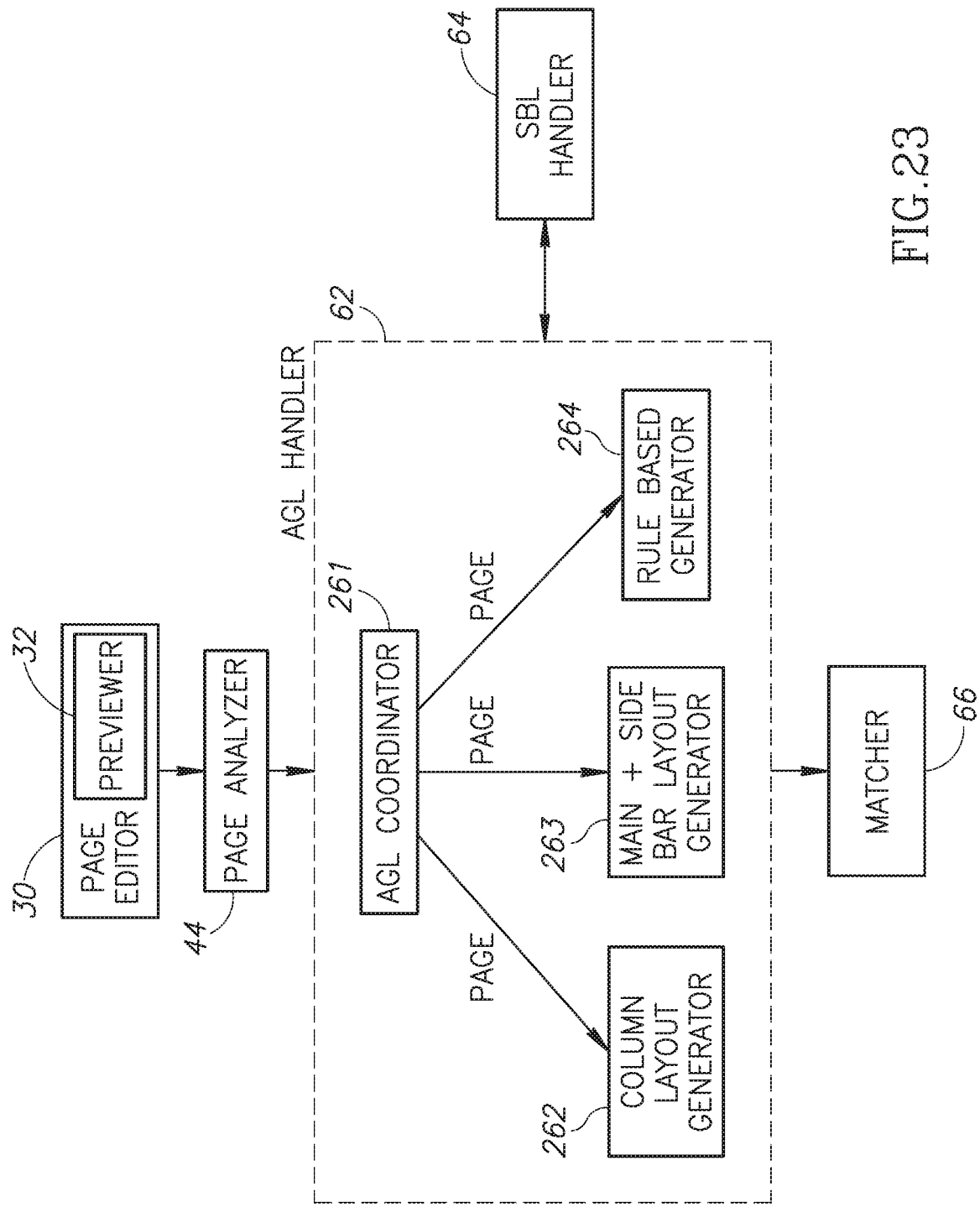
FIG. 23 is a schematic illustration of the implementation of the AGL handler of FIG. 22; constructed and operative in accordance with a preferred embodiment of the present invention.

Reference is now made to FIG. 23 which illustrates the elements of AGL handler 62. AGL handler 62 may further comprise an AGL coordinator 261, a column layout generator 262, a main and side bar layout generator 263 and a rule based generator 264.

AGL coordinator 261 may receive the incoming handled component set from either page editor 30 or from SBL handler 64 (as described in more detail herein below), and create multiple possible algorithmically-generated layouts which use these components, possibly taking into account various constraints and considerations as detailed below. Column layout generator 262 may divide the page into columns and order the components in one column after the other. Main and side bar layout generator 263 may place components in a larger main column and after that in a smaller side-bar and rule based layout generator 264 may place components one after the other according to predefined placement rules which may include specific layout guidelines for specific component types. AGL handler 62 may also combine the various layout generator methods, e.g. by using one method for the main generated layout and a different method for container layout generation.

AGL handler 62 may be applied to single components or to components grouped according to semantic relationship (as further discussed US Patent Publication No. 2015/0074516).

AGL handler 62 may also take into account existing explicit dynamic layout anchors (as per US Patent Publication No 2013-0219263) and group elements anchored together as a single meta-component to be placed as one entity in the automatically generated layout order. It may also take into account the existing component order (e.g. using the component order extraction algorithms described in US Patent Publication No. 2015/0074516), so the created automatically generated layouts are more related to the original layout. Note that this is different from the signature extraction performed for layout database 70 searching, where the current page layout is irrelevant (except for the arrangement of containers).

It will be appreciated that no signature extraction is required for an automatically generated layout, since they are based on the actual component set of the handled component set, and are thus expected to have a "perfect score" as far as component matching is concerned. However, they might fail in terms of diversity (i.e. they are too similar to another suggested layout) or quality (i.e. they are not as visually appealing as other suggested layouts). The output of AGL handler 62 may be sent to matcher 66 or returned to SBL handler 64 as described in more detail herein below.

Figure 24:
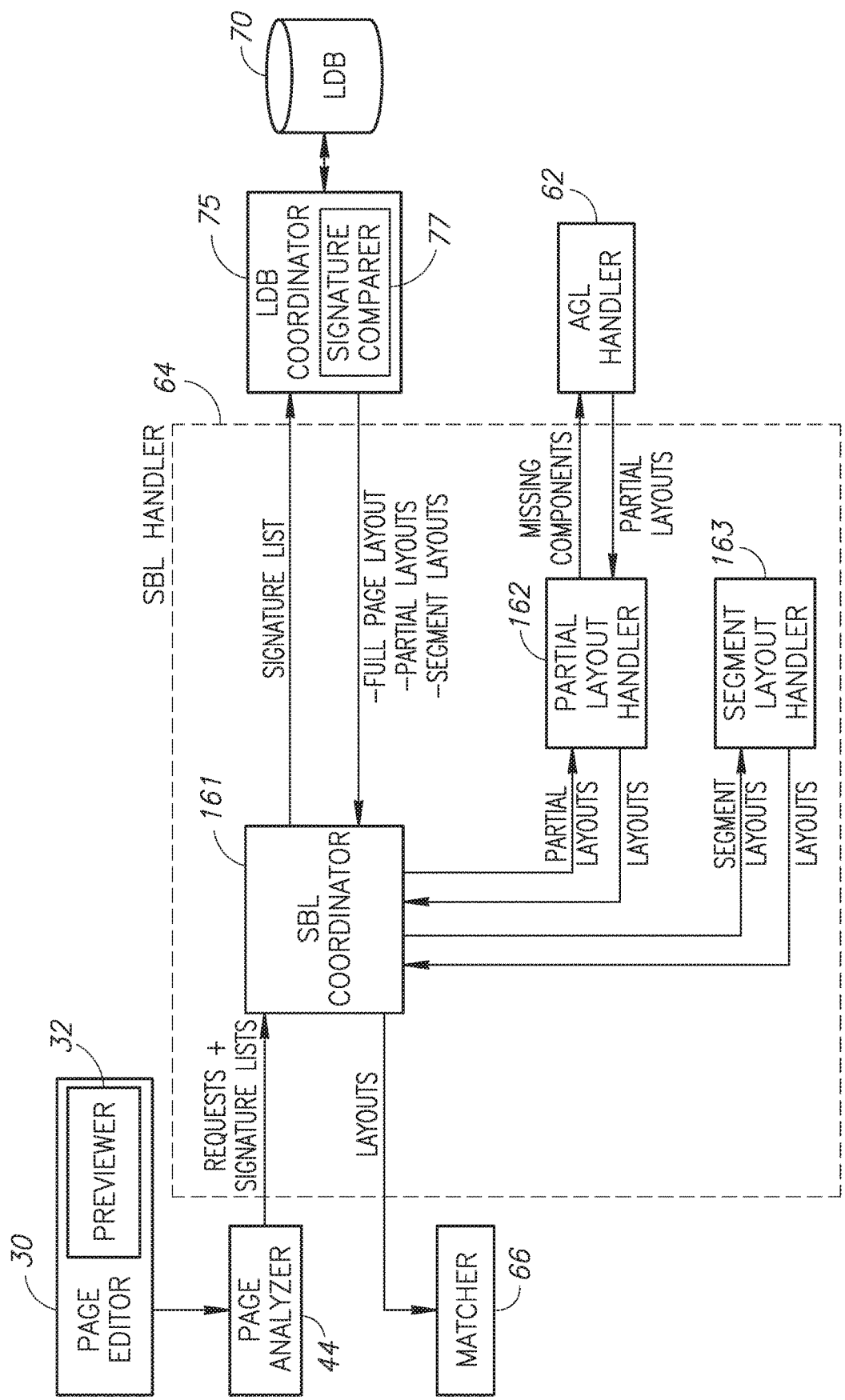
FIG. 24 is a schematic illustration of the implementation of the SBL handler of FIG. 22; constructed and operative in accordance with a preferred embodiment of the present invention.

Reference is now made to FIG. 24 which illustrates the elements of SBL handler 64. SBL handler 64 may comprise a server based layout (SBL) coordinator 161, a partial layout handler 162 and a segment layout handler 163.

As discussed herein above, page analyzer 44 (and the signature extractor 147 in particular) may produce an array of signatures. These can be divided into 3 signature classes—full page, partial page and segment.

Full page signatures may be used to find layouts in layout database 70 having a set of components which match the entire page (or handled component set).

Partial page signatures may be used to find the closest matching layout for a subset of the components, and to add the missing ones. In order to avoid combinatorial complexity (i.e. having to create signatures for all possible component sub-groups), signature extractor 147 may remove just the "least important component" (according to an importance rank) one at a time, and may create a signature after each single component removal. For example, a Facebook like component is less important than a primary image component.

Signature extractor 147 may also create the effect of adding components (to create "larger" signatures for searching). This can be done by removing components (in a similar way—according to importance) in the collection stage, and creating a set of possible signatures for each indexed layout. This way gathered layouts may be indexed by layout collector and updater 40 according under multiple signatures according to their full and partial layouts, and matcher 66 may match a handled component set against a part of a gathered layout (as discussed in more detail herein below).

Segment page signatures may be used to divide the handled component set into segments, in order to find a match for each segment and combine the resulting matches.

SBL coordinator 161 may receive the incoming page request from page analyzer 44 together with the handled component set and the list of signatures for the three different categories (full page, partial page and segment). SBL coordinator 161 may then query layout database 70 using the signature list via layout database coordinator 75.

As discussed herein above, layout database coordinator 75 may comprise a signature comparer 77. Signature comparer 77 may compare the extracted signatures from the handled component set of the incoming page request with the stored indexed signatures in layout database 70. Signature comparer 77 may support exact searching only. Exact searching simply searches for layout having the same signature—which might provide excellent precision but very low recall. Approximate searching, on the other hand, requires finding layouts whose signatures are close to that of the handled component set.

It will be further appreciated that signature comparer 77 may only perform semantic abstraction i.e. may attempt to compare signatures in a number of different ways by performing semantic abstraction on both signatures being compared. For example when comparing a "heading text" signature to a "paragraph text" signature, it may abstract both signatures into "text component" resulting in a match. It will be appreciated that signature comparer 77 may perform abstraction at the compare time or by indexing each signature with its multiple abstraction alternatives in advance and then may search according to these alternatives. Thus, each stored layout is indexed under multiple signatures (at various levels of abstraction) It will be further appreciated that signature comparer 77 does not handle extra or missing components.

It will be appreciated that signature similarity may be defined based on a distance metric—how different are two signatures. Signature comparer 77 may employ a number of possible metrics, possibly based on a weighted semantic tree.

Figure 25:
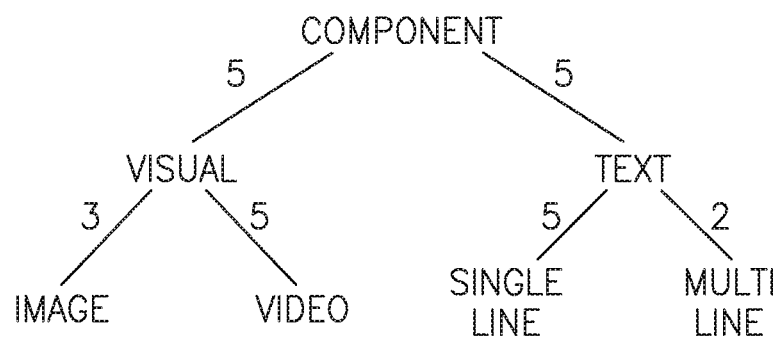
FIG. 25 is a schematic illustration of a weighted semantic tree.

It will be appreciated that some of the metrics may employ a weighted semantic tree which includes a weight for each tree arc, as illustrated in FIG. 25 to which reference is now made. The arc weight (a positive number) for each arc states the distance from the original designer intent by going up or down the arc.

In the example illustrated in FIG. 25 to which reference is now made, a (Single line=>Text) arc has a weight of 5 whereas a (Multi line=>Text) arc has a weight of 2. These values may be selected for use by signature comparer 77 since a multi-line text component more closely resembles the traditional notion of a text component than a single-line text component.

Such arc weights may be determined in multiple ways. For example, they may be determined by the system designers, may be inferred from responses from page designers using the system, may be inferred from system usage information or may be derived using a learning system based on user behavior and responses.

One possible metric may be based on the difference in the amount of each semantic type. If signature is considered a vector with a positive integer value (>=0) for each semantic type (whose value is the amount of components of the given type), signature comparer 77 may define a set S of all semantic types (including both atomic and composite types), the difference d between signatures A[ ] and B[ ] is:

$$d = \sum_{t \in S} |A[t] - B[t]|$$

In the calculation above, amounts for composite types are only for components directly assigned to the specific composite type (by mapping from component type), i.e. not components mapped into a sub-type which was later abstracted into the composite type.

Another possible metric is the sum of weights for all arcs that have to be traversed to make the signatures identical (multiplying each weight by the number of components of the given semantic types that have to go through these arcs). This assumes that the tree is traversed both up and down. An example of this is the use of the tree in FIG. 25 to which reference is now made, in order to calculate the distance between:

A=[Image 5 Video 6]

And

B=[Image 3 Video 8]

To go (for example) from A to B, the following arcs may be traversed:

2×(Images=>Visual)=2*3;

2×(Visual=>Video)=2*5;

For a total cost of 16 (2*3+2*5).

Figure 26:
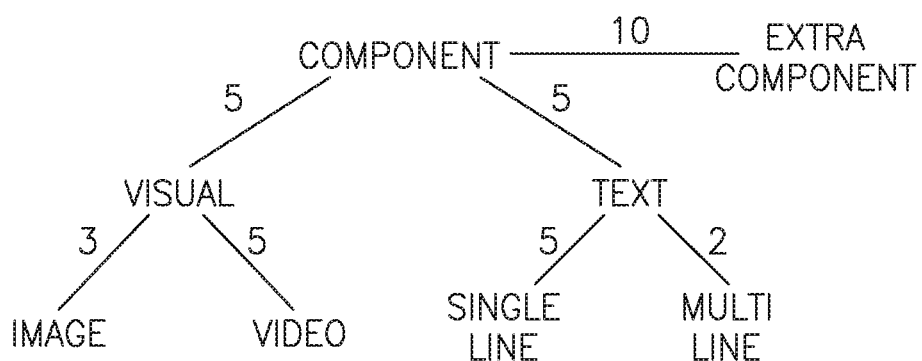
FIG. 26 is a schematic illustration of a weighted semantic tree with an extra component node.

The tree should be extended to contain "extra component" node attached to the top level "component" node to support additional or missing nodes as shown in FIG. 26 to which reference is now made.

It will be appreciated that as the semantic tree has a single path from each type to each type, the tree traversal "direction" does not affect the result.

Signature comparer 77 may make the two metrics above area-sensitive by trying to match components (having the same semantic type) according to their areas, and applying the area of "left over" components as a multiplier to the cost of "left over" components for each A and B. Thus, only components having similar area are equivalent, and components whose area is too small or too large are regarded as "extra".

Typically, the best quality layouts that may be stored in layout database 70 are manually created layouts, followed by the layouts based on website building system internal designer web sites, followed by those of the external designers (at differing levels). It will be appreciated that layout database 70 may also store automatically generated layouts (based on the components in the handled component set) at differing levels of quality—as some component combinations lend themselves to the creation of better automatically generated layouts than others. This may be required if system 100 includes a sophisticated system for automatically generated layouts including (for example) an elaborate aesthetic rule system. It will be appreciated that in such a system, the creation of automatically generated layouts may be resource intensive—since generated layouts differ based on the order of the components, the amount of automatically generated layouts is exponential to the number of components. Therefore it may be desirable to pre-generate of automatically generated layouts for multiple possible signatures and to store them in layout database 70. In such a system layout database searching by SBL handler 64 may find these layouts and SBL handler 64 may include them in the search results together with actual layouts that have been generated from designed pages by page analyzer 44 as described herein above.

Thus, in an alternative embodiment, AGL handler 62 may be invoked by SBL handler 64 after SBL handler 64 has finished retrieving candidate layouts only.

In another embodiment, system 100 may have a well-defined criterion which states for which signatures automatically generated layouts were pre-generated. Thus, AGL handler 62 may be invoked only if the required signatures do not comply with the criterion.

In yet another embodiment, system 100 may omit AGL handler 62 altogether.

To combine the searching in these multiple layout databases 70, signature comparer 77 may use either a combined search—i.e. may search all of the layout databases 70 and may combine the results (taking diversity and quality into account when ranking the results) or may perform a sequential search—search the layout databases 70 according to a pre-specified order. It may search the next layout databases 70 if the results from the previous layout databases 70 are not sufficient (in terms of number of results, their quality or their diversity).

It will be appreciated that there are multiple ways in which the signature comparer 77 can perform the search to locate suitable candidate layouts. It may search for identical signatures, search for similar signatures through semantic abstraction and search for similar signatures, and correcting by adding/removing components.

Signature comparer 77 may perform identical signature searching via direct indexing of the signature using string representation indexing, hashing etc.

Signature comparer 77 may apply the same process to the handled component set-based signature. Thus, the searching is performed according to multiple signature versions, and the results are united. Signature comparer 77 may also filter results according to their semantic distance using the signature comparison methods outlined above.

Signature comparer 77 may perform similar signature searching for each signature in many ways, such as the use of map signature vector representation into vector space and using Euclidean distance as the first approximation. This may be assisted by embedding algorithms which reduce the number of dimensions in the vector space (e.g. such as the article by Hjaltason G., Samet H.—2000 "Contractive Embedding Methods for Similarity Searching in Metric Spaces." http://www.es.umd.edu/~hjs/pubs/metricpruning.pdf)

Signature comparer 77 may perform searching using (for example) any of the known nearest point searching methods in the vector space using MinHash, SimHash, using attribute relational graphs and by using similar signature searching with added/removed components as described herein above.

Signature comparer 77 may repeat the process until a reasonable number of matches are found (breaking or possibly accumulating matching layouts found) or a given number of searches.

If a resulting layout contains extraneous components, matcher 66 may remove these extraneous components in the component matching process (as described in more detail herein below). If a resulting layout has less components than the handled component set, the additional handled component set components may be added when applied (e.g. inside or below the layout as noted below).

Layout database coordinator 75 may return matching layouts which provide alternatives to each of the sent signatures in each of the 3 signature classes: full page, partial and segment.

SBL coordinator 161 may then send the partial layouts (only) to partial layout handler 162 to be "completed". Partial layout handler 162 may send the sets of missing components (i.e., [handled component set] minus the specific [partial layout]) to AGL handler 62 for completion.

Figure 27:
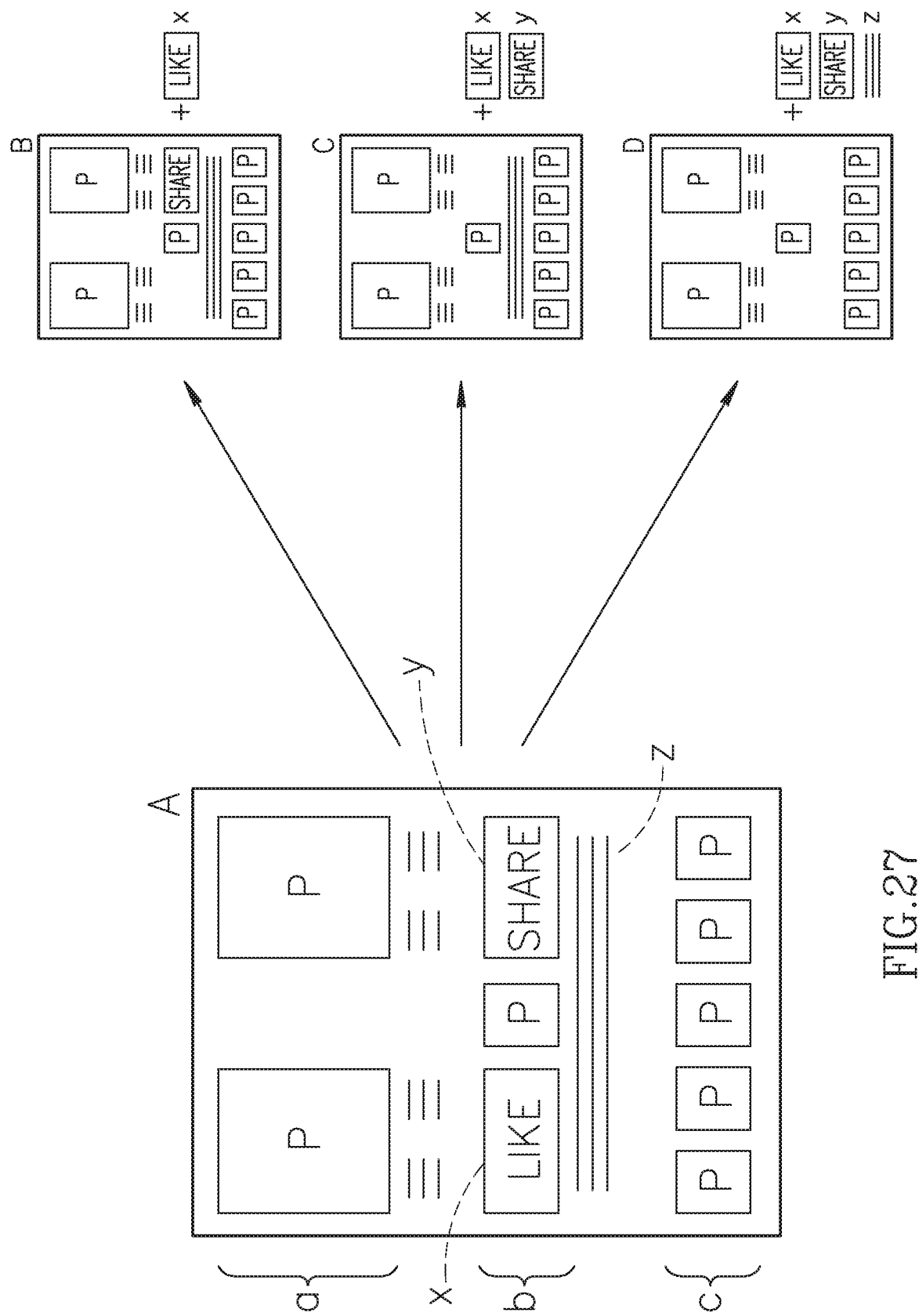
FIG. 27 is a schematic illustration of the creation of partial layouts, constructed and operative in accordance with a preferred embodiment of the present invention.

Reference is now made to FIG. 27 which illustrates the creation of partial layouts. Layout A (which includes the handled component set) consists of 3 main sections: the first section a includes 2 picture components and 4 text components substantial to the page; the second section b which includes a Facebook Like button x, a picture component, a Share button y and a small notification text component z; The third section c contains 5 picture components which are again important to the page.

Page analyzer 44 may determine that the least important components in the page are 3 of the 4 components in section b which are (in ascending order of importance) the like button x (least important), the share button y and the notification text z. All other components are considered more important than these 3 components.

Page analyzer 44 may thus create 3 partial layouts. The first layout B may include all components in A except for the like button x. The second layout C may include all components in layout A except for the like button x and the share button y. The third layout D may include all components in A except for the like button x, the share button y and the notification text z.

Page analyzer 44 may send the three partial layouts B, C and D, together with the removed components (x for B, x/y for C, x/y/z for DE), the matching signatures and layout packages (for each of the three) to layout searcher and generator 60, where they are routed to SBL handler 64 and to partial layout handler 162. Partial layout handler 162 may locate alternative layouts for each of B, C and D. Partial layout handler 162 may further request AGL handler 62 to create automatic layouts for each of the removed component sets (e.g. 3 automatic layouts for x, x/y and x/y/z). Partial layout handler 162 may then append the corresponding automatic layout to each of the located alternate layouts for B, C and D to create 3 combined layouts which are the ones combined with the content of the original layout A and returned by the partial layout handler 162.

It will be appreciated that the selected least important components may be anywhere on the page and in particular may be intermixed between other components (more important or not). In the final combined layout, these least important (and removed) components may typically be re-added at the bottom of the suggested layout.

Figure 28:
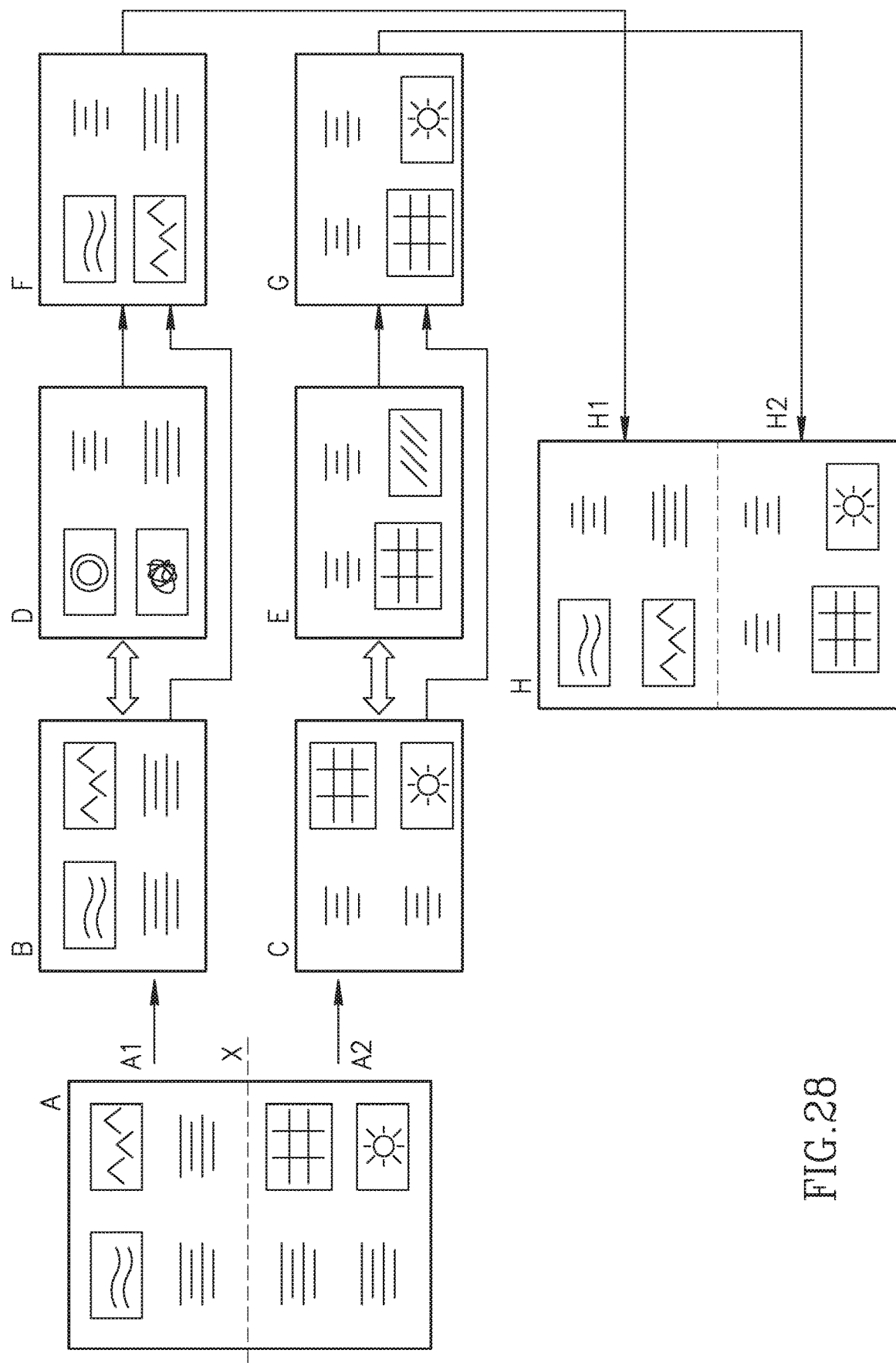
FIG. 28 is a schematic illustration of an example of handling a segmented layout; constructed and operative in accordance with a preferred embodiment of the present invention.

Reference is now made to FIG. 28 which illustrates a simplified version of the working of the segment layout mechanism. Layout A (which includes the handled component set) contains in this example 2 text and 2 picture components in its top part A1, and 2 text, 1 picture and 1 table components in its bottom part A2.

Page analyzer 44 may have previously recognized that layout A may be easily divided by a horizontal end-to-end separator X into the two segment layouts B (containing the components in A1) and C (containing the components in A1)

Page analyzer 44 may have further recognized (using the semantic link handler 141) that the 2 picture components and 2 text components in A1 re 2 picture-caption pairs, and thus it may not further sub-divide A1 into two sub-parts. Similarly, page analyzer 44 may have determined that the 2 text components of A2 are related (for example, due to a manual dynamic link anchor connecting them) and do not sub-divide A2.

Page analyzer 44 may send the two segment layouts B and C, together with their matching signatures and layout packages (for each of C and D) to layout searcher and generator 60, in which they are routed to SBL handler 64 and to segment layout handler 163. Segment layout handler 163 may send the signatures for B and C to layout coordinator 75 which may locate matching suggested layouts D and E (respectively).

Segment layout handler 163 may further perform the matching between B and D and may create a combined and adapted layout F—which uses the layout format from the located layout D and the component content from segment layout B. Similarly, Segment layout handler 163 may perform matching between layouts C and E to create a combined and adapted layout G.

Segment layout handler 163 may then combine layouts F and G (by appending G to the bottom of F) and may create the merged layout H, in which the upper part H1 is taken from F and the lower part H2 is taken from G.

It will be appreciated that in the actual implementation, the search for suggested layouts (D and E above) may return multiple options for each (e.g. D1 . . . Dn and E1 . . . Em), which may be combined in n×m ways. Segment layout handler 163 may create all n×m combinations, or may filter them according to predefined rules criteria as discussed herein above.

AGL handler 62 may send back (for each partial layout) a matching automatically generated layout created from the components missing in the specific partial layout. Partial layout handler 162 may combine the partial layout(s) with their matching "missing component layout" from AGL handler 62 and create a new completed layout and return it to SBL coordinator 161. Partial layout handler 162 may add (for example) the automatically generated "missing component layout" below the partial layout thus combining them.

In an alternative embodiment, partial layout handler 162 may send the actual partial layout to AGL handler 62 and have the AGL handler 62 use it as a "seed" and add the missing components to it directly.

SBL coordinator 161 may send the set of located segment layouts to segment layout handler 163. Segment layout handler 163 may combine the per-segment alternatives to create combined full page layouts. In the typical case in which the segments were created by horizontal end-to-end splitting of the handled component set into segments, segment layout handler 163 may combine the per-segment alternatives by putting the per-segment alternatives one below the other according to the original splitting order. In the more complex cases, the segment layout handler 163 may replace the area occupied by each original segment with the per-segment alternatives.

Segment layout handler 163 may create numerous combined layouts by combining all possible suggested per-layout alternatives in all possible combinations and return them to the SBL coordinator 161. The segment layout handler 163 may also filter the combined layouts according to specific rules before returning them to the SBL coordinator 161. Such rules may define which layout combinations have better quality, similar to the rule types described herein above for layout quality rater 47.

In an alternative embodiment, partial layout handler 162 may directly search for a combination of layouts which together match the signature of the handled component set. It will be appreciated that this may be computationally expensive, since it requires searching in the space of layout pairs.

One solution is for partial layout handler 162 to perform a linear scan of layouts having a smaller number of components than the handled component set, "subtract" each result from the handled component set (using vector subtraction), and search for possible matching layouts to the remaining components. If a sufficiently small number of components remain, they can be added below the suggested layout (to allow manual rearrangement)—possibly subject to arrangement using an auto generated layout.

SBL coordinator 161 may then merge the returned layouts for the 3 signature classes (page, completed partial, combined segments) and send them to matcher 66.

Matcher 66 may attempt to find a match between the handled component set of the incoming request page and every layout that may have been retrieved by SBL handler 64. Matcher 66 may construct a set of matched components (from both layouts) which is a subset of both, or alternatively may only allow exact match to be created.

It will be appreciated that each layout sent to matcher 66 may be considered a candidate layout unless a suitable match is not found between the handled component set of the incoming request page and a candidate layout—and in this case, the layout is rejected before it is presented to the user as a valid alternative layout for his page. As discussed herein above, layouts created by AGL hander 62 should provide a successful match as they are created based on the specific component list provided to AGL handler 62 (and preserving their website building system component ID— thus allowing the use of exact ID-base matching). This is to ensure that for all candidate layouts found, an accurate match may be made and therefore only relevant layouts may be presented to the user. It will be appreciated that the page level objects (from the incoming request page and the associated page of the selected candidate layout page) may include additional non-component information such as underlying template pointers, decorations, background design information etc.

It will be further appreciated that the layout level objects (handled component set of the current requested incoming page and candidate layout) may usually be a subset of their corresponding page level objects (i.e. [RL]⊆[RP],[CL]⊆[CP]) (RL=requested layout=handled component set, RP=requested incoming page, CL=candidate layout, CP=candidate page) as the page level objects may contain components which are not part of the current layout (e.g., decorations, components marked with "do not search according to this", omitted component, locked components etc.). It will be appreciated that the candidate page information may be retrieved from the associated layout package stored in layout database 70 as well as other useful information such as semantic types, links and dynamic layout links as discussed herein above. However, this is not always the case since component merger 144 and component splitter 146 may cause the layout level to contain such united/split components which are not included in the page level object.

It will be appreciated that the handled component set may be further "reduced" as the user may request searching based on a selected subset of the components in requested incoming page (instead of the entire current page).

It will also be appreciated that signature comparer 77 may perform at the layout level, i.e. the actual signature-based matching is between signatures extracted from the handled component set and the candidate layout.

It will be further appreciated that matcher 66 may create a matched component subset of the handled component set and the matched subset of the candidate layout. The matched component subset of the requested incoming page and the matched subset of the candidate layout may not always be of the same size. Matcher 66 may, for example, match an image component and a text component (in the incoming page) together with a single (image+caption) component in a candidate layout.

It will be appreciated that if a candidate layout is an automatically generated layout, the situation may differ since the automatically generated layout (candidate layout) is created directly from the components in the handled component set. Thus, there is no separate containing page associated with the candidate layout and the matching between the handled component set and the candidate layout is always exact and performed based on having identical component IDs (as discussed in more detail herein below). Since the layouts are identical, the matched components subsets are also identical.

As discussed herein above, matcher 66 may match some or all of the components in the handled component set and the candidate layout according to system defined component ID's.

It will be appreciated that for automatically generated layouts, ID-based matching always works, since the components included in the automatically generated layout are the same components that are included in the handled component set.

In the specific scenario in which the incoming request page and the candidate page are both pages derived from a common template (or have another inheritance-related relationship), matcher 66 may also perform ID-based matching.

It will be appreciated that in other scenarios (e.g. regular layouts from layout database 70), ID-based matching is not suitable and matcher 66 may use attribute-based component matching instead.

Matcher 66 may perform attribute-based component matching by dividing the components (in the handled component set and the candidate layout) into classes according to their semantic types.

Matcher 66 may typically use very abstract semantic types (i.e. high on the semantic tree) as classes, to provide wider matching. For example, a classification may use 4 classes based on major semantic types such as text, image, galleries and "other components".

Once matcher 66 has classified the components accordingly, it may sort the components in each class according to their size or possibly—in particular for text—their amount of content. The latter is done so a large text area containing small amount of text may be matched with a smaller text area which might be more suitable. Matcher 66 may further sort components having identical (or near-identical) areas according to additional attributes such as aspect ratio, position on screen etc.

It will be appreciated that such matching may omit components with extreme sizes (too large or too small) which cannot be matched with similar size components in the matched layout. Matcher 66 may also omit cases when the given layouts have conflicting sizes such as a Facebook like button component that has a fixed size and a contact form that has a minimum width.

Once matcher 66 has sorted the components in each class, it may use a matching algorithm to create the pairing as described herein above such as a greedy algorithm, the Hungarian algorithm or anything similar. It will be appreciated that components in each category are separately matched.

Matcher 66 may also use semantic link information created for the handled component set (during processing by page analyzer 44) and information retrieved for candidate layouts such as "components A and B should be close together" or "component A must be above component B with no inferring components". Matcher 66 may try to satisfy these requirements before matching the remaining components.

Matcher 66 may also use information from cross-category semantic links (i.e. links between component of different component categories, such as image and text components) when forming the matching. In such a case, matcher 66 may perform the matching sequentially (e.g. first matching all text components, then image components, etc.). The matching for a given category may rely on the matching done for previous categories.

Figure 29:
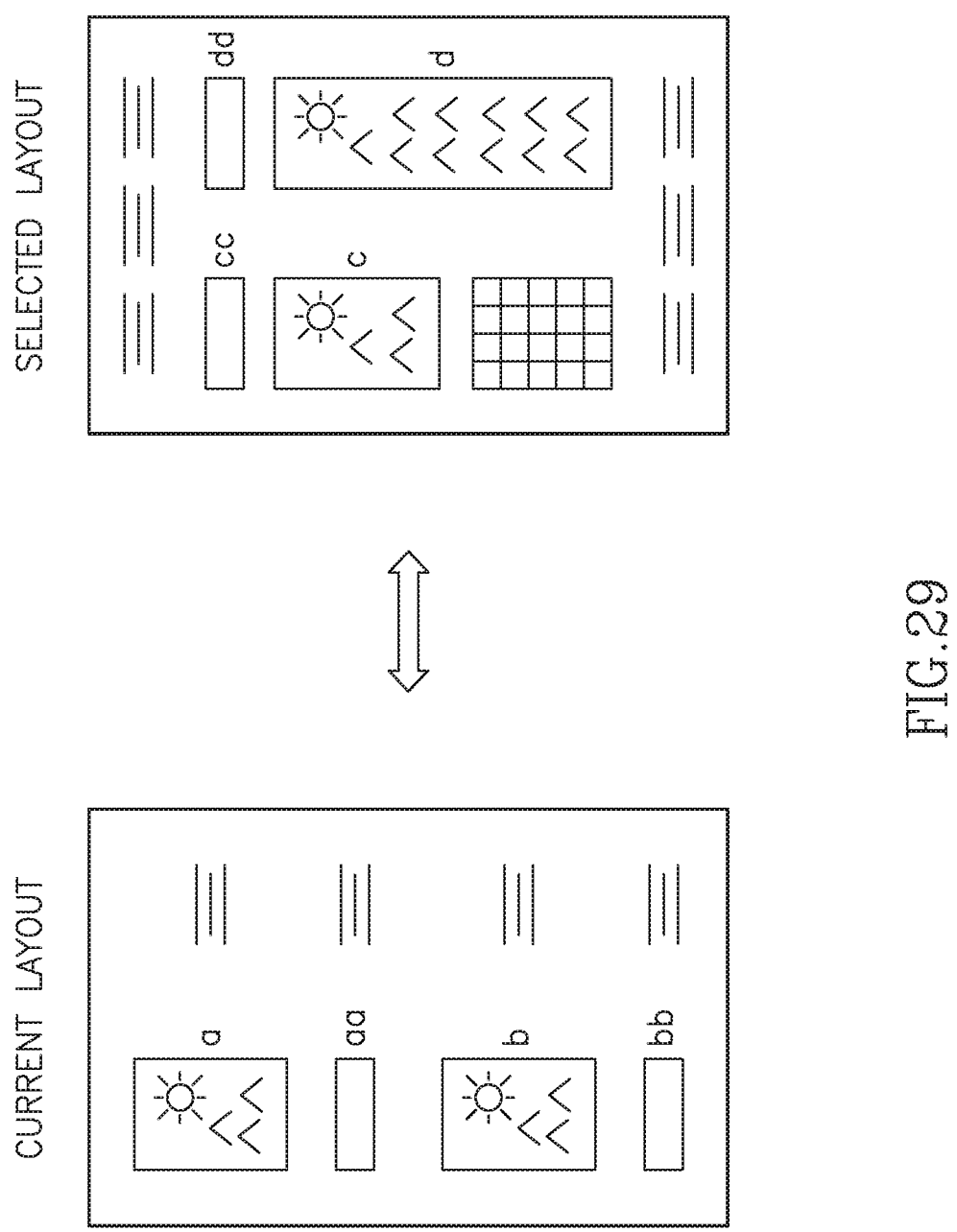
FIG. 29 is a schematic illustration of attribute-based component matching integrating semantic linking information; constructed and operative in accordance with a preferred embodiment of the present invention.

Reference is now made to FIG. 29 which illustrates attribute-based component matching integrating semantic linking information. As is shown in the figure:

The handled component set has 2 sets of components (picture+caption) marked a+aa, b+bb. Earlier on in the process, semantic link handler 141 may have created the semantic pairings [a]⇔[aa], [b]⇔[bb].

A candidate layout is retrieved a with 2 sets of components [c]+[cc], [d]+[dd]. This candidate layout includes (in its layout package) the semantic links embodying the [c]⇔[cc], [d]⇔[dd] semantic pairing.

Matcher 66 may first match the text category, resulting in the matching [aa]=>[cc], [bb]=>[dd], followed by matching the picture category.

When matcher 66 searches for a match for component a, it may see that it is semantically paired with component aa which was matched with component cc as component cc is semantically paired with picture component c, matcher 66 matches component a to component c directly and removes them from the sets of components to be paired (component a from the current layout component set, component c from the candidate layout component set).

It will be appreciated that in FIG. 29 the components in the current layout and the candidate layout do not match exactly, as the current layout has 4 additional text components whereas the selected layout has 6 additional text components and an additional data table component. This is permissible, since the current layout and the candidate layout are not required to match exactly.

It will be appreciated that matcher 66 may run on large numbers of candidate layouts from layout database 70 as produced by layout searcher and generator 60. It will be further appreciated that not all layouts found may have a successful match.

It will be further appreciated that all candidate layouts with a successful match may be forwarded to layout filter and ranker 45 to be filtered and ranked. Layout filter and ranker 45 may then forward the top (for example) ten ranked candidate layouts to layout adapter and applier 50 to adapt the current page to the new layout and apply any content accordingly. Layout adaptation may include a number of types of adaptations, such as component layout adaptation, e.g. size and position (the primary adaptation), component type adaptation; color scheme adaptation and decoration components from the selected page. System 100 may provide a user interface (UI), possible integrated with that of page editor 30, to allow the user to select the desired layout and to specify which types of adaptation to perform.

In an alternative embodiment to the present invention, matcher 66 may be part of layout adapter and applier 50. I.e. layout searcher and generator 60 may not apply matching to all candidate layouts, and only once the user has chosen his selected layout the matching process may take place. This may be less computationally expensive as the matching process is applied to the selected layout only and not to all located layouts.

In yet another embodiment, matching may take place after a preliminary filtering of the selected layouts by layout filter and ranker 45, and before the suggested layouts are presented to the user. Once a user has selected his desired layout, layout adapter and applier 50 may apply format and content from matched component subset of the selected layout to the matched subset of the current layout.

Figure 30:
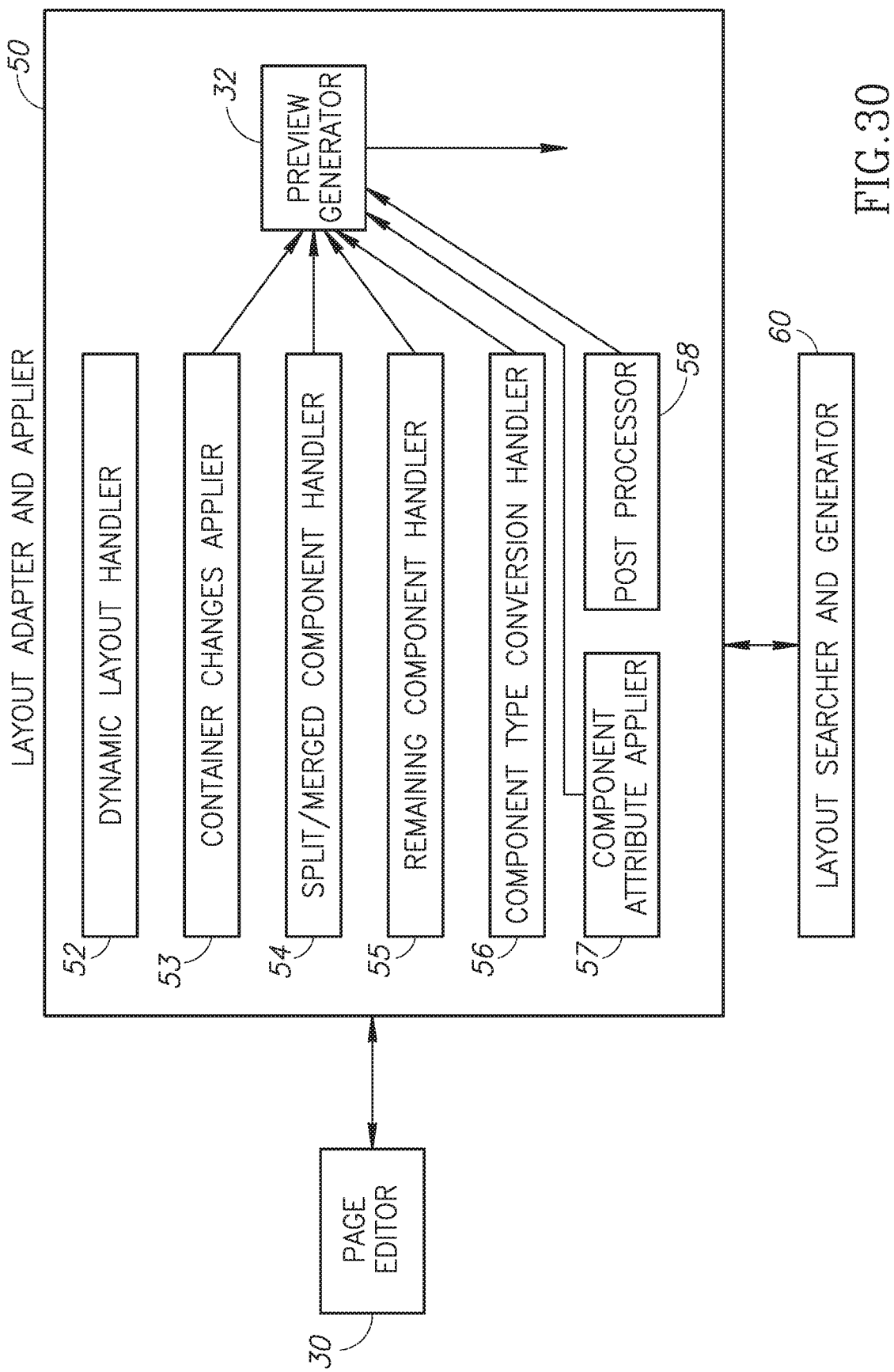
FIG. 30 is a schematic illustration of the elements of the layout adapter/applier of FIG. 3A; constructed and operative in accordance with a preferred embodiment of the present invention.

Reference is now made to FIG. 30 which illustrates the elements of layout adapter and applier 50. Layout adapter and applier 50 may comprise a dynamic layout handler 52, a container changes applier 53, a split/merge component handler 54, a remaining component handler 55, a component type conversion handler 56, a component attribute applier 57 and a post processor 58.

It will be appreciated that layout adapter and applier 50 may copy over the main attribute values (such as position, size and z-priority) for the matched components from the selected layout to the handled component set. Layout adapter and applier 50 may also handle any unmatched components between the handled component set and the handled component set matched components and between the candidate layout and the candidate layout matched component set. It may also handle any remaining components in that appear in either the handled component set or the candidate layout (but not both) or those that appear in the incoming request page or the selected layout (but not both). Once layout adapter and applier 50 has adapted the candidate layout accordingly, previewer 32 may present the candidate options to the user via previewer 32 in order for a user to select his desired selected layout.

Component type conversion handler 56 may convert the type of each component in the matched subset of the handled component set if two components of different types have been matched.

Component attribute applier 57 may copy the position, size and z-order of the components of the matched subset of the candidate layout.

Component attribute applier 57 may also apply other component attributes, such as the colors, style or display properties of the components (e.g. the number of row/columns in a gallery component).

Component attribute applier 57 may apply the color scheme (as discussed in US Patent Publication No. US-2014-0237429 entitled "A System for Supporting Flexible Color Assignment in Complex Documents" published 21 Aug. 2013, issued as U.S. Pat. No. 9,513,771 on 6 Dec. 2016, incorporated herein by reference and assigned to the common assignee of the current invention.)

Dynamic layout handler 52 may copy over any dynamic layout explicit anchors and relationships to the new layout as applicable. It will be appreciated that layout adapter and applier 50 may break some anchors when (for example) one of the anchored components is not included in the mapping. It will further be appreciated that once the layout (and other information) has been applied, dynamic layout handler 52 may apply dynamic layout processing to handle component size/position changes (e.g. if it has to immediately apply a component size change due to larger amount of content in the handled component set when compared to the selected layout).

It will be appreciated that changing a component type while preserving the content and parameters of the component (e.g. display parameters of a gallery) may require system 100 to support component type conversion, e.g. support assigning the content and attributes of a component of one type to a component of another type whenever possible.

Component type conversion handler 56 may define specific conversion rules and procedures to handle specific type conversions such as do not convert a video to an image—keep the original video component type, when converting a third party application, only convert to a new third party application of identical type (e-shop to e-shop etc.).

As discussed herein above in relation to container handler 143, containers may be handled in a number of ways, including keeping the container and using hierarchical signatures, flattening the container and attaching the contained components to the parent page, flattening combined with container reconstruction, converting single-component containers to regular components, converting the container to a new dummy component (discarding the contained sub-components) and assigning the type of the dominant sub-component inside the container.

Container changes applier 53 may use asymmetric handling: applying container flattening on the stored layouts side (i.e. in the selected layout), and dominant type assignment on the handled component set/current layout side. In this scenario, the selected layout may represent an incoming requested page container by a single placeholder component—matched with another single component in the selected page.

Container changes applier 53 may adapt this placeholder component to the matching component in the selected page. It may replace the placeholder component with the original container (including the sub-components originally contained inside it).

Container changes applier 53 may also adapt the container to the size, position and z-order of the matching selected page component. It may also adjust the relative size and position of the sub-component inside the container to the new size and possibly apply dynamic layout to compensate for the changes. It will be appreciated that container changes applier 53 may perform recursively on all containers at all levels.

It will also be appreciated that in addition to containers there may be other scenarios in which two or more original current page components could be merged into a single current layout component. These may include, for example components which overlap too much that have been united into a single component, text components above each other which were stitched together, multiple image components stitched together, and multiple image components converted into a gallery.

In all of these cases, split/merged component handler 54 may draw a minimal enclosing rectangle surrounding the pre-merge component set, and this rectangle is used to set the size and position of the dummy placeholder component. Thus split/merged component handler 54 resizes and moves the contained components as discussed herein above for containers when creating a match to the placeholder component (on the current page side).

It will be appreciated that [A]-[B] refers to elements in [A] which are not in [B] (also known as relative complement). It will be further appreciated that there might be additional components not included in the matching. For example, the difference of the components between the handled component set and the selected layout i.e. components in the pages omitted from the compared layouts.

There also may be components in the compared layouts (handled component set and selected layout) which were not matched by matcher 66.

Remaining component handler 55 may handle components which appear in the incoming request page but are not included in the selected layout (such as decorations, or unmatched components in non-exact-matching scenario) by dividing them into two-categories—layout relative and non-layout relative components. Layout-relative components are page components which are related to the layout component (but are not part of the layout component set itself). Remaining component handler 55 may identify such a relationship through explicit specification, proximity, dynamic layout anchoring or component content analysis. Remaining component handler 55 may move and resize these components together with the layout components to which they are related.

Non-layout-relative components are the additional components in the page which are not in the layout and are not layout relative. These may include (in particular) components which have been specified as locked by the user and they are kept in place and not moved or resized.

It will be appreciated that components which appear in the selected page but are not included in the selected layout may be considered non-layout components (decoration or otherwise excluded). Remaining component handler 55 may ignore them and may not transfer them as part of the layout adaptation.

Remaining component handler 55 may support an exceptional case for the transfer of non-layout components (or other page elements) which is important for the layout. An example would be a non-layout background picture component to which the layout components have been carefully adapted (e.g. the components reside in "holes" in the picture). The component may be marked so that it is copied over in case of adaptation even through it is not a part of the regular layout. In fact, such a background picture may even be marked as "critical", meaning it would override any existing current page background picture (if such one exists).

Remaining component handler 55 may handle layout components which are not in the matching as follows. For unmatched components in the current page, i.e. components that appear in the current layout but not in the current layout matched set, remaining component handler 55 may instruct AGL handler 62 to create an automatically generated layout based on these remaining components. Remaining component handler 55 may then arrange this newly-created automatically generated layout below the bottom-most component in the adapted current matched component set (i.e. the current matched component set adapted based on layout information from the selected layout. Remaining component handler 55 may merge the automatically generated layout with the adapted current matched component set.

Remaining component handler 55 may ignore unmatched components in the candidate layout and may not transfer them as part of the layout.

It will be appreciated that all changes made by remaining component handler 55 may affect additional components through dynamic layout processing of the page (e.g. moving components pushing down other components). Thus, the user may edit the adapted incoming request page and candidate layout via page editor 30 and may determine how to handle each component (e.g. moving it, discarding it or otherwise modifying it).

It will be appreciated that page analyzer 44 may perform many transformations (as described herein above) which should be closed—i.e. reversed or handled before the final process. For example, container handler 143 may perform container analysis and transformations such as the replacement of tightly wrapped containers which may have to be undone on the final page. Post processor 58 may perform all reverse transformations where required. It will also be appreciated that it may reverse transformations performed by semantic link analyzer within matcher 66 and container changes applier 53.

It will be appreciated that layout adapter and applier 50 may apply to parts of pages or split pages, since it may be required to apply multiple layouts to multiple page parts in pages which have been segmented.

Once layout adapter and applier has finished—the resulting new layout may be presented to the user via previewer 32.

Thus system 100 may be used to provide a user with semantically similar layouts to a current page for use which may be automatically updated format and content wise.

It will be appreciated that system 100 may allow the construction of a designer layout community in which high quality layouts could be marketed. This may act similarly to an application store. Once a layout or layout family has been purchased, these additional layouts would be available to the purchasing user and used in his or her layout queries. Users may also follow specific designers (whose style they prefer), create private layout libraries etc.

System 100 may further include a mechanism for the promotion of specific layouts and for the creation of a layout marketplace (including promoted search capabilities which may be integrated with the layout ranking by layout filter and ranker 45 as described herein above).

It will be appreciated that the discussion of system 100 has been limited to searching according to the components in a single page which are used as the search key (the handled component set). In an alternative embodiment, system 100 may also be applied to searching according to multiple pages (i.e. multiple handled component sets) and thus used for template selection expansion. An example of this is when initially creating a page and the designer is presented with a set of possible templates (e.g. page or page section templates). The user may select a subset of the offered templates and expand it using "search for more such templates". Another use may be when performing a selection (in layout database 70) based on the currently edited page; the user may select a subset of the offered layouts and expand it (by searching for additional layouts semantically equivalent to the selected subset). This is a "search based on search results" capability.

In this scenario layout searcher and generator 50 may make multiple selections using the signature extracted from each handled component set. It may unite the multiple selected results and then diversify the suggested results according to the multiple handled component sets, to locate suggested layouts as visually different as possible from each of the handled component sets (and not just from the handled component set used to search for the specific result set).

Figure 31:
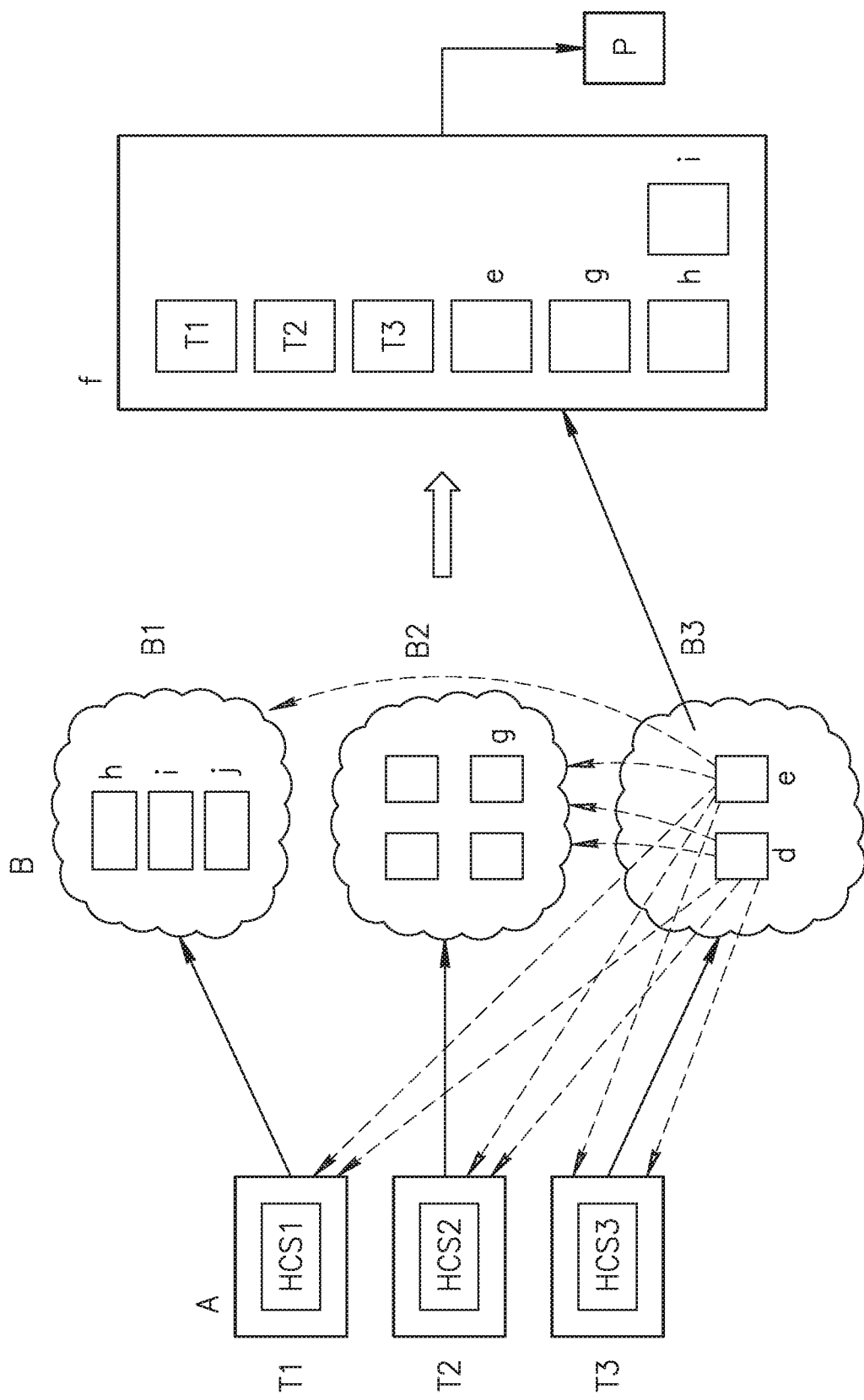
FIG. 31 is a schematic illustration of joint result diversification for multiple layout database queries; constructed and operative in accordance with a preferred embodiment of the present invention.

Reference is now made to FIG. 31 which illustrates a joint result diversification for multiple layout database queries. As is illustrated, a request is made by a user for alternative layouts when 3 templates are available (e.g. under a given template category) T1, T2 and T3.

Page analyzer 44 may extract from these 3 templates the handled component sets HCS1, HCS2 and HCS3.

Based on these 3 handled component sets layout searcher and generator 60 may select 3 semantically similar results sets B1, B2 and B3, each of which contain additional possible templates. For example, B1 contains the 3 template pages h, i and j which are most semantically similar to HCS1.

Layout ranker and filter 45 may jointly evaluate all located pages/layouts in all resulting sets of B for diversity, by comparing each possible layout against all layouts—including original layouts (in set A) as well as all layouts in set B (as is shown for e and f in the figure). It will be appreciated that layouts may be compared to non-semantically-equivalent layouts for diversity.

Layout searcher and generator 60 may create the expanded suggested template list, which may include the original A layout, as well as some selected layouts from B (e.g. e, g, h and i). The user may select templates from this expanded list to create P, the actual page.

It will also be appreciated that system 100 may also be used to provide layout and formatting to pages containing data collections that do not have a current design. Such pages may be uniform in structure, or each may have its own data structure. Examples include pages imported from sources such as external databases, XML record or RSS data feeds. An additional data source may be a manual data entry editor, which may be very quick to use, since no formatting should be defined—just the raw data.

In such a scenario, system 100 may review the data for the current page, and create a signature based on the data types of the imported data. Such data type determination may be based on actual specified data types (e.g. database field types, XML entity types etc.), data types determined by analysis of the content of the imported data (e.g. recognizing text field or type and format of included media files) and data types specified by the user through an editor attached to the import module. For example, system 100 may determine that a given data field is a text field, but the user may provide further information (e.g. classifying the field as title text rather than regular text).

In addition to the data types, system may determine additional information from the field, such as expected size (based on the amount of content or the size of provided media files). System 100 may then use the gathered information to create a semantic signature as described herein above, and use this signature to search for semantically matching layouts.

Once an appropriate candidate layout is selected, the information from the candidate layout is used to create a layout for the existing data. System 100 may repeat this process for all imported pages, and the system may re-use selected layout determinations made for previous pages for the new page (e.g. when pages use the same XML schema or just have identical/similar fields).

In this embodiment, signature extractor 147 may extract the signature from the set of current data fields (which serves as a handled component set), instead of being extracted from an actual page or part thereof.

Diversifier 49 may process the located layouts, but without comparing them to the non-existent "current design". Layout adapter and applier 50 may copy over the full set of attributes (as well as decoration components otherwise ignored) from the selected layout.

It will be appreciated that a website building system typically provides a number of templates for users to use as a foundation for their application. Templates provide ready-made pages, designs, components, content, color schemes etc. and make the user's job considerably easier. The site is then created as a series of modifications to the templates (changes, additions and deletions). However, the site structure becomes tightly coupled with the selected template, and if the user desires to switch to another template it is often difficult, if not outright impossible.

In an alternative embodiment, system 100 may apply a new layout to the existing site based on existing template, and thereby switch to a different template. In this scenario, system 100 may allow the user to arbitrarily select a selected layout from the full or a partial pool of layouts, without limiting the selecting to suggested layouts having a substantial semantic similarity to the current page. This way, the user could switch to any desired template—even if it is substantially different (semantically) from the existing one. Of course, if the switched-to template is wildly different than the existing one, the adaptation to the new template would suffer in quality.

System 100 typically has full information regarding the original template page used to create the current users' page. Thus, system 100 may distinguish between the underlying template definitions and later modification. Layout adapter and applier 50 may be modified to handle the underlying template first, and then re-apply the later changes—thus allowing smooth template changing.

It will be further appreciated that website building system vendor may further facilitate template switching by creating families of templates which have an underlying mapping between their members (e.g. based on common IDs inherited from a single master template). Such underlying mapping could be augmented by layout adapter and applier 50 by matching additional components. Thus, the user would be able to switch between templates in the same family very easily.

As discussed herein above, system 100 typically uses a visual editing environment which allows a user to create the various web site pages. System 100 may handle user-defined layouts which include a single web page, or a section thereof and may also search among extracted layouts. These extracted layouts may be collected from existing applications managed by system 100, may be automatically generated, may be manually created for system 100 or may be collected from external sources on the web, including retaining back links to that information (such as external sources 25).

System 100 may compare layouts based on an extracted semantic signature, with the semantic signature (and the comparison process) based on a hierarchy of component types as is illustrated in FIG. 9, back to which reference is now made. Thus system 100 may find multiple semantically identical alternative layouts to the current page/page section.

Applicants have further realized in an alternative embodiment to the present invention, that system 100 and its ability to retrieve semantically identical alternative layouts to the current page/page section may be extended to be used with other systems and technologies that typically generate a single layout or visual data structure (as described in more detail herein below) as well as additional types of visual design systems that are not website building systems, and may be used to find and retrieve multiple semantically identical alternative visual data structures based on a hierarchy of components belonging to the pertinent non-website building system.

Figure 32:
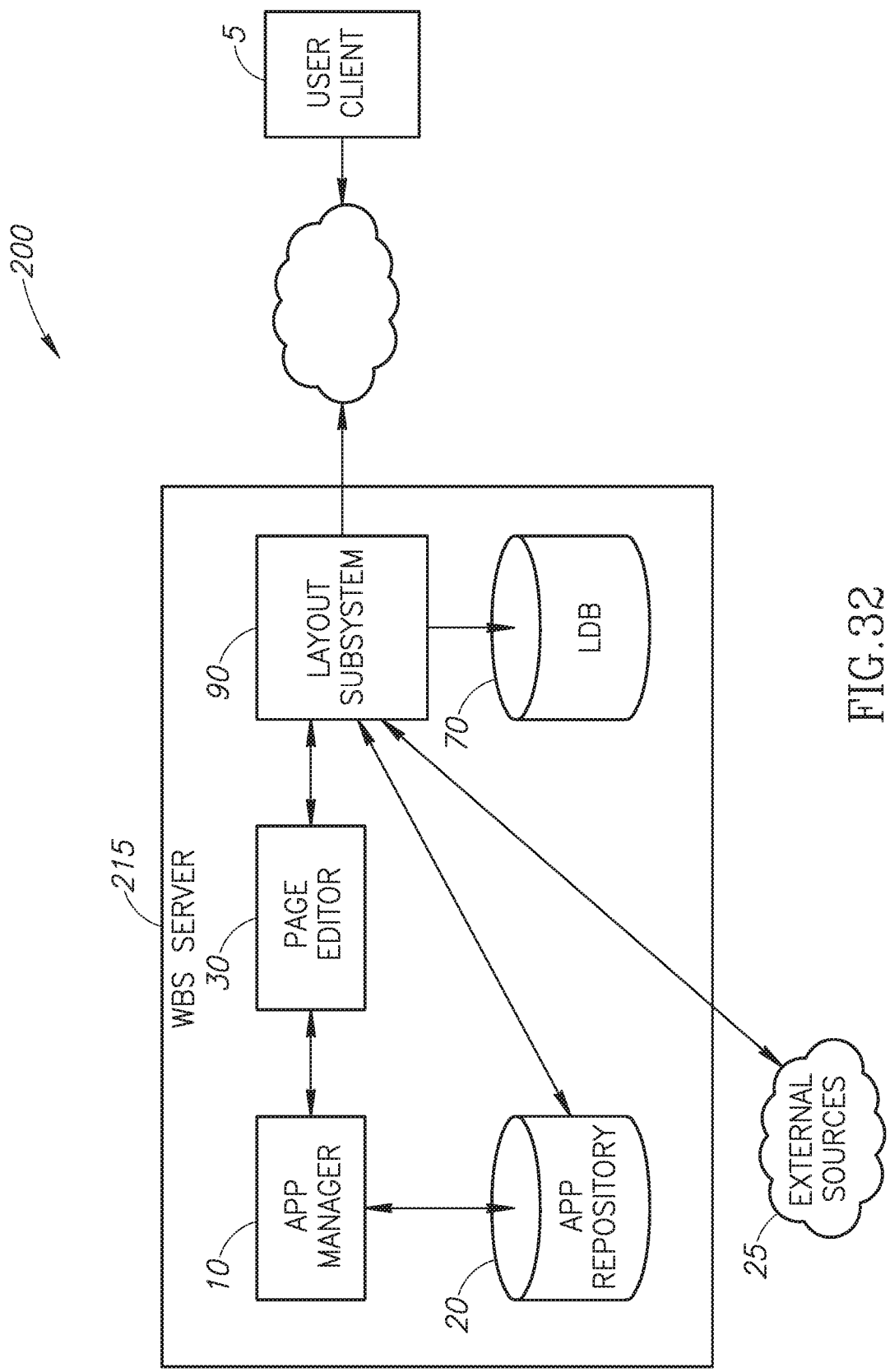
FIG. 32 is a schematic illustration of an alternative embodiment to the system of FIGS. 3A and 3B, constructed and operative in accordance with a preferred embodiment of the present invention.
Figure 33:
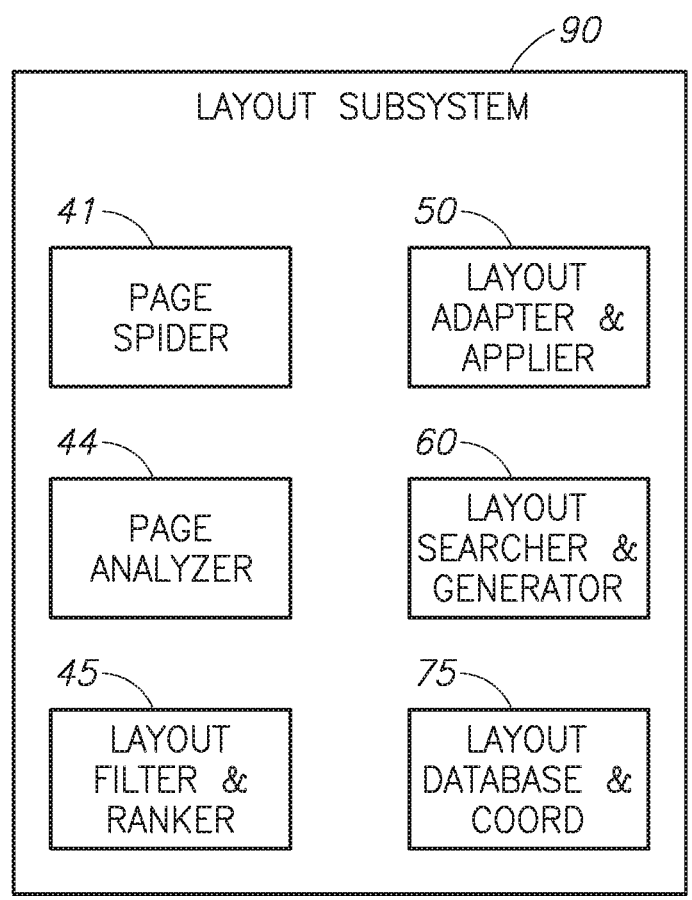
FIG. 33 is a schematic illustration of the elements of the layout system 90 of FIG. 32, constructed and operative in accordance with a preferred embodiment of the present invention.

Reference is now made to FIG. 32 which illustrates a system 200 for generating visually diverse alternatives and visual data structures for a non-website building system according to an embodiment of the present invention. System 200 may be similar to system 100 as described herein above but may comprise a server 215 as an alternative embodiment to server 15 as is illustrated in FIGS. 3A and 3B. Server 215 may comprise a layout sub-system 90 which may further comprise the main system elements as described herein above, i.e. page spider 41, page analyzer 44, layout filter and ranker 45, layout adapter and applier 50, layout searcher and generator 60 and a layout database coordinator 75 as is illustrated in FIG. 33 to which reference is now made. It will be appreciated that the term visual data structure may also incorporate layouts as discussed herein above. It will be appreciated that this embodiment, layout adapter and applier 50, layout searcher and generator 60 and a layout database coordinator 75 may also handle visual data structures.

System 200 may incorporate other types of systems (e.g. generating mobile or other native applications vs. websites). System 200 may also handle different categories of layouts (e.g. multi-page layouts vs. sub-page layouts). System 200 may also use a different methodology to define the handled component set (for example user-defined vs. system-defined). System 200 may also utilize different sources of layouts and methods of layout construction (e.g. using constructed layouts based on extracted business information).

It will be appreciated that system 200 may also utilize additional data in the comparison between layouts as described herein above (such as using business-related information as part of the signature definition) and utilize different methods of performing matching between layouts. A description of these additional embodiments follows. It will be appreciated that the additional embodiments described herein below may be implemented independently or alternatively may be combined.

Figure 34A:
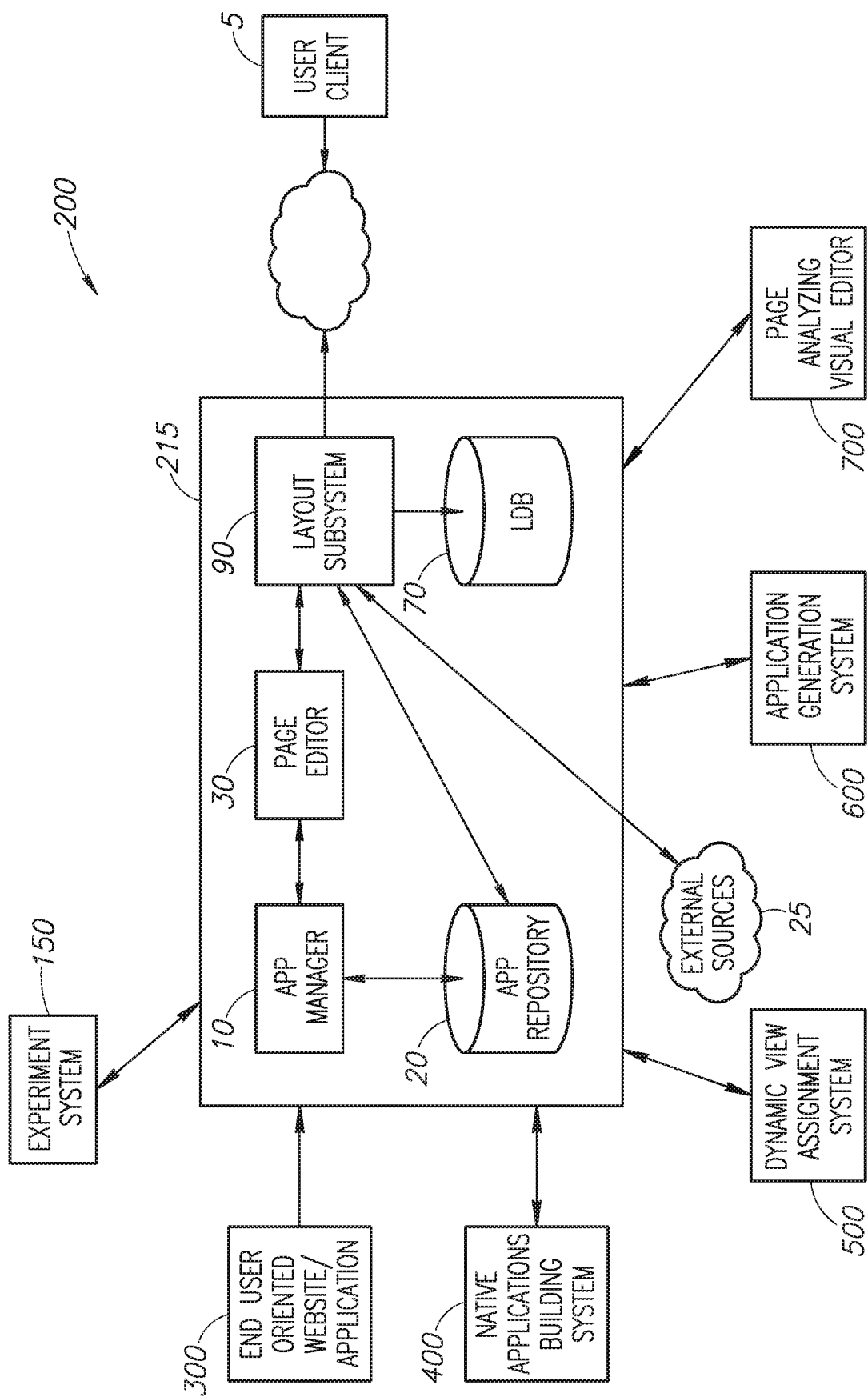
FIG. 34A is a schematic illustration of the different embodiments of use for the system of FIG. 32, constructed and operative in accordance with a preferred embodiment of the present invention.

Reference is now made to FIG. 34A which illustrates some of the different embodiments in which system 200 may be implemented. As is illustrated, system 200 may be incorporated with an experiment system 150, an end-user oriented website or application 300, a native application building system 400, a dynamic view assignment system 500, an application generation system 600 and a page analyzing visual editor 700. The functioning of system 200 with these systems is described in more detail herein below.

Such visual design systems as described herein above, may include visual design systems used to create stand-alone applications such as desktop application development environments (e.g. for use with personal computers); mobile application development environments (e.g. for use with Smartphones and tablets); client-server application development environments and non-browser web application development environments (for use with environments such as Adobe's flash player); plug-in development environments—systems which create plug-ins and other add-on elements for other systems (web browsers or otherwise) and shop-builders—systems which focus on the creation of e-shops (or e-commerce sites).

Such visual design systems may be hosted on a desktop computer or on a device targeted by system 200 such as a mobile device.

It will be appreciated that in this embodiment, the components handled by system 200 may be associated with back-end or server-side elements. In particular, selecting a specific suggested layout (which represents the front-end view of the application or other entity edited by the visual design system) may require changes to be made to the back-end or server-side elements of the pertinent edited application.

Visual design systems may also include multi-target visual design systems which may target multiple devices or platforms. An example would be a visual design system which allows a user to design application which is deployed as a web site, a desktop application and a mobile application.

Such a visual design system may employ a central repository (whose content defines the created application) and convert it to different versions to support the different platforms. This conversion may be performed on-line (i.e. as the application is being run) or off-line (i.e. ahead of the application use).

Furthermore, the visual design system may have its own look and feel (which is used across platforms) and may adapt the created application to the look and feel of each platform (e.g. creating a website which is different in look and feel from the generated mobile applications) or use a combination of the two methods. The visual design system may be further adapted to specific sub-platforms, e.g. producing a different look and feel when run on iOS (from Apple) or Android (from Google).

It will be appreciated that as different application variants may have a differing look and feel, the visual design system may generate layout alternatives which are relevant to multiple target platforms (e.g. specifying the general layout but not the exact component visuals), or alternatives specific to a given platform only.

Thus system 200 may be used in conjunction with various types of application conversion and site creation systems, such as a visual design system which converts an existing website into a website building system based website, a visual design system which converts a website building system based website into a native mobile application and a visual design system which converts an existing (mobile or other) application into a website building system-based website.

System 200 may also be used in conjunction with visual design systems which extract information from various sources and integrate it to create a website building system based website. Such information sources may include any combination of information provided by the user (e.g. through pop-up dialogs and questionnaires), information gathered on-line about the user (e.g. from on-line databases and information web services) based on seed information provided by the user (such as existing business name) or on previously collected information, information similarly gathered from off-line sources about the user, e.g. by forwarding an information request to relevant information providing agency and receiving their reply and integrating it into the knowledge gathered about the user and information collected from online web presence(s) of the user (such as Facebook pages, a Yelp description or a LinkedIn profile) to generate a website building system based website.

It will be appreciated that such visual design systems may require the collection and use of extended semantic information as described in more detail herein below.

As discussed herein above, system 100 focuses on handled component sets which may include a full page or a subset of the components in the page. It will be appreciated that in an alternative embodiment, system 200 may be configured to handle larger-than-page handled component sets.

Larger-than-page handled component sets may include (or a combination thereof) a set of (possibly related) pages, such as an e-commerce site section which includes a product list page, a single product page and a checkout page. Larger-than-page handled component sets may also include a set of sub-page entities spread over multiple pages, such as a set of per-page navigation menus having a common style.

System 200 may suggest alternative layouts for each of the pages/page sections separately (using separate semantic signature comparison for each), or use a combined search which offers alternative layouts for the entire set of pages/page sections simultaneously. It will be appreciated that the semantic signatures for such larger-than-page handled component sets may be extracted using the same methodology as described herein above.

It will be appreciated that the basic purpose of system 200 is to present a user with a number of alternative layouts to his current design based on a criterion of at least quality and diversity. This may allow the user to explicitly select his preferred layout from a selection of presented layouts.

It will also be appreciated that a user may base his decision not only on the visual quality of the page but also on one or more specific metrics which may test the effectiveness of the pertinent page. Such a metric may be based on (for example) on an explicit user action metric e.g. the percentage of users completing the registration process in a designed registration form. It may also be based on an implicit user metric such as the length of time the user spends in the page, or on a metric measured over other parts of the system (different from the one for which alternative layouts are being evaluated). For example, the percentage of users completing a form dialog X which is explained in the tutorial page Y for which multiple layouts Y1/Y2/ . . . are being evaluated.

Thus in an embodiment of the present invention, system 200 may include A/B testing or multivariate testing capabilities. This testing may allow the user of the website building system to define multiple variants of a given page, provide these different variants to his different end-users (automatically), and measure the resulting metrics value, providing statistical information on the effectiveness level of each variant based on the relevant metrics. Thus the user of the website building system may design his website accordingly.

Figure 34B:
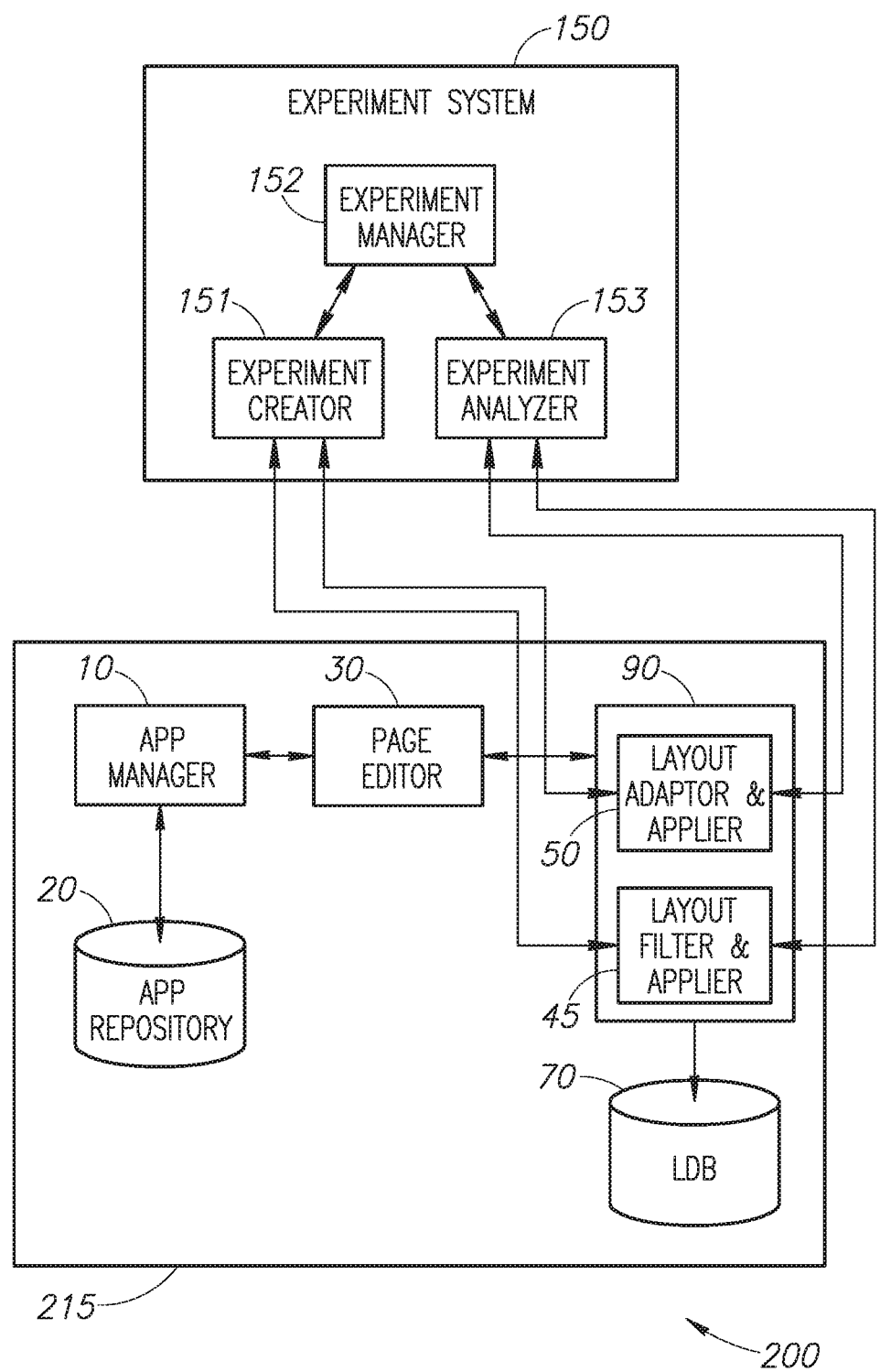
FIG. 34B is a schematic illustration of the use of the system of FIG. 32 with an experiment system, constructed and operative in accordance with a preferred embodiment of the present invention.

Reference is now made to FIG. 34B which illustrates the embodiment of system 200 comprising an experiment management system 150 in accordance with an embodiment of the present invention. Experiment management system 150 may further comprise an experiment creator 151 which may setup the desired requirements of the experiment and an experiment analyzer 153 to receive and analyze the test results and an experiment manager 152 to coordinate and run the experiments. It will be appreciated that the functioning of experiment system 150 may be similar to that as described in US Patent Publication US 2016/0124839 entitled "A SYSTEM AND METHOD OF HANDLING COMPLEX EXPERIMENTS IN A DISTRIBUTED SYSTEM" published 5 May 2016, incorporated herein by reference and assigned to the common assignee of the current invention. It will be further appreciated that in this embodiment, layout filter and ranker 45 and layout adapter and applier 50 may be connected to both experiment creator 151 and experiment analyzer 153 as is illustrated.

It will also be appreciated that is this scenario, experiment creator 151 may create such an experiment automatically, using the suggested layouts as the multiple page variants, and automatically building an experiment to be deployed and to provide the result to the user. It will be appreciated that experiment creator 151 may also use the top X suggested variants, or a subset of such variants (e.g. by allowing the user to select which of the variants will participate in the experiment).

It will be appreciated that the above mentioned discussion has focused on the use of systems 200 in website building systems, visual design systems and other website/application editing or generation systems. However, system 200 may also be implemented inside end-user oriented websites and applications 300 whether they are automatically generated or explicitly edited, rather than the designer-oriented editing or generation system.

One example of suitable end-user oriented websites and applications 300 are websites and applications which support generated user content. Such websites and applications may include, for example log creation systems, systems and websites which allow users comments and responses and end-user systems which allow a user to design an on-line presence page including the Facebook social network, Yelp, e-Bay and others.

Another type of end-user oriented websites and applications 300, is systems which provide multiple display options such as websites and applications which support multiple display options for some or all of displayed views in the system. An example is an e-commerce website or application which allows end-users to switch between different views of (for example) the product page during run-time (i.e. while shopping), and configure which elements of the product page to display (e.g. product image, description, price, reviews, link to similar products etc.).

Thus, once the user has configured which elements to include in a given product page, system 200 may select semantically equivalent and visually diverse views (as described herein above). Such views may include views with fields that do not exactly match the ones defined by the user but are semantically matched and possibly modified or extended to provide an appropriate semantic equivalent.

In yet another embodiment of the present invention, system 200 may be used in conjunction with systems that are used to build and edit native applications (mobile, desktop, client-server or otherwise) herein referred to as native application building systems 400. Native application building systems 400 are described in US Patent Publication No. 2017/0032050 entitled "SYSTEM INTEGRATING A MOBILE DEVICE APPLICATION CREATION, EDITING AND DISTRIBUTION SYSTEM WITH A WEBSITE DESIGN SYSTEM" published on 2 Feb. 2017 and assigned to the common assignee of the present invention It will be appreciated that such embodiments may include some specific characteristics as detailed below.

It will be appreciated that native application building systems 400 are often built based on code components which do not directly correspond to visual screen components, but rather to real-world or business related components. For example, a shopping cart component can be "spread" over multiple visual screens, and co-exist with additional components in the same screens.

Furthermore, native application building system 400 components may have additional "background" attributes which are related to the computing environment, underlying hardware or other non-display factors. For example, a map display component may require GPS location ability, which may only be available on mobile devices but not on desktop devices. System 200 may use such information to determine which layouts should be offered to the user, offering (for example) layouts which include a map component in some cases, and not offering them in other cases.

Thus, the selection of semantically equivalent alternative layouts (which will typically include alternative components) by system 200, may require a matching process that is more complex than the signature comparison process noted above. This may affect multiple parts of the system, including page analyzer 44, layout searcher and generator 60 and signature comparer 77.

It will be appreciated that system 200 may extract, store and compare extended signatures that include additional information regarding the attributes and constraints of the component in the layout as described above.

System 200 may analyze and compare such extended signatures by extending the algorithms described above (e.g. semantic comparison based on component type tree) to use additional non-visual elements and attributes to the compared multi-dimensional signatures. For example, system 200 may perform signature comparison using a component semantic tree which contains includes business-world semantic information. For example, system 200 may combine together various types of text components which are related to the "business description" in one semantic sub-tree, and the various text components related to "team description" in a separate semantic sub-tree.

Figure 35:
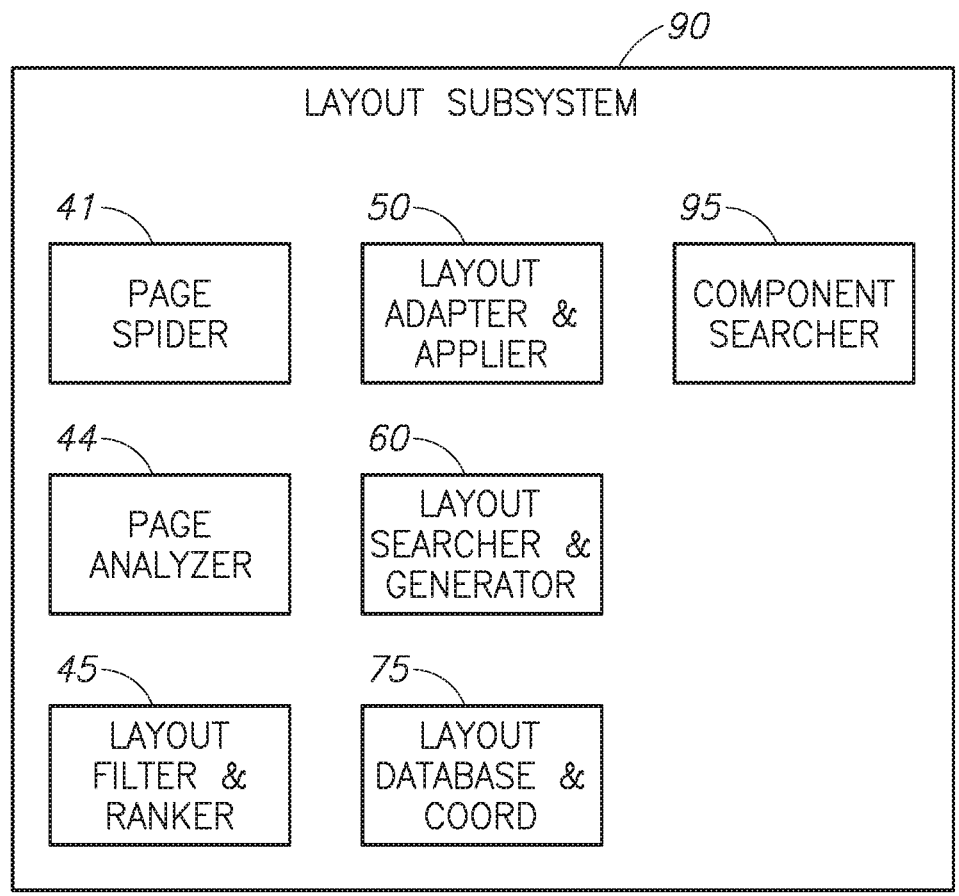
FIG. 35 is a schematic illustration of an alternative embodiment of elements of the layout system 90 of FIG. 32, constructed and operative in accordance with a preferred embodiment of the present invention.

System 200 may analyze and compare extended signatures based on graph matching. In this embodiment, layout subsystem 90 may comprise a component searcher as is illustrated in FIG. 35 to which reference is now made.

Signature extractor 147 may represent layouts as graphs of components which may be searched by component searcher 95 using algorithms for graph similarity or subgraph matching such as described by Danai Koutra, Ankur Parikh, Aaditya Ramdas, Jing Xiang, Machine Learning Department, Carnegie Mellon University 2011 "Algorithms for Graph Similarity and Subgraph Matching" http://www.cs.cmu.edu/~jingx/docs/DBreport/pdf. It will be appreciated that component searcher 95 may focus on similarity rather than precise match.

Figure 36:
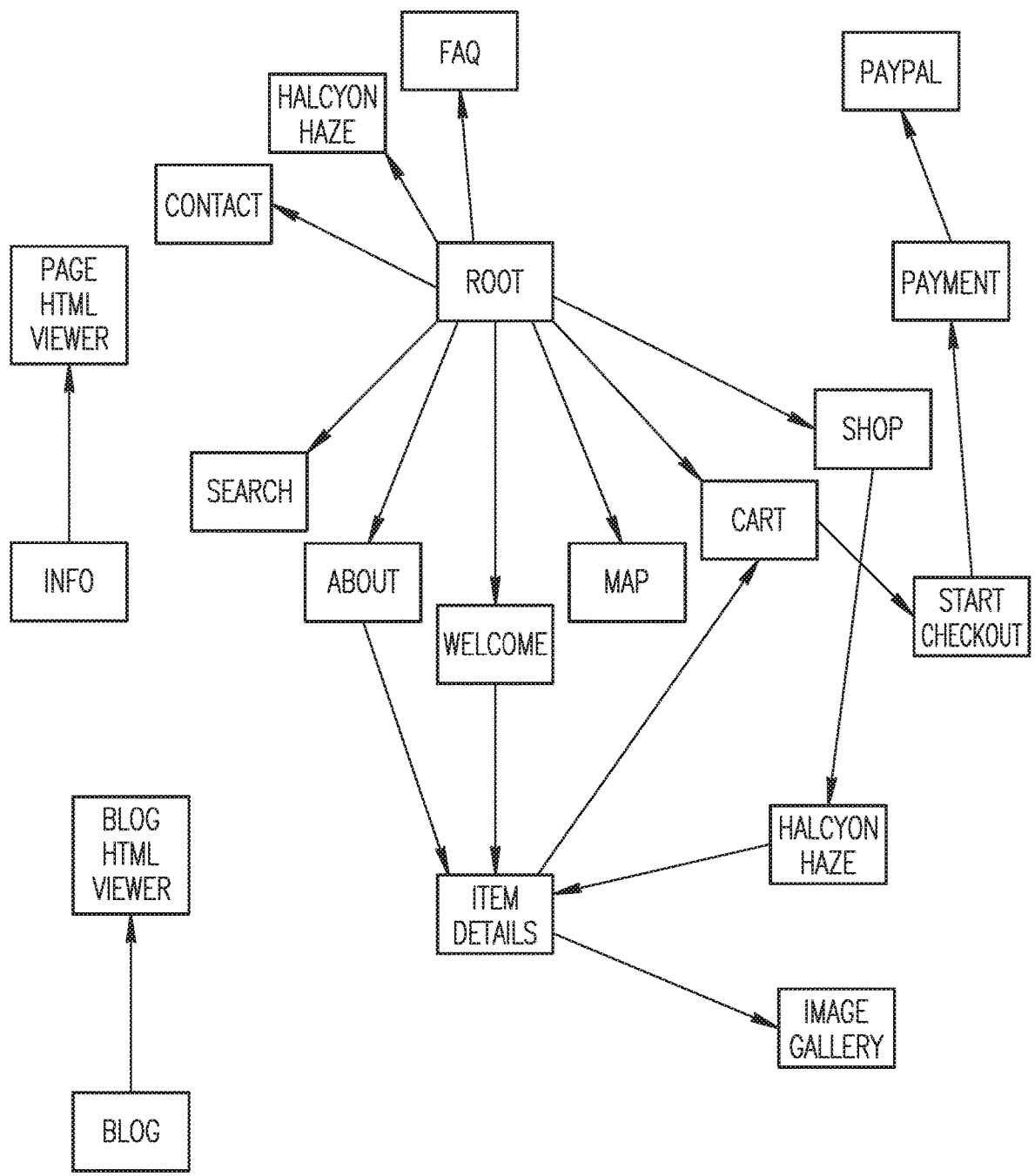
FIG. 36 is a schematic illustration of a graph describing an E-commerce application at the page level.
Figure 37A:
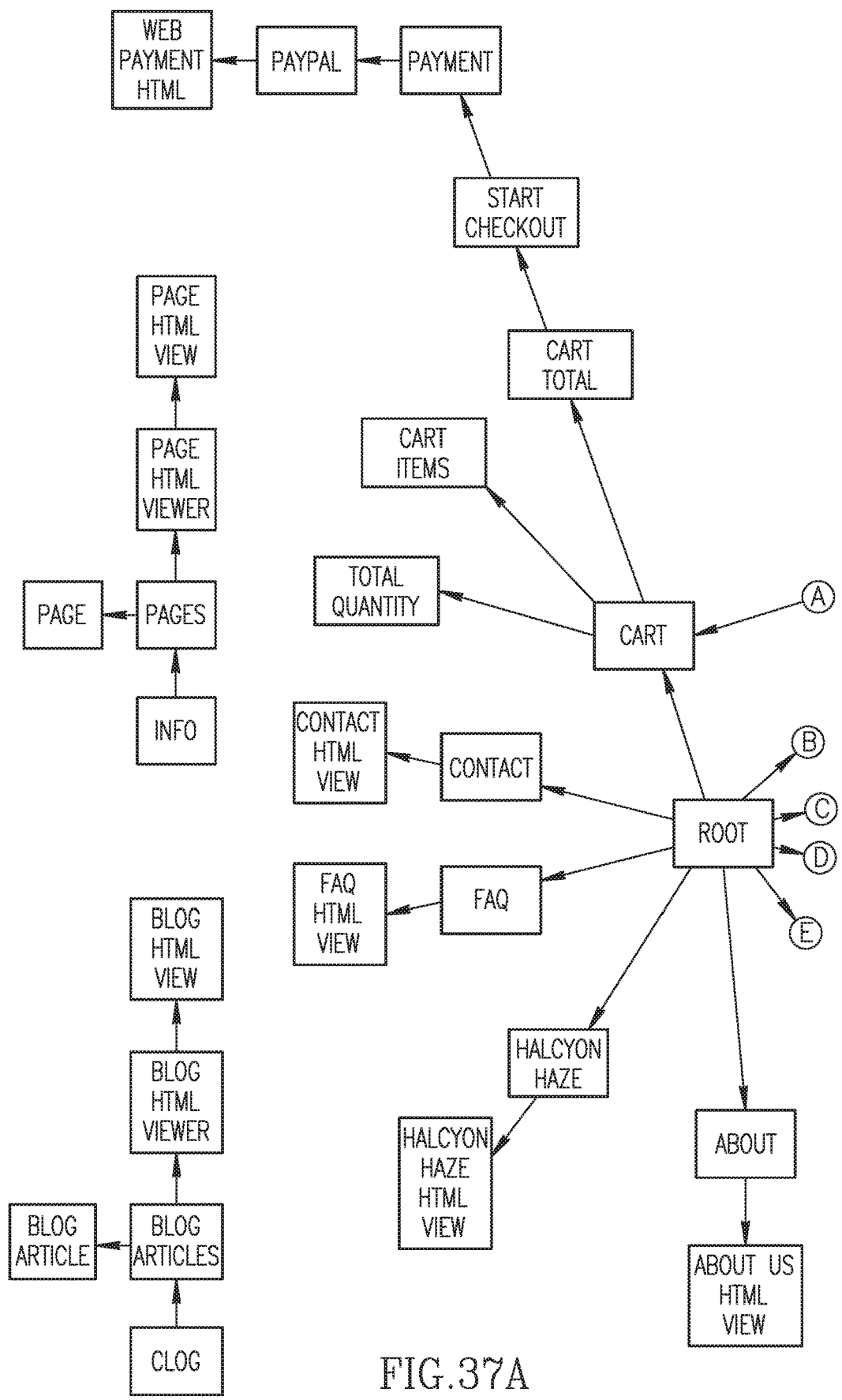
FIGS. 37A and 37B are schematic illustrations of two parts of a graph describing an E-commerce application at the component level.
Figure 37B:
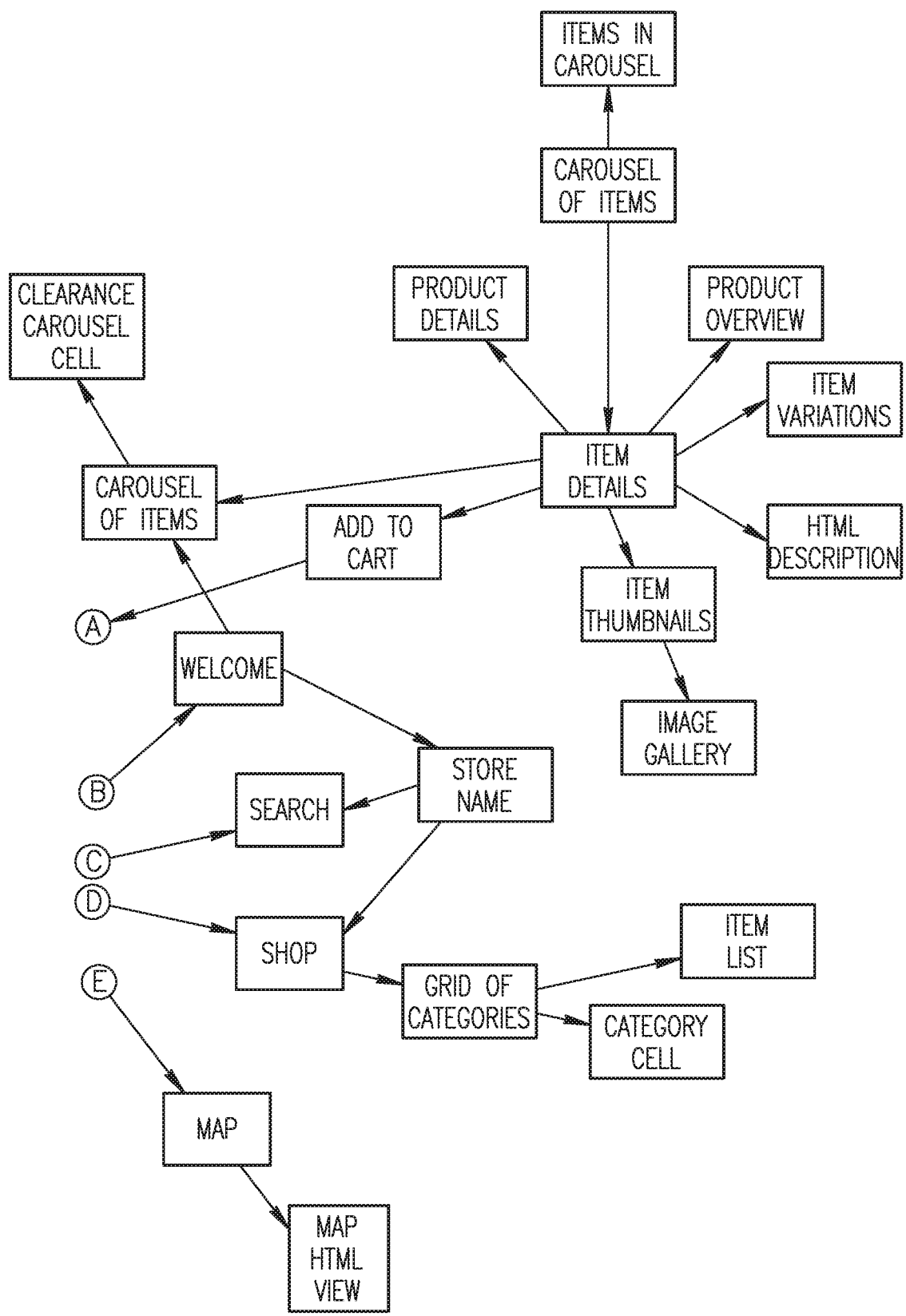

Reference is now made to FIGS. 36 and 37A and 37B which illustrate such component graphs. FIG. 36 illustrates a graph describing an E-commerce application at the page level and FIGS. 37A and 37B illustrate a graph detailed at the component level. It will be appreciated that in this scenario, matcher 66 may match between sections of such graphs, typically at the component level.

The graph vertices may represent sub-components of the complex native component, and the graph arcs may represent sub-component relationships.

In yet another embodiment, system 200 may be used with a dynamic view assignment system 500. It will be appreciated that some visual design systems may include one or more repositories of data items (consisting of fields) and data views (consisting of components, some of which serve as placeholders for field's values). In this embodiment, matcher 66 may match between views and items based on pre-defined assignment, user input or dynamically at run time and system 200 may use the views to display the content of the item. Matcher 66 may also "horizontally" match between views (associated with data items) and additional possible alternate views which may be offered to the user, thus extending the set of possible views based on additional sources.

It will be appreciated that system 200 may display similar items with different views, and that system 200 may use different views for the same item at different times.

It will also be appreciated that system 200 may include data types and template information, which may be used to define items and/or views. System 200 may also support inheritance (e.g. between multiple such types, templates, items and views).

One such system is described in US Patent Publication No. 2014/0282218 entitled "Device, System, and Method of Website Building by Utilizing Data Lists" published 18 Sep. 2014, incorporated herein by reference and assigned to the common assignee of the current invention. However, additional such system designs may be implemented, including in particular as part of end-user systems, rather than a web-site or application design system.

Thus system 200 may be used in conjunction with such a dynamic view assignment system 500. It will be appreciated that in this embodiment, the semantic information (and semantic signature) may be extended to include additional information from the item (for which a view is being searched), other items of the same repository as well as the type definitions (of both items and views) and objects related through inheritance relationships (e.g. taking information from parent objects).

It will also be appreciated that such additional information may include content and design related information, as well as business information, e.g. if the item repository is a database of goods for sale, a given field may have a business data type (e.g. item price) in addition to having a visual/editing related data type (e.g. a numeric field).

Furthermore, in some situations, system 200 may have to operate automatically (e.g. just pick the top priority view when displaying a given item) or semi automatically.

It will be appreciated that the views generated by system 200 and selected for use with items may vary on the screen, i.e. a given list of items may be presented by generating a display of multiple items simultaneously in an item gallery using multiple views. Some items (having a given set of attributes) may be associated with a given view, and other items may be associated with a different view. However, system 200 may take into account the fact that the multiple items are visible, and perform its view selection so as to provide a uniform (or identical) view for similar items viewed in the same gallery window.

It will also be appreciated that system 200 may also use externally provided information from higher-level containers or component sets. For example, a set of product views may be designated as "offers of the day". System 200 may then use this attribute (as an additional parameter) when searching for matching views to these product views. In particular (and as noted above), system 200 may force an identical choice of view for all "offers of the day" product views.

In yet another alternate embodiment to the present invention, system 200 may also be used in conjunction with application generation systems 600 which generates websites, native applications (including mobile, desktop and client server application) or other application types. Application generation systems 600 may differ from typical editing and design systems in that application generation systems 600 may generate a complete website or application or even application sub sections directly based on various sources of information (as detailed below), rather than providing a platform for the user to manually edit and design the application step by step.

It will be appreciated that application generation systems 600 may be coupled with a visual design system so that once an application is generated it may be edited in the visual design system. Likewise, some visual design systems may allow a template application to be selected based on given user input (e.g. business type and sub-type), and the user may use such selected template application as a foundation, so he will not be required to build his website or application from the beginning.

One type of application generation system 600 that may be used with system 200 is a website/application importer. A website/application importer allows the user to specify an existing website (or application) to be imported. The website/application importer may then review ("grab/crawl") such website and extract information from it. The extracted information may include content information, such as data records representing team members, contact information, opening hours, events etc., general application/site structure information and specific page and area layout information. The extracted information may also include additional semantic information such as information related to the business/real world aspects of the extracted information, e.g. distinguishing between an "address" text field and a "team member name" text field, information describing the original website or application as well as information related to the hierarchical (or other) structure of the extracted information. For example, additional semantic information may distinguish between an "address" text field from a "contact information" record and an "address" text field from a "client shipping address" record.

Another type of application generation system 600 that may be used with system 200 is a system that imports online presences. It will be appreciated that a person or organization may have one or more on-line presences hosted by multiple providers, such as Facebook, Yelp, and LinkedIn etc. A regular website may also be regarded as such a presence.

An application generation system 600 that imports such existing on-line presences based on such information may be similar to the website/application importer described herein above and may extract information from the multiple on-line presences, and unite it in a data repository. The data repository may then be used (together with provided templates) to generate the website or application.

It will be appreciated that a system for importing existing online presences, may have multiple sources from the same data, and may thus assign origin-based priorities (to different versions of the same data) to locate the most reliable source for any required data. Such systems may use website grabbing/crawling as discussed herein above, as well as specific data access services provided by the various presence providers.

A system for importing existing online presences may also include additional semantic information based on the origin of the data elements (what was the original presence), e.g. providing field semantic types or attributes such as: "Text value from Facebook", "Business address from about-page from Facebook", "Business logo from LinkedIn" etc. Semantic information may also be based on additional information available about the online presence that is not part of the regular data (e.g. from which type of Facebook page the data was imported).

Thus in yet another embodiment to the present invention, system 200 may be used in conjunction with a system for importing existing online presences and may use the additional semantic information for its semantic search, with the located layouts used for specific records.

It will be appreciated that another type of application generation system 600 that may be used with system 200 is a system that imports data from various data sources based on seed information, such as internet dictionaries, business data providers etc. Such data may be extracted based on the seed information, such as the business name, or based on more detailed information, such as provided URLs for various on-line presences. The data importing system may search multiple sources, possibly including off-line sources, and merge the information to create the underlying data repository used to generate the website/application. Such a system is described in US Patent Publication No. 2017/0344656 entitled "SYSTEM AND METHOD FOR THE CREATION AND UPDATE OF HIERARCHICAL WEBSITES BASED ON COLLECTED BUSINESS KNOWLEDGE" published 30 Nov. 2017, incorporated herein by reference and assigned to the common assignee of the current invention.

It will be appreciated that another type of application generation system 600 that may be used with system 200 is a system that generates a website or application based on user interaction. The system may interact with the user, asking him to supply various details about the site and build a repository of content records.

This could be done, for example, using a series of interactive questionnaires or forms which cover different parts and aspects of the user's business. Examples may include: what is the business type, what is the business location, who are the team members, what are the services offered etc. The gathered information may be stored (for example) as a series of content elements (records), arranged in a hierarchical or network structure. These content elements may then be mapped to layout elements, each of which is a template for a specific page area. These layout elements are assembled to form the complete website or application pages. It will be appreciated that in this scenario, the mapping above is many-to-many, i.e. each layout elements may include data from multiple content elements (and vice versa)—which is different from the typical association of views with items described above.

It will be further appreciated that in this scenario, the user interaction website generation system may offer multiple possible layout elements for each page area at the layout element level and multiple possible arrangements/layouts for the created layout elements at the page assembly level. It will also be appreciated that the extended semantic information may include information from the content elements.

In an alternative embodiment to the present invention, system 200 may be used as part of a system supporting sophisticated editing based on page analysis, from herein known as a page-analyzing visual editor system 700. Such a page-analyzing visual editor system 700 may be used inside a website building system or a native application building system as described herein above as well as other types of systems and technologies.

Page-analyzing visual editor system 700 may work by decomposing pages into a hierarchy (or multiple hierarchies) of smart box elements based on semantic knowledge extracted from the page components as well as other sources (e.g. inter-component anchors, component editing history and more). Smart box elements are described in US Patent Publication 2018/0032626 entitled "SYSTEM AND METHOD FOR IMPLEMENTING CONTAINERS WHICH EXTRACT AND APPLY SEMANTIC PAGE KNOWLEDGE" published on 1 Feb. 2018 and assigned to the common assignee of the present invention.

Such smart box elements may be either user or system generated and may conform to predefined semantic-based data types (semantic composites), e.g. a "picture+associated caption" data type, a "list of team members" data type etc. Thus, page-analyzing visual editor system 700 may analyze the page being edited (according to a database of semantic-based data types), and automatically classify sets of elements as semantic composites based on this component analysis and matching. Some semantic composites are repeaters (such as lists, galleries and grids) and some are non-repeating (such as the "picture+caption" semantic composites above). Some smart boxes, however, do not conform to any specific pre-defined semantic composite data types.

Thus page-analyzing visual editor system 700 may then suggest alternative layouts for a specific smart box or a group of related smart boxes. Such a suggestion can be made based on semantic searching provided by system 200.

It will be appreciated that in this embodiment, layout system 90 may be activated based on handled component sets automatically defined through the page analysis process. Therefore matcher 66 may match using the predefined semantic types or through the regular semantic matching process, extended through the use of additional business-related component information as discussed herein above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

What is claimed is:

1. A system for a visual design system, the system comprising:
   a memory;
   a processor;
   a unit running on said processor to generate a layout according to business information, said unit comprising:
      a page analyzer to receive an incoming request of at least one page of a visual application having an existing layout, to extract business information of at least one data structure of said at least one page, said page analyzer to also perform a semantic analysis of said extracted business information and to produce an associated business information signature using said semantic analysis;
      a database to store at least one layout and at least one associated business information signature of said at least one layout wherein said business information signature of said at least one layout represents a business information composition of said at least one layout stored in said layout database;
      a signature comparer to perform a comparison of said associated business information signature of said at least one data structure with said associated business information signature of said at least one layout stored in said layout database to produce results; and
      a layout searcher and generator to at least acquire from said database a set of candidate layouts according to the results of said signature comparer wherein said candidate layouts are semantically similar and visually different to each other, wherein said layout searcher and generator comprises:
         a visual page comparer to determine a level of visual similarity between a first candidate layout from said set of candidate layouts, said existing layout and a second candidate layout from said set of candidate layouts; and
         a diversifier to determine an extent of visual diversity between said first candidate layout, said existing layout and said second candidate layout according to the level of visual similarity from said visual page comparer.

2. The system according to claim 1 wherein a first candidate layout comprises semantically similar components having visual diversity from a second candidate layout and from said existing layout and also comprising:
   a layout adapter and applier to adapt said at least one data structure to a selected layout from said set of candidate layouts.

3. The system according to claim 2 and also comprising:
   a page spider to retrieve visual design system pages comprising at least one of: new and updated visual data structures, templates and manually created layouts from an associated application repository and pages from external sources;
   a layout filter and ranker to filter and rank at least one of: said at least one layout generated by said page analyzer and said candidate layouts; and
   wherein said page analyzer operates on said spider retrieved visual design system pages instead of operating on said data structure.

4. The system according to claim 3 and wherein said layout filter and ranker comprises:

a layout quality rater to calculate a quality score in order to filter out low-quality pages of at least one of: said at least one layout and said candidate layouts based on at least one of page statistical metrics, page visual attributes, content and a layout quality rater learning system; and a ranker to order at least one of said at least one layout and said candidate layouts according to business information semantic similarity.

5. The system according to claim 2 and wherein said layout searcher and generator comprises:

a server based layout handler to perform at least one of: retrieving said candidate layouts from said layout database, completing partial candidate layouts and combining of at least two of segmented candidate layouts;

an automatically generated layout handler to create automatically generated layouts based on components in said at least one data structure; and a matcher to create a match of components between said at least one data structure and said candidate layouts wherein said match is at least one of:

exact and partial.

6. The system according to claim 5 and wherein said automatically generated layout handler comprises:

an automatically generated layout coordinator to receive at least one of: a base component set of said at least one data structure and a base component set of components missing from an associated said partial candidate layout from said server based layout handler and to create multiple possible algorithmically-generated layouts from said base component set;

and at least one of:

a column layout generator to place components from said base component set into one column after the other and a main and side bar layout generator to place components from said base component set in a main column followed by a smaller side-bar and a rule based generator to place components from said base component set according to pre-defined placement rules.

7. The system according to claim 6 and wherein said server based layout handler comprises:

a server based layout coordinator to perform at least one of: receiving said at least one data structure and associated business information signatures, querying said layout database using said business information signatures, retrieving said set of candidate layouts and coordinating completion of at least one of: said partial candidate layouts and segmented candidate layouts retrieved from said layout database;

a partial layout handler to send components missing from said partial candidate layouts to said automatically generated layout handler and to use the resulting automatically generated layout to complete said partial candidate layouts; and a segment layout handler to combine said segmented candidate layouts into a full layout according to pre-defined rules.

8. The system according to claim 2 and wherein said layout adapter and applier comprises:

a component type conversion handler to convert the type of each component in said at least one data structure set to the type of each matching component in said selected layout;

a component attribute applier to apply attributes to components in said at least one data structure set from said selected layout; and at least one of:

a dynamic layout handler to transfer over said dynamic layout explicit anchors and relationships from at least one data structure set to said selected layout; and a container change applier to adapt containers from said at least one data structure set to said selected layout; and a split/merge component handler to perform at least one of: splitting and merging components in said selected layout; and a remaining component handler to handle components which appear in said at least one data structure but are not included in said selected layout; and a post processor to perform reverse transformations made by said page analyzer when necessary.

9. The system according to claim 2 and wherein said candidate layouts are acquired based on at least one of: a business information signature of said at least one data structure, a partial business information signature of said at least one data structure, at least one business information signature of said at least one data structure and an automatically generated layout.

10. The system according to claim 1 and wherein said page analyzer comprises:

a signature extractor to extract at least one of: a full business information signature and a partial business information signature from said at least one data structure and wherein said signature extractor performs at least one of:

semantic type mapping of said components, dividing semantic types based on visual properties of said components and generating signature elements based on multiple component semantic types; and at least one of:

a semantic link handler to identify semantic links which connect at least two components in said at least one data structure;

a layout splitter to divide said at least one data structure into segments based on at least one of: geometrical considerations, said semantic links and dynamic layout anchors a component splitter to split at least one component of said at least one data structure set based on the content of said at least one component; and a component filter to filter to filter out unsuitable components for said signature extractor; and a component merger to unite at least two components for layout processing and signature extraction by said signature extractor;

a container handler to reduce the amount of different business information signatures for said at least one data structure set by performing at least one of:

using hierarchical signatures, container flattening, container flattening and reconstruction, single component container replacement; dominant type selection and recursive implementation; and wherein said page analyzer generates at least one of a single full page layout, multiple partial page layouts, multiple segmented layouts and an associated layout package after processing by at least one of: said layout splitter, said signature extractor, said semantic link handler; said component splitter; said component filter; said component merger and said container handler.

11. The system according to claim 1 and wherein said business information signature is according to semantic classification categories of the components of said visual design system.

12. The system according to claim 1 and wherein said comparison is based on at least one of: semantic abstraction and semantic distance metrics.

13. The system according to claim 1 wherein said at least one data structure is a larger than a handled component set of a page of a visual application.

14. The system according to claim 1 wherein said visual design system is at least one of: an experiment system, an end user orientated application, a native application building system, a dynamic view assignment system, an application generation system, a page analyzing visual editor and a website building system.

15. The system according to claim 1 wherein said business information comprises at least one of: field business data type, field business data sub-type, business view information, business related component definitions and business world semantic information.

16. A method for a visual design system, the method comprising:
receiving an incoming request of at least one page of a visual application having an existing layout,
extracting business information from at least one data structure of said at least one page; semantically analyzing said extracted business information and using the output of said semantically analyzing to produce a business information layout and an associated business information signature;
storing in a layout database at least one layout and at least one associated business information signature of said at least one layout wherein said business information signature of said at least one layout represents a business information composition of said at least one layout;
comparing said associated business information signature of said at least one data structure with said associated business information signature of said at least one layout stored in said layout database to produce results; and
at least acquiring from said database a set of candidate layouts according to the results of said comparing said associated business information signature wherein said candidate layouts are visually different and semantically similar to each other, wherein said at least acquiring comprises:
determining a level of visual similarity between a first candidate layout from said set of candidate layouts, said existing layout and from a second candidate layout from said set of candidate layouts; and
determining an extent of visual diversity between said first candidate layout, existing layout and from said second candidate layout according to said determining the level of visual similarity.

17. The method according to claim 16 wherein a first candidate layout comprises semantically similar components having visual diversity from a second candidate layout and from said existing layout and also comprising:
adapting said at least one data structure to a selected layout from said set of candidate layouts.

18. The method according to claim 17 and also comprising:
retrieving visual design system pages comprising at least one of: new and updated data structures, templates and manually created layouts from an associated application repository and pages from external sources;
filtering and ranking at least one of: said at least one layout generated by said extracting business information and said candidate layouts; and
wherein said extracting business information, said semantically analyzing and using said extracted business information to produce a business information layout operate on said visual design system pages instead of operating on said data structure.

19. The method according to claim 18 and wherein said filtering and ranking comprises:
calculating a quality score in order to filter out low-quality pages of at least one of: said at least one layout and said candidate layouts based on at least one of page statistical metrics, page visual attributes, content and a layout quality rater learning system; and
ordering at least one of said at least one layout and said candidate layouts according to business information semantic similarity.

20. The method according to claim 17 and wherein said acquiring comprises:
performing at least one of: retrieving said candidate layouts from said layout database, completing partial candidate layouts and combining of at least two of segmented candidate layouts;
creating automatically generated layouts based on the components in said at least one data structure; and
creating a match of components between said at least one data structure and said candidate layouts wherein said match is at least one of: exact and partial.

21. The method according to claim 20 and wherein said creating said automatically generated layouts comprises:
receiving at least one of: a base component set of said at least one data structure and a base component set of components missing from an associated said partial candidate layout from said performing at least one of: retrieving said candidate layouts from said layout database, completing partial candidate layouts and combining of at least two of segmented candidate layouts and creating multiple possible algorithmically-generated layouts from said base component set;
and at least one of:
placing components from said base component set into one column after the other and
placing components from said base component set in a main column followed by a smaller side-bar and
placing components from said base component set according to pre-defined placement rules.

22. The method according to claim 20 and wherein said performing at least one of: retrieving said candidate layouts from said layout database, completing partial candidate layouts and combining of at least two of segmented candidate layouts comprises:
performing at least one of: receiving said at least one data structure and associated business information signatures, querying said layout database using said business information signatures, retrieving said set of candidate layouts and coordinating completion of at least one of: said partial candidate layouts and segmented candidate layouts retrieved from said layout database;
sending components missing from said partial candidate layouts for said performing at least one of: creating said automatically generated layouts based on the components in said at least one data structure and completing said partial candidate layouts retrieved by said performing at least one of:
retrieving said candidate layouts from said layout database, completing partial candidate layouts and combining of at least two of segmented candidate layouts and using the resulting automatically generated layout to complete said partial candidate layouts; and combining said segmented candidate layouts into a full layout according to pre-defined rules.

23. The method according to claim 17 and wherein said adapting said at least one data structure to a selected layout from said set of candidate layouts comprises:

converting the type of each component in said at least one data structure set to the type of each matching component in said selected layout;

applying attributes to components in said at least one data structure set from said selected layout; and at least one of:

transferring over said dynamic layout explicit anchors and relationships from said at least one data structure to said selected layout; and adapting containers from said at least one data structure set to said selected layout; and performing at least one of: splitting and merging components in said selected layout; and handling components which appear in said at least one data structure but are not included in said selected layout; and performing reverse transformations made by said extracting business information when necessary.

24. The method according to claim 17 and wherein said candidate layouts are acquired based on at least one of: a business information signature of said at least one data structure, a partial business information signature of said at least one data structure, at least one business information signature of said at least one data structure and an automatically generated layout.

25. The method according to claim 16 and wherein said extracting business information, said semantically analyzing and using said extracted business information to produce a business information layout comprises:

extracting at least one of: a full business information signature and a partial business information signature from said at least one data structure and wherein said extracting performs at least one of: semantic type mapping of said components, dividing semantic types based on visual properties of said components and generating signature elements based on multiple component semantic types; and at least one of:

identifying semantic links which connect at least two components in said at least one data structure;

dividing said at least one data structure into segments based on at least one of: geometrical considerations, said semantic links and dynamic layout anchors;

splitting at least one component of said at least one data structure set based on the content of at least one component; and filtering out unsuitable components for said extracting; and uniting at least two components for layout processing and signature extraction by said extracting; and reducing the amount of different business information signatures for said at least one data structure set by performing at least one of: using hierarchical signatures, container flattening, container flattening and reconstruction, single component container replacement; dominant type selection and recursive implementation;

and wherein said extracting business information, said semantically analyzing and using said extracted business information to produce a business information layout, generate at least one of a single full page layout, multiple partial page layouts, multiple segmented layouts and an associated layout package after processing by at least one of: said dividing said at least one data structure into segments, said extracting, said identifying semantic links; said splitting at least one component of said at least one data structure; said filtering out unsuitable components; said uniting at least two components and said reducing the amount of different business information signatures.

26. The method according to claim 16 and wherein said business information signature is according to semantic classification categories of the components of said visual design system.

27. The method according to claim 16 and wherein said comparison is based on at least one of: semantic abstraction and semantic distance metrics.

28. The method according to claim 16 wherein said at least one data structure is a larger than a handled component set of a page of a visual application.

29. The method according to claim 16 wherein said visual design system is at least one of: an experiment system, an end user orientated application, a native application building system, a dynamic view assignment system, an application generation system, a page analyzing visual editor and a website building system.

30. The method according to claim 16 wherein said business information comprises at least one of: field business data type, field business data sub-type, business view information, business related component definitions and business world semantic information.

* * * * *